(12) United States Patent
Zuchoski et al.

(10) Patent No.: US 9,656,703 B2
(45) Date of Patent: May 23, 2017

(54) ALL-TERRAIN VEHICLE (ATV) PROPELLABLE ON WHEELS OR ENDLESS TRACKS

(75) Inventors: Jeremie Zuchoski, Sherbrooke (CA); Jean Bernard, St-Mathieu du Pare (CA)

(73) Assignee: Camso Inc., Magog (CA)

( * ) Notice: Subject to any disclaimer, the term of this patent is extended or adjusted under 35 U.S.C. 154(b) by 682 days.

(21) Appl. No.: 13/170,697

(22) Filed: Jun. 28, 2011

(65) Prior Publication Data
US 2011/0315459 A1  Dec. 29, 2011

Related U.S. Application Data

(60) Provisional application No. 61/359,083, filed on Jun. 28, 2010.

(51) Int. Cl.
  *B62D 55/02* (2006.01)
  *B62D 55/04* (2006.01)
  *B60W 50/08* (2012.01)
  *B60W 50/00* (2006.01)

(52) U.S. Cl.
  CPC ........... *B62D 55/04* (2013.01); *B60W 50/082* (2013.01); *B62D 55/02* (2013.01); *B60W 2050/0095* (2013.01); *B60W 2300/18* (2013.01); *B60W 2300/185* (2013.01); *B60W 2300/362* (2013.01); *B60W 2300/44* (2013.01); *B60Y 2200/124* (2013.01); *B60Y 2200/25* (2013.01)

(58) Field of Classification Search
  CPC ..... B62D 55/02; B62D 55/04; B60W 50/082; B60W 2300/185; B60W 2300/44
  USPC ............... 180/9.21, 9.26, 9.28, 9.3
  See application file for complete search history.

(56) References Cited

U.S. PATENT DOCUMENTS

| | | | | |
|---|---|---|---|---|
| 1,744,516 A * | 1/1930 | Whitacre | ........................ | 180/6.7 |
| 2,698,667 A * | 1/1955 | Kropp | ............................ | 180/365 |
| 2,852,317 A * | 9/1958 | Riemerschmid | ............... | 180/6.7 |
| 3,050,347 A * | 8/1962 | Levi | ................................ | 305/20 |
| 3,295,620 A * | 1/1967 | Messenger | ..................... | 180/6.7 |
| 3,710,886 A * | 1/1973 | Wagner | ........................ | 180/9.21 |
| 3,737,001 A * | 6/1973 | Rasenberger | ................. | 180/185 |
| 3,937,288 A * | 2/1976 | Kehler | .................. | B62D 55/02 |
| | | | | 180/6.7 |
| 4,069,883 A * | 1/1978 | Cousineau | ..................... | 180/185 |
| 4,459,932 A * | 7/1984 | Hildebrand | ................ | 440/12.64 |

(Continued)

OTHER PUBLICATIONS

CAN-AM BRP, "Parts & Accessories—Track System", *Parts, Accessories & Riding Gear catalogue*, p. 66 (2011).

(Continued)

*Primary Examiner* — Joseph Rocca
*Assistant Examiner* — Maurice Williams
(74) *Attorney, Agent, or Firm* — Fish & Richardson P.C.

(57) ABSTRACT

An all-terrain vehicle (ATV) equippable with a plurality of ground-engaging wheels or a plurality of ground-engaging track assemblies providing traction on the ground. The ATV is designed to facilitate its use whether it is equipped with the ground-engaging wheels or the ground-engaging track assemblies. A powertrain, a steering system, a suspension, a braking system, a body, and/or other components of the ATV have features which take into account that the ATV can be equipped with either the ground-engaging wheels or the ground-engaging track assemblies.

43 Claims, 19 Drawing Sheets

(56) References Cited

U.S. PATENT DOCUMENTS

| | | | | |
|---|---|---|---|---|
| 4,620,602 A * | 11/1986 | Capriotti | 180/9.21 |
| 4,635,740 A * | 1/1987 | Krueger et al. | 180/9.21 |
| 4,865,141 A * | 9/1989 | Gey | 180/9.26 |
| 5,287,938 A * | 2/1994 | Welling | 180/9.3 |
| 5,360,230 A * | 11/1994 | Yamada et al. | 280/5.515 |
| 5,975,226 A * | 11/1999 | Matsumoto | B60K 5/00 180/9.1 |
| 6,006,847 A * | 12/1999 | Knight | 180/9.26 |
| 6,076,619 A * | 6/2000 | Hammer | 180/6.48 |
| 6,135,220 A * | 10/2000 | Gleasman et al. | 180/9.1 |
| 6,199,646 B1 * | 3/2001 | Tani et al. | 180/9.21 |
| 6,659,214 B1 * | 12/2003 | Laing | 180/198 |
| 6,962,222 B2 * | 11/2005 | Kirihata | 180/9.46 |
| 7,475,745 B1 * | 1/2009 | DeRoos | 180/9.34 |
| 7,546,890 B2 * | 6/2009 | Grobler | 180/9.21 |
| 7,552,979 B2 * | 6/2009 | Christianson | 305/129 |
| 8,056,655 B2 * | 11/2011 | Mallette et al. | 180/9.21 |
| 8,225,895 B1 * | 7/2012 | Salton et al. | 180/167 |
| 2005/0145422 A1 * | 7/2005 | Loegering et al. | 180/9.26 |
| 2006/0060395 A1 * | 3/2006 | Boivin et al. | 180/9.21 |
| 2006/0124366 A1 * | 6/2006 | Le Masne De Chermont | 180/9.3 |
| 2006/0254841 A1 * | 11/2006 | Strong | B60G 5/00 180/190 |
| 2007/0169968 A1 * | 7/2007 | Todd et al. | 180/9.1 |
| 2007/0240917 A1 * | 10/2007 | Duceppe | 180/9.21 |
| 2008/0258550 A1 * | 10/2008 | Webster | B62D 55/02 305/129 |
| 2009/0014223 A1 * | 1/2009 | Jones et al. | 180/65.8 |
| 2009/0025661 A1 * | 1/2009 | Itoga et al. | 123/41.12 |
| 2009/0093928 A1 * | 4/2009 | Getman et al. | 701/37 |
| 2009/0166101 A1 * | 7/2009 | Wenger et al. | 180/6.7 |
| 2010/0012397 A1 * | 1/2010 | Bernard et al. | 180/6.24 |
| 2010/0012398 A1 * | 1/2010 | Bernard et al. | 180/9.26 |
| 2010/0012399 A1 * | 1/2010 | Hansen | 180/9.26 |
| 2010/0060075 A1 * | 3/2010 | Hansen | 305/15 |
| 2010/0090797 A1 * | 4/2010 | Koenig et al. | 340/5.22 |
| 2010/0139994 A1 * | 6/2010 | Hansen | 180/9.26 |
| 2010/0219004 A1 * | 9/2010 | Mackenzie | 180/9.21 |
| 2010/0230185 A1 * | 9/2010 | Mallette et al. | 180/9.44 |
| 2010/0269787 A1 * | 10/2010 | Shimamura et al. | 123/362 |
| 2011/0068620 A1 | 3/2011 | Delisle et al. | |
| 2011/0148189 A1 | 6/2011 | Courtemanche et al. | |
| 2011/0239646 A1 * | 10/2011 | Bennet et al. | 60/605.1 |
| 2012/0001478 A1 | 1/2012 | Zuchoski et al. | |
| 2012/0104840 A1 | 5/2012 | Zuchoski et al. | |
| 2013/0134772 A1 | 5/2013 | Dandurand et al. | |
| 2013/0134773 A1 | 5/2013 | Dandurand et al. | |

OTHER PUBLICATIONS

Story by Staff, BRP upgrades Apache ATV track system for Outlander—Apache system features larger footprint and power steering mode, ATV.com, http://www.atv.com/news/brp-upgrades-apache-atv-track-system-for-outlander-1481.html 2 pp. (Nov. 24, 2009).
U.S. Appl. No. 13/649,312, filed Oct. 2012, Zuchoski et al.

* cited by examiner

1st Position
1st Size

Wheel Mode
———————————————————————————————
Track Mode

2nd Position
1st Size

1st Position
2nd Size

2nd Position
2nd Size

ALL-TERRAIN VEHICLE (ATV) PROPELLABLE ON WHEELS OR ENDLESS TRACKS

CROSS-REFERENCE TO RELATED APPLICATION

This application claims the benefit under 35 USC 119(e) of U.S. Provisional Patent Application No. 61/359,083 filed on Jun. 28, 2010 and hereby incorporated by reference herein.

FIELD OF THE INVENTION

The invention relates generally to all-terrain vehicles (ATVs) and to components of such ATVs.

BACKGROUND

All-terrain vehicles (ATVs) are small open vehicles designed to travel off-road on a variety of terrains, including roadless rugged terrain, for recreational, utility and/or other purposes.

ATVs have conventionally been propelled on the ground by a set of ground-engaging wheels. In recent years, track assemblies which comprise endless tracks have been developed to be mounted in place of the wheels of an ATV to convert it into a tracked vehicle having enhanced floatation and traction. However, since they have conventionally been designed and manufactured as wheeled vehicles, ATVs have conventionally not been designed and manufactured taking into account that their wheels may be replaced by track assemblies.

Accordingly, there is a need for solutions directed to facilitating use of ATVs propelled by ground-engaging wheels or track assemblies.

SUMMARY OF THE INVENTION

In accordance with an aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The powertrain is operable in a wheel mode when the ATV is equipped with the ground-engaging wheels and in a track mode when the ATV is equipped with the ground-engaging track assemblies. The ATV comprises a mode selector for selecting a particular one of the wheel mode and the track mode to cause the powertrain to operate in the particular one of the wheel mode and the track mode.

In accordance with another aspect of the invention, there is provided a controller for an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The controller comprises: a processing portion; and a memory portion storing a program executable by the processing portion to control the powertrain such that the powertrain operates in a wheel mode when the ATV is equipped with the ground-engaging wheels and in a track mode when the ATV is equipped with the ground-engaging track assemblies.

In accordance with another aspect of the invention, there is provided computer-readable storage media storing a program executable by at least one processor to implement a controller for an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The program when executed by the at least one processor causes the controller to control the powertrain such that the powertrain operates in a wheel mode when the ATV is equipped with the ground-engaging wheels and in a track mode when the ATV is equipped with the ground-engaging track assemblies.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The powertrain comprises a prime mover for generating power and a transmission for transmitting power. The transmission has at least two transmission ratios in a reverse direction of the transmission.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a steering system for steering the ATV on the ground. The steering system is operable in a wheel mode when the ATV is equipped with the ground-engaging wheels and in a track mode when the ATV is equipped with the ground-engaging track assemblies. The ATV comprises a mode selector for selecting a particular one of the wheel mode and the track mode to cause the steering system to operate in the particular one of the wheel mode and the track mode.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a steering system for steering the ATV on the ground. The steering system comprises a manually-controllable steering angle limiter for limiting a maximum steering angle of a given one of the ground-engaging track assemblies when the ATV is equipped with the ground-engaging track assemblies.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a frame. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a suspension for allowing relative motion between the frame and the ground-engaging wheels when the ATV is equipped with the ground-engaging wheels and relative motion between the frame and the ground-engaging track assemblies when the ATV is equipped with the ground-engaging track assemblies. The suspension is operable in a wheel mode when the ATV is equipped with the ground-engaging wheels and in a track mode when the ATV is equipped with the ground-engaging track assemblies. The ATV comprises a mode selector for selecting a particular one of the wheel mode and the track mode to cause the suspension to operate in the particular one of the wheel mode and the track mode.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a braking system for braking the ATV. The braking system is operable in a wheel mode when the ATV is equipped with the ground-engaging wheels and in a track mode when the ATV is equipped with the ground-engaging track assemblies. The ATV comprises a mode selector for selecting a particular one of the wheel mode and the track mode to cause the braking system to operate in the particular one of the wheel mode and the track mode.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a frame. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The frame is configured such that a ratio $W_t/W_w$ of a width $W_t$ of the ATV equipped with the ground-engaging track assemblies to a width $W_w$ of the ATV equipped with the ground-engaging wheels is no more than 1.12.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ground-engaging track assembly comprises an anti-rotation connector to limit a pivoting movement of the ground-engaging track assembly. The ATV comprises a frame. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The frame comprises a plurality of anchors for anchoring the anti-rotation connectors of the ground-engaging track assemblies. The anchors are built into the frame during manufacturing of the ATV.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a frame. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a body providing an external structure of the ATV. The body is configurable differently depending on whether the ATV is equipped with the ground-engaging wheels or the ground-engaging track assemblies.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises a powertrain for delivering power to the ground-engaging wheels when the ATV is equipped with the ground-engaging wheels and to the drive wheels of the ground-engaging track assemblies when the ATV is equipped with the ground-engaging track assemblies. The ATV comprises a user interface for use by a user of the ATV. The user interface comprises a plurality of indicators to convey information to the user. The user interface is configured to adapt the information conveyed to the user depending on whether the ATV is equipped with the ground-engaging wheels or the ground-engaging track assemblies.

In accordance with another aspect of the invention, there is provided an all-terrain vehicle (ATV). The ATV is equippable with a plurality of ground-engaging wheels or a plurality of ground-engaging track assemblies providing traction on the ground. Each ground-engaging track assembly of the plurality of ground-engaging track assemblies comprises a plurality of track-contacting wheels and an endless track disposed around the plurality of track-contacting wheels. The plurality of track-contacting wheels includes a drive wheel for driving the endless track. The endless track comprises an inner side for facing the plurality of track-contacting wheels and a ground-engaging outer side for engaging the ground. The ATV comprises: a frame; a powertrain for delivering power to the ground-engaging wheels when the ATV is equipped with the ground-engaging wheels and to the drive wheels of the ground-engaging track assemblies when the ATV is equipped with the ground-engaging track assemblies; a steering system for steering the ATV on the ground; a suspension for allowing relative motion between the frame and the ground-engaging wheels when the ATV is equipped with the ground-engaging wheels and relative motion between the frame and the ground-engaging track assemblies when the ATV is equipped with the ground-engaging track assemblies; and a braking system for braking the ATV. At least one of the powertrain, the steering system, the suspension, and the braking system is operable in a wheel mode when the ATV is equipped with the ground-engaging wheels and in a track mode when the ATV is equipped with the ground-engaging track assemblies. The ATV comprises a mode selector for selecting a particular one of the wheel mode and the track mode to cause the at least one of the powertrain, the steering system, the suspension, and the braking system to operate in the particular one of the wheel mode and the track mode.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

Figure 1A:
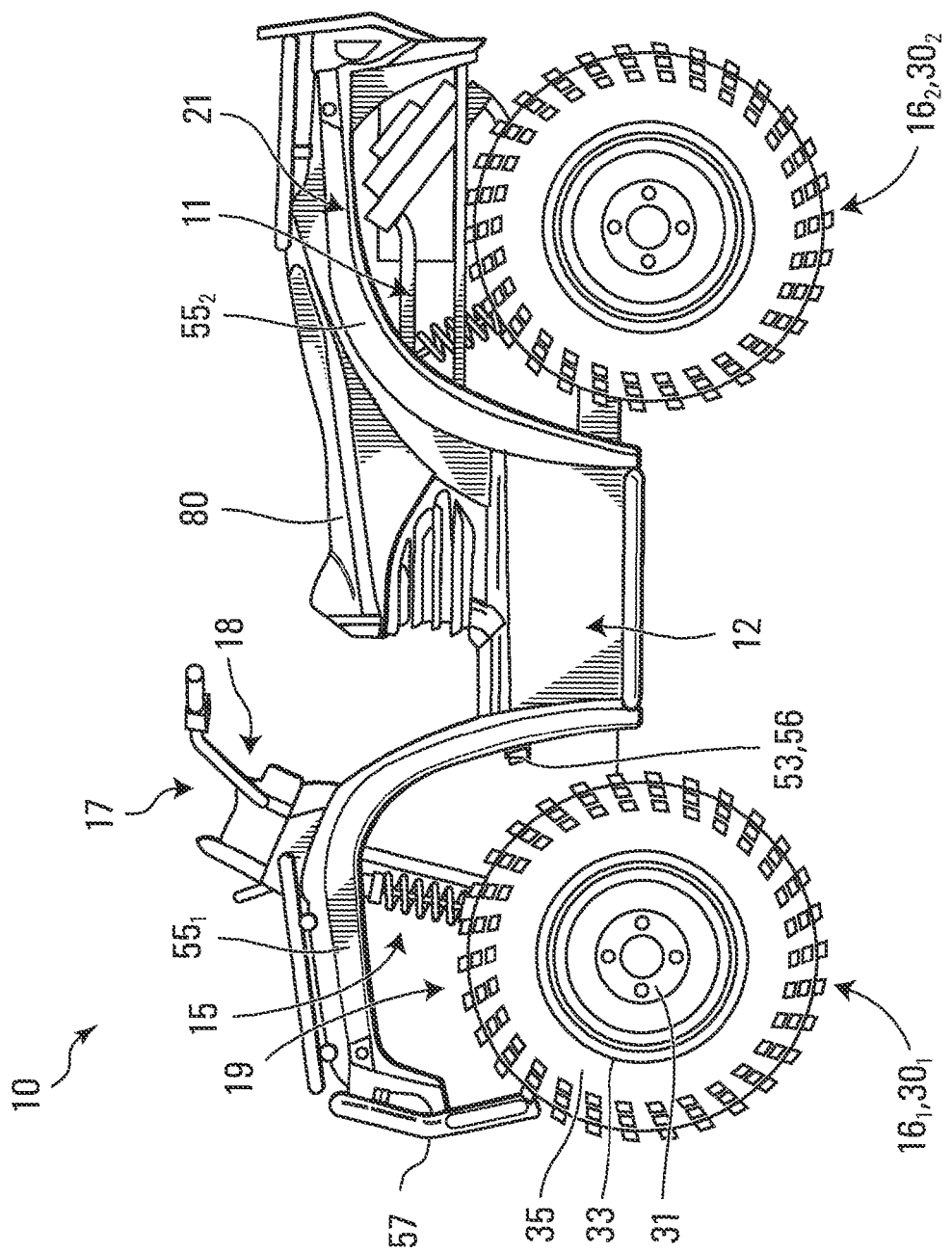
FIGS. 1A and 1B show an example of an all-terrain vehicle (ATV) in accordance with an embodiment of the invention, equipped with a set of wheels.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS OF THE INVENTION

FIGS. 1A to 2B show an example of an all-terrain vehicle (ATV) 10 in accordance with an embodiment of the invention. The ATV 10 is a small open vehicle designed to travel off-road on a variety of terrains, including roadless rugged terrain, for recreational, utility and/or other purposes.

The ATV 10 comprises a frame 11 supporting a plurality of components, including a powertrain 12, a steering system 17, a suspension 15, a braking system 19, and a body 21, and travels on the ground on a plurality of ground-engaging traction components $16_1$-$16_4$. A user interacts with the ATV 10 via a user interface 18, which comprises an accelerator 40, a brake control 73, and a steering device 13 that are operated by the user to control motion of the ATV 10 on the ground. The user interface 18 also comprises an instrument panel 11 (e.g., a dashboard) which provides indicators (e.g., a speedometer indicator, a tachometer indicator, etc.) to convey information to the user.

Figure 1B:
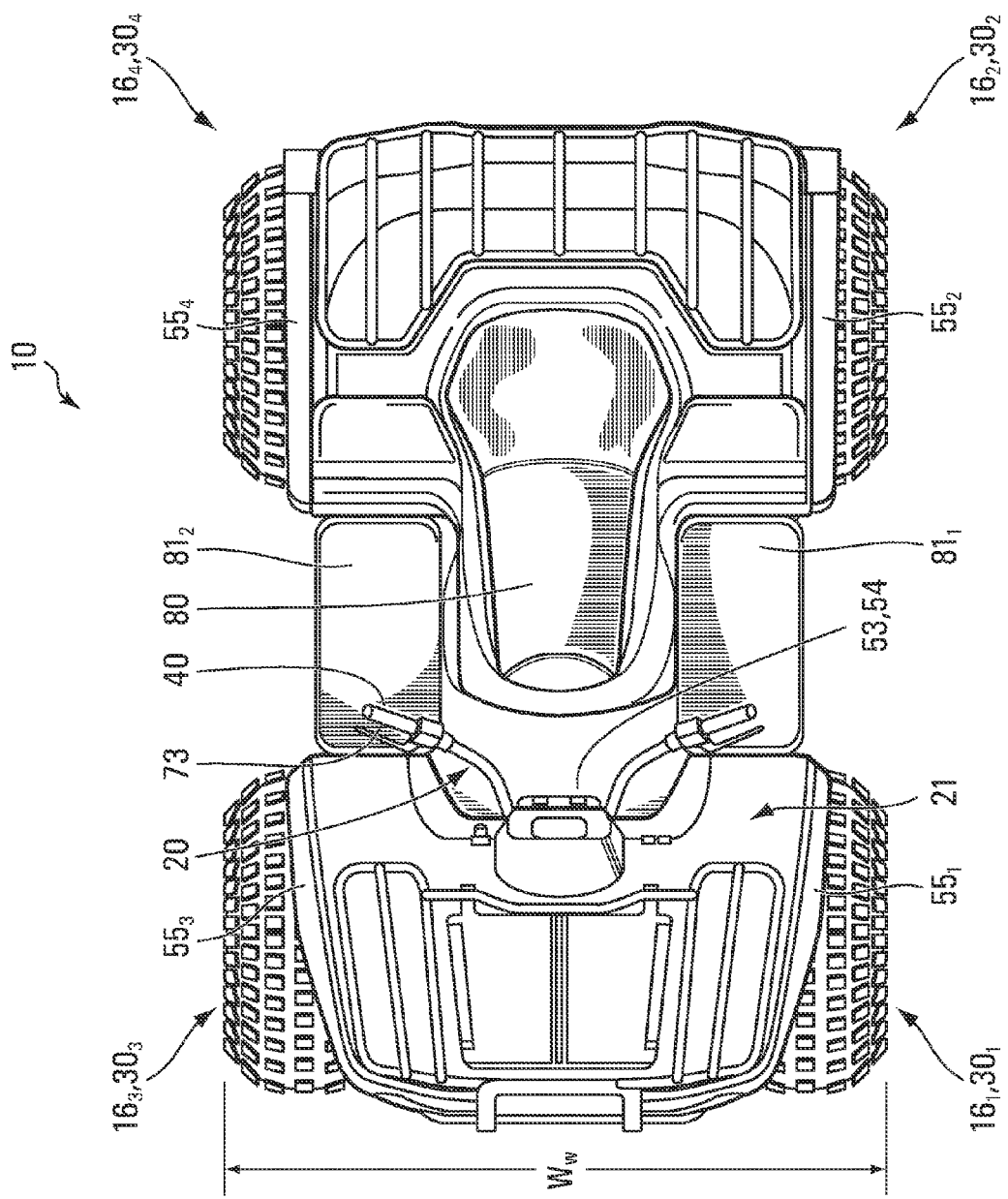
Figure 2A:
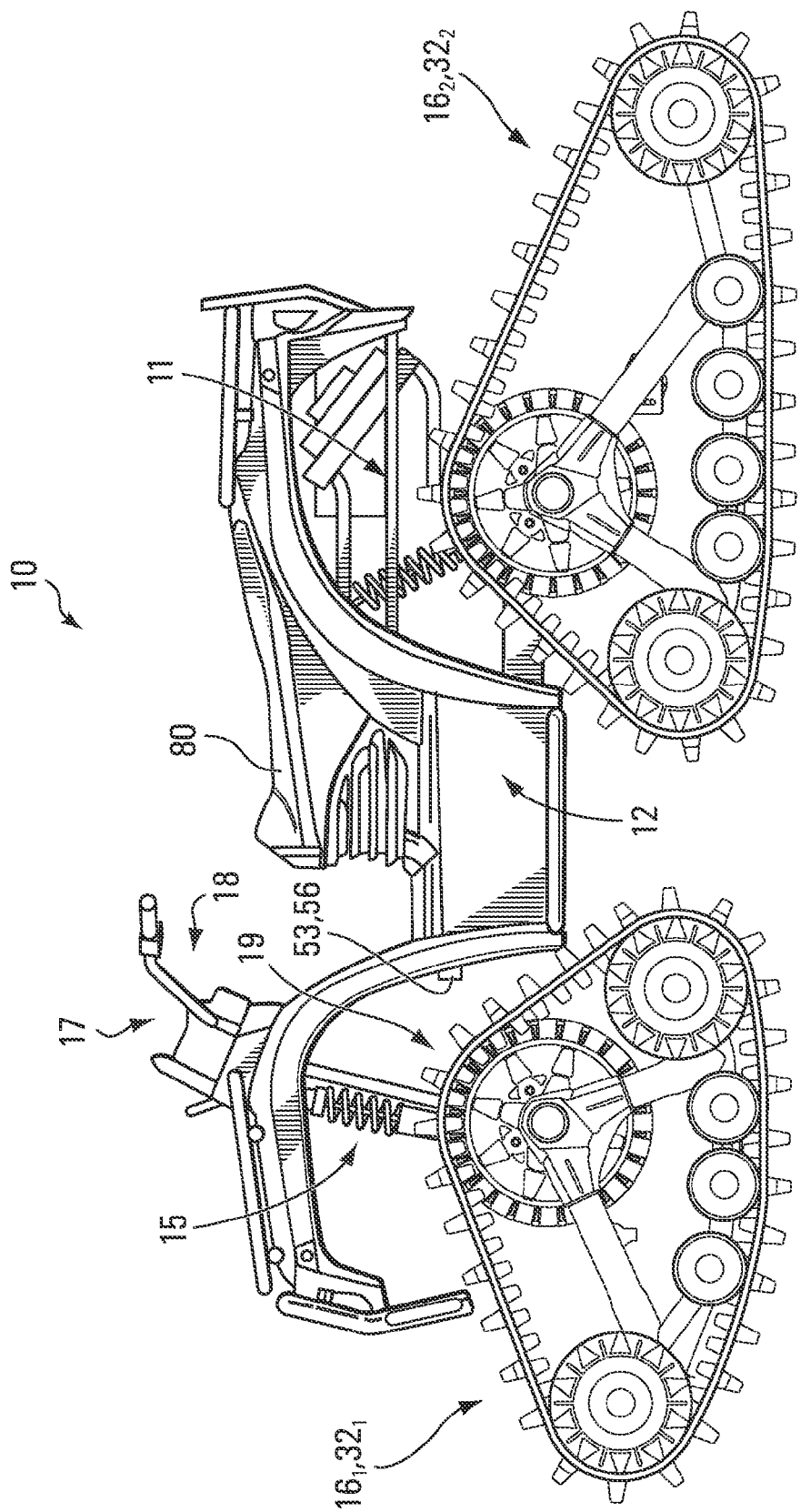
FIGS. 2A and 2B shows the ATV equipped with a set of track assemblies.
Figure 2B:
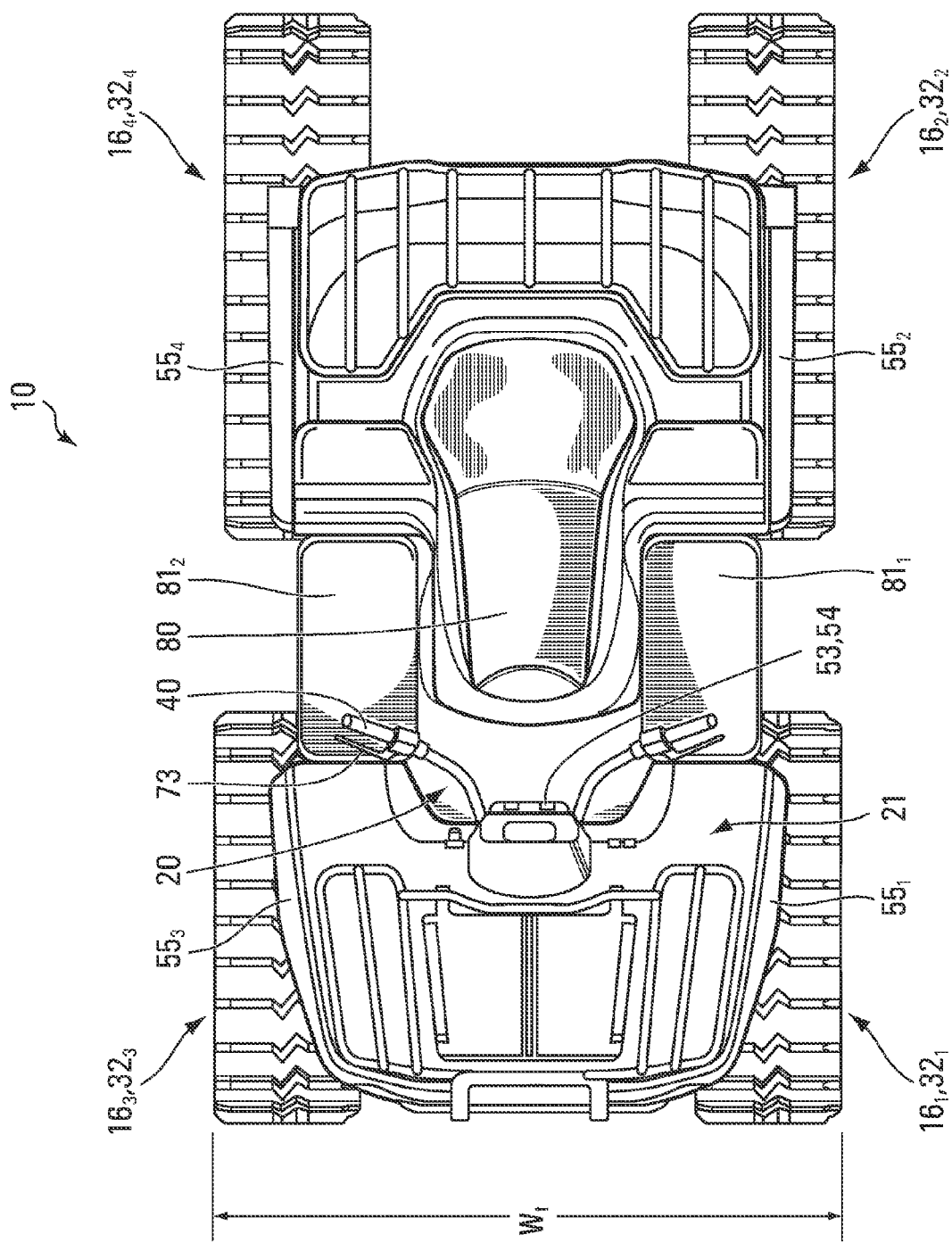
Figure 3:
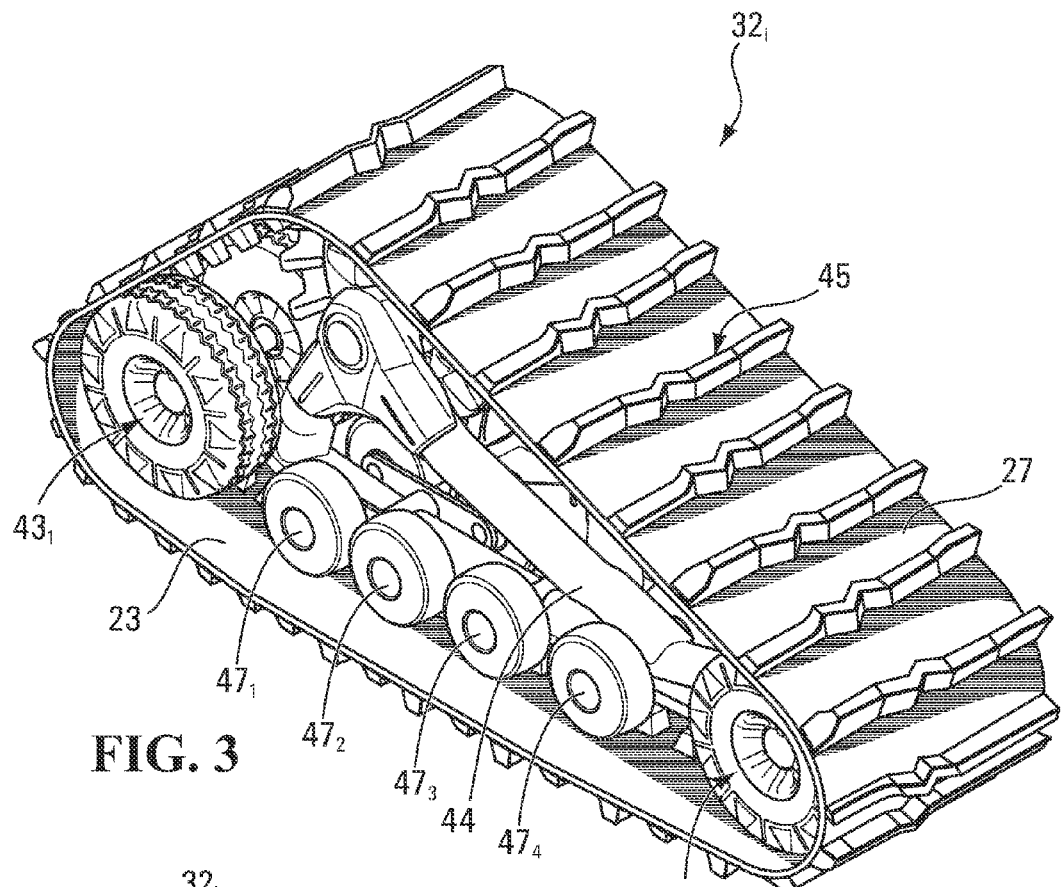
FIGS. 3 and 4 show a track assembly.
Figure 4:
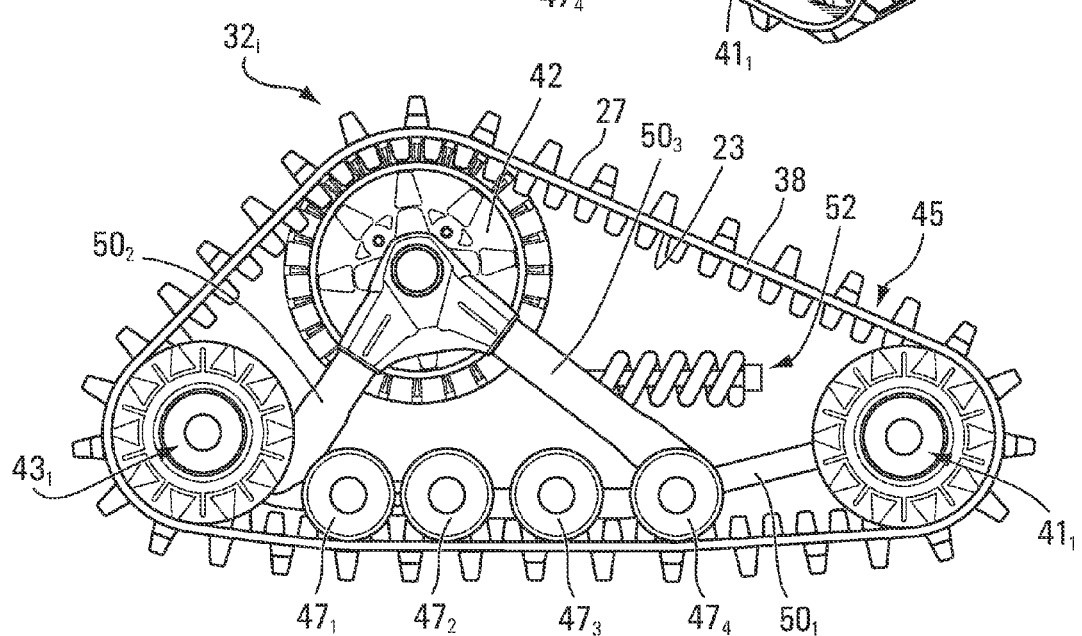
Figure 5:
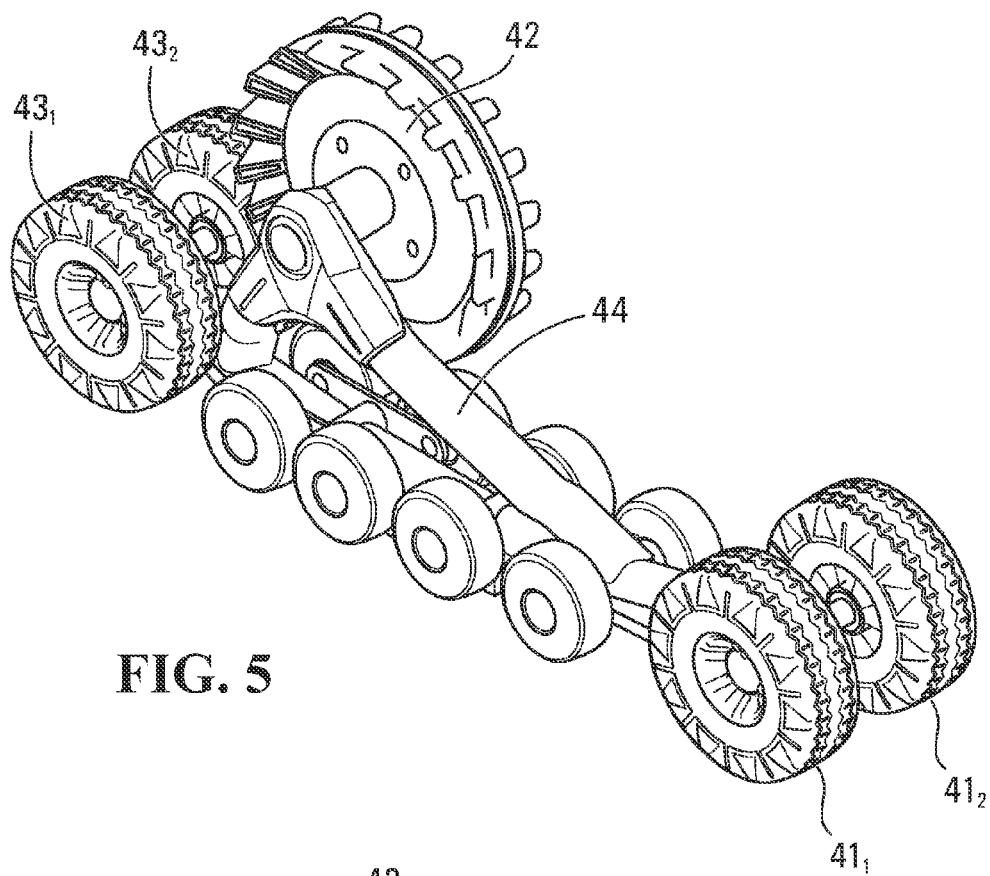
FIGS. 5 and 6 show the track assembly with its endless track removed.
Figure 6:
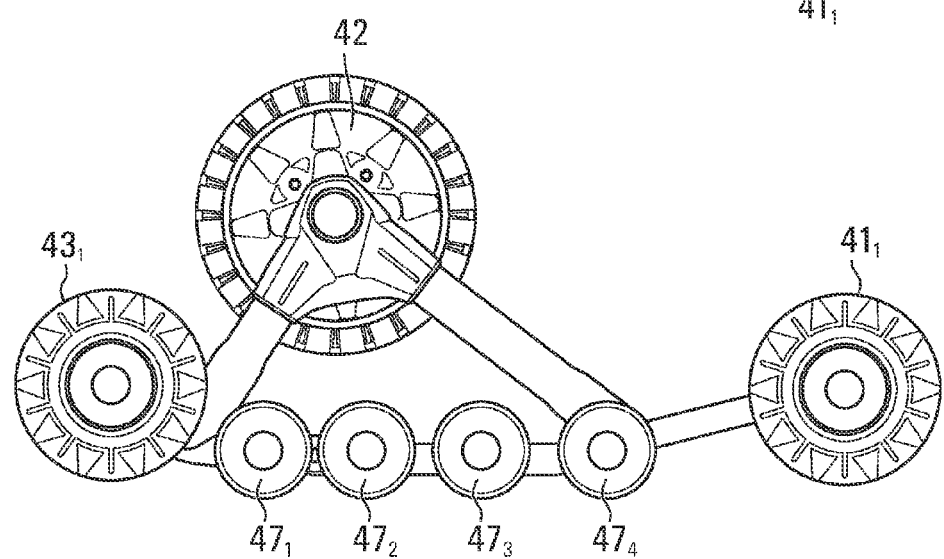

The ground-engaging traction components $16_1$-$16_4$ with which the ATV 10 can be equipped may be a plurality of ground-engaging wheels $30_1$-$30_4$ as in FIGS. 1A and 1B or a plurality of ground-engaging track assemblies $32_1$-$32_4$ as in FIGS. 2A and 2B. By being equippable (i.e., capable of being equipped) with either the wheels $30_1$-$30_4$ or the track assemblies $32_1$-$32_4$, the ATV 10 is better able to adapt itself to an environment in which it is used. For example, the ATV 10 may be equipped with the wheels $30_1$-$30_4$ in an environment (e.g., a trail, a relatively hard soil, etc.) where they provide adequate floatation and traction, whereas the ATV 10 may be equipped with the track assemblies $32_1$-$32_4$ in an environment (e.g., snow, ice, mud, sand, marsh, etc.) where the wheels $30_1$-$30_4$ would not provide adequate floatation and traction possibly resulting in the ATV 10 bogging down or getting stuck. In other words, the ATV 10 may be equipped with the track assemblies $32_1$-$32_4$ to enhance its floatation and traction compared to when it is equipped with the wheels $30_1$-$30_4$.

As further discussed below, the ATV 10 is designed to facilitate its use whether it is equipped with the wheels $30_1$-$30_4$ or the track assemblies $32_1$-$32_4$. Specifically, components of the ATV 10, including, in this embodiment, the powertrain 12, the steering system 17, the suspension 15, the braking system 19, and the body 21, have features which take into account that the ATV 10 can be equipped with either the wheels $30_1$-$30_4$ or the track assemblies $32_1$-$32_4$.

1 Wheels

Each wheel $30_i$ engages the ground and is rotatable about an axle of the ATV 10 to provide traction to the ATV 10. In this embodiment, each wheel $30_i$ comprises a hub 31, a rim 33, and a tire 35. In various cases, the tire 21 may be pneumatic or solid and may be made of rubber and/or other materials (e.g., metals, plastics, or composites). The wheels $30_1$-$30_4$ may be configured in various other ways in various embodiments.

2. Track Assemblies

Each track assembly $32_i$ engages the ground and is mountable to an axle of the ATV 10 to provide traction to the ATV 10. As shown in FIGS. 3 to 6, in this embodiment, the track assembly $32_i$ comprises a frame 44, a plurality of wheels which includes a drive wheel 42, a pair of front idler wheels $43_1$, $43_2$, a pair of rear idler wheels $41_1$, $41_2$, and a plurality of support wheels $47_1$-$47_R$, and an endless track 45 disposed around these wheels.

The endless track 45 engages the ground to provide traction to the ATV 10. The track 45 has an inner side 23 facing the wheels 42, $41_1$, $41_2$, $43_1$, $43_2$, $47_1$-$47_R$ and a ground-engaging outer side 27 opposite the inner side 23 and engaging the ground on which the ATV 10 travels. In this embodiment, the inner side 23 comprises a plurality of drive projections (sometimes referred to as "drive lugs") that are spaced apart along a longitudinal direction of the track assembly $32_i$ and that interact with the drive wheel 42 in order to cause the track 45 to be driven. The ground-engaging outer side 27 comprises a plurality of traction projections (sometimes referred to as "traction lugs" or "traction profiles") that are spaced apart along the longitudinal direction of the track assembly $32_i$ and engage the ground to enhance traction.

In this embodiment, the track 45 comprises an elastomeric body 38 underlying its inner side 23 and its ground-engaging outer side 27. In view of its underlying nature, the elastomeric body 38 can be referred to as a "carcass". The carcass 38 is elastomeric in that it comprises elastomeric material that allows the track 45 to elastically change in shape as it is in motion around the wheels 42, $41_1$, $41_2$, $43_1$, $43_2$, $47_1$-$47_R$. The elastomeric material can be any polymeric material with suitable elasticity. In this embodiment, the elastomeric material includes rubber. Various rubber compounds may be used and, in some cases, different rubber compounds may be present in different areas of the track 45. In other embodiments, the elastomeric material may include another elastomer in addition to or instead of rubber (e.g., polyurethane elastomer). Also, in this embodiment, the track 45 comprises a layer of reinforcing longitudinal cables and a layer of reinforcing fabric embedded in the elastomeric material.

The drive wheel 42 is rotatable about an axle using power delivered by the powertrain 12 for driving the track 45 to propel the ATV 10 on the ground. In this embodiment, the drive wheel 42 comprises a drive sprocket that engages the drive projections of the inner side 23 of the track 45 in order to impart motion to the track 45.

The idler wheels $41_1$, $41_2$, $43_1$, $43_2$, and the support wheels $47_1$-$47_R$ do not convert power supplied by the powertrain 12 to motive force, but are rather used to do at least one of supporting part of a weight of the ATV 10 on the ground, guide the track 45 as it is driven by the drive wheel 42, and maintain the track 45 under tension. The support wheels $47_1$-$47_R$ roll on the inner side 23 of the track 45 along a bottom run of the track 45 to apply this bottom run on the ground.

The frame 44 supports components of the track assembly $32_i$, including the idler wheels $41_1$, $41_2$, $43_1$, $43_2$ and the support wheels $47_1$-$47_R$. More particularly, in this embodiment, the frame 44 comprises three (3) frame members $50_1$-$50_3$ arranged in a generally triangular configuration, with each of the idler wheels $41_1$, $41_2$, $43_1$, $43_2$, and the support wheels $47_1$-$47_R$ being mounted to the frame member $50_1$. Each of the support wheels $47_1$-$47_R$ may be directly rotatably mounted to the frame member $50_1$ or may be rotatably mounted to a link which is rotatably mounted to the frame member $50_1$ and to which is rotatably mounted an adjacent one of the wheels $47_1$-$47_R$, thus forming a "tandem".

In this embodiment, the frame 44 is pivotable about a pivot axis to facilitate motion of the track assembly $32_i$ on uneven terrain. In this case, the pivot axis corresponds to the axle on which the drive wheel 42 is mounted. Also, in this embodiment, the track assembly $32_i$ comprises an anti-rotation connector 52 to limit a pivoting movement of the track assembly $32_i$ relative to the frame 11 of the ATV 10. In this case, the anti-rotation connector 52 comprises a spring and a damper and is mounted to a fixed part of the ATV 10 (e.g., the frame 11 or a part fixed on the frame 11) via a mounting bracket.

Although it is configured in a certain way in this embodiment, the track assembly $32_i$ may be configured in various other ways in other embodiments.

For example, the track 45 may be constructed in various other ways in other embodiments. For instance, in some embodiments, the track 45 may comprise a plurality of parts (e.g., rubber sections) interconnected to one another to form an endless belt, may comprise drive holes that interact with the drive wheel 42 in order to cause the track 45 to be driven, and/or its ground-engaging outer side 27 may comprise various patterns of traction projections.

As another example, the drive wheel 42 may be configured in various other ways in other embodiments. For example, in embodiments where the track 45 comprises drive holes, the drive wheel 42 may have teeth that enter these drive holes in order to drive the track 45. As another alternative, in some embodiments, the drive wheel 42 may frictionally engage the inner side 23 of the track 45 in order to frictionally drive the track 45.

Also, different ones of the track assemblies $32_1$-$32_4$ may be configured differently. For example, front ones of the track assemblies $32_1$-$32_4$ may be shorter and have a greater "angle of attack" at its front idler wheels $43_1$, $43_2$ than rear ones of the track assemblies $32_1$-$32_4$.

3. Powertrain

The powertrain 12 is configured for generating motive power and transmitting motive power to the ground-engaging traction components $16_1$-$16_4$ to propel the ATV 10 on the ground.

Figure 7:
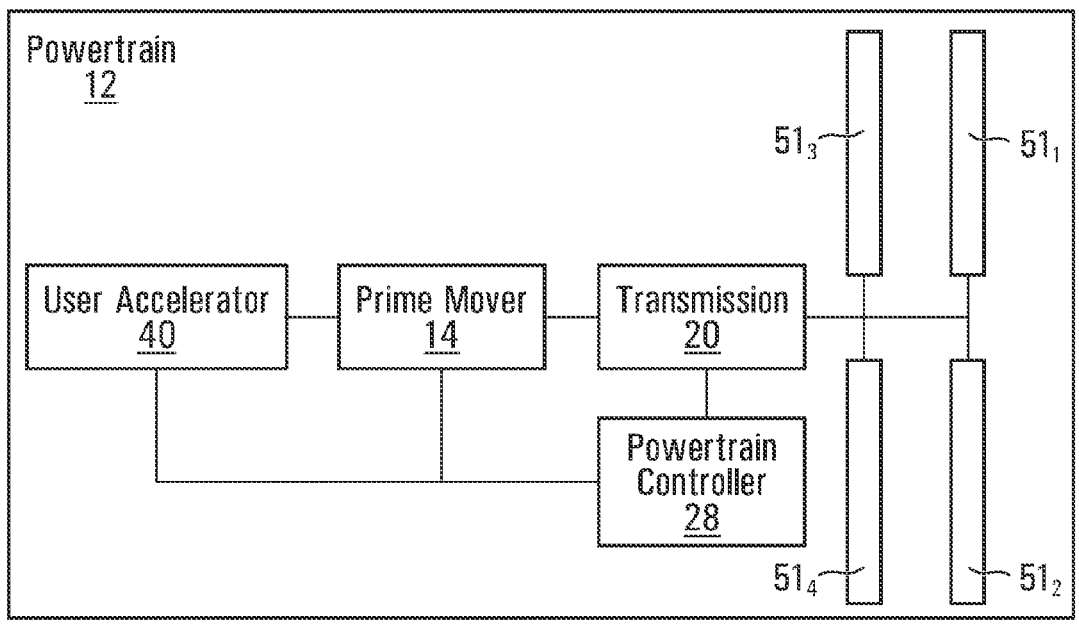
FIG. 7 shows a powertrain of the ATV.

With additional reference to FIG. 7, the powertrain 12 comprises a prime mover 14 for generating motive power to propel the ATV 10. The prime mover 14 is a source of motive power that comprises one or more motors (e.g., an internal combustion engine, an electric motor, etc.). For example, in this embodiment, the prime mover 14 comprises an internal combustion engine.

The prime mover 14 is in a driving relationship with the ground-engaging traction components $16_1$-$16_4$. That is, the powertrain 12 transmits motive power from the primer mover 14 to the ground-engaging traction components $16_1$-$16_4$ in order to drive (i.e., impart motion of) the ground-engaging traction components $16_1$-$16_4$. More particularly, in this embodiment, the powertrain 12 comprises a plurality of final drive axles $51_1$-$51_4$ to which are mounted respective ones of the ground-engaging traction components $16_1$-$16_4$. In some cases, two (2) of the final drive axles $51_1$-$51_4$ may constitute a single common axle (e.g., two (2) front ones the final drive axles $51_1$-$51_4$ may constitute a single common front axle, and/or two (2) rear ones the final drive axles $51_1$-$51_4$ may constitute a single common rear axle). Each final drive axle $51_i$ delivers motive power from the powertrain 12 to a ground-engaging traction component $16_i$ that is mounted to it. Specifically, in this embodiment, when a wheel $30_i$ is mounted to a final drive axle $51_i$, rotation of the final drive axle $51_i$ by the powertrain 12 causes rotation of the wheel $30_i$. Conversely, when the drive wheel 42 of a track assembly $32_i$ is mounted to a final drive axle $51_i$, rotation of the final drive axle $51_i$ by the powertrain 12 causes rotation of the drive wheel 42, which imparts motion to the track 45 of the track assembly $32_i$.

The powertrain 12 may transmit power from the prime mover 14 to the final drive axles $51_1$-$51_4$ in various ways. In this embodiment, the powertrain 12 comprises a transmission 20 between the prime mover 14 and the final drive axles $51_1$-$51_4$ for transmitting motive power from the primer mover 14 to the ground-engaging traction components $16_1$-$16_4$. In this embodiment, the transmission 20 is an automatic transmission (e.g., a continuously variable transmission (CVT)).

The powertrain 12 facilitates use of the ATV 10 whether the ATV 10 is equipped with the wheels $30_1$-$30_4$ or the track assemblies $32_1$-$32_4$. Specifically, the powertrain 12 has powertrain characteristics, such as characteristics of the prime mover 14 (e.g., a power output of the prime mover 14) and/or characteristics of the transmission 20 (e.g., a transmission state of the transmission 20), which take into account that the ATV 10 can be equipped with either the wheels $30_1$-$30_4$ or the track assemblies $32_1$-$32_4$. This can be achieved in various ways in various embodiments.

A. Powertrain Operates in Different Modes Depending on Whether ATV is Equipped with Wheels or Track Assemblies In this embodiment, the powertrain 12 is operable in a plurality of modes depending on whether the ATV 10 is equipped with the wheels $30_1$-$30_4$ or the track assemblies $32_1$-$32_4$. Specifically, in this embodiment, the powertrain 12 is operable in a first mode when the ATV 10 is equipped with the wheels $30_1$-$30_4$ (hereinafter referred to as a "wheel mode") and in a second mode when the ATV 10 is equipped with the track assemblies $32_1$-$32_4$ (hereinafter referred to as a "track mode").

The powertrain 12 operates differently in the track mode than in the wheel mode, i.e., at least one component (e.g., the prime mover 14 and/or the transmission 20) of the powertrain 12 operates in a first manner in the wheel mode and in a second manner, different from the first manner, in the track mode. Basically, at least one powertrain characteristic is different or is controlled differently by the powertrain 12 depending on whether the ATV 10 is equipped with the wheels $30_1$-$30_4$ or the track assemblies $32_1$-$32_4$.

As shown in FIG. 7, in this embodiment, the powertrain 12 comprises a powertrain controller 28 for controlling operation of the powertrain 12. More particularly, in this embodiment, the powertrain controller 28 is an electronic controller that comprises suitable hardware and/or software (e.g., firmware) configured to implement its functionality.

Figure 8:
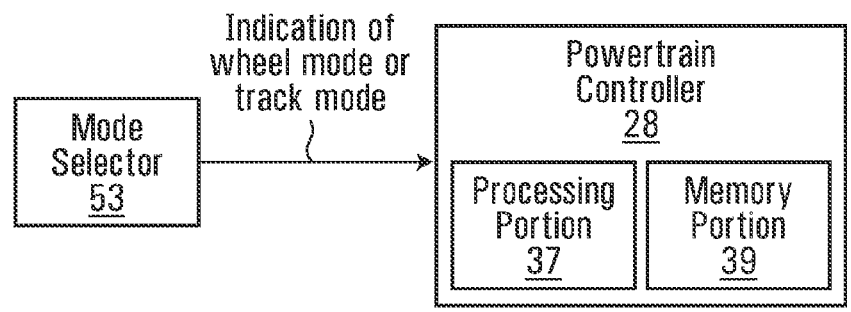
FIG. 8 shows a powertrain controller and a mode selector of the ATV.

With additional reference to FIG. 8, the powertrain controller 28 comprises an interface 29, a processing portion 37, and a memory portion 39.

The interface 29 allows the powertrain controller 28 to receive inputs from and release outputs to other components of the ATV 10 to which the powertrain controller 28 is connected (i.e., directly or indirectly connected to), including, in this embodiment, the prime mover 14, the transmission 20, the accelerator 40 and/or other components of the user interface 18, and one or more sensors (e.g., a throttle position sensor; a prime mover speed sensor, i.e., a sensor sensing a speed of the prime mover 14; an ATV speed sensor, i.e., a sensor sensing a speed of the ATV 10 on the ground; a prime mover temperature sensor; an outside environment temperature sensor; etc.).

The processing portion 37 comprises one or more processors for performing processing operations that implement functionality of the powertrain controller 28. A processor of the processing portion 37 may be a general-purpose processor executing program code stored in the memory portion 39. Alternatively, a processor of the processing portion 37 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 39 comprises one or more memories for storing program code executed by the processing portion 37 and/or data used during operation of the processing portion 37. A memory of the memory portion 39 may be a semiconductor memory (e.g., read-only memory (ROM) and/or random-access memory (RAM)), a magnetic storage medium, an optical storage medium, and/or any other suitable type of memory.

Figure 9:
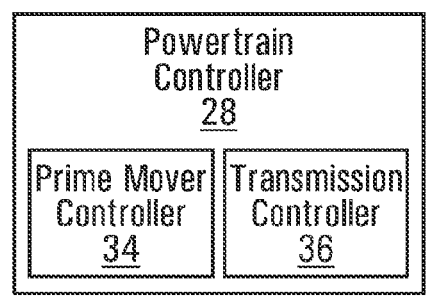
FIG. 9 shows components of the powertrain controller.

More particularly, in this embodiment, as shown in FIG. 9, the powertrain controller 28 comprises a prime mover controller 34 and a transmission controller 36. For instance, in this embodiment in which the prime mover 14 is an internal combustion engine and the transmission 20 is an automatic transmission, the prime mover controller 34 may be an engine control unit (ECU) and the transmission controller 36 may be a transmission control unit (TCU). Such ECUs and TCUs are well understood by those skilled in the art. In some cases, the powertrain controller 28 may be a distributed controller in which the prime mover controller 34 and the transmission controller 36 are physically distinct from one another and may be connected to one another via a bus (e.g., a controller-area network (CAN) bus or other suitable bus). In other cases, the prime mover controller 34 and the transmission controller 36 may be functional entities of a single physical control module (e.g., a powertrain control module (PCM)).

The prime mover controller 34 is configured to control operation of the prime mover 14. Specifically, the prime mover controller 34 is configured to control one or more prime mover characteristics.

For example, in this embodiment, one prime mover characteristic controlled by the prime mover controller 34 is a power output of the prime mover 14. The power output of the prime mover 14 refers to the power currently generated by the prime mover 14. It can be evaluated as a torque produced by the prime mover 14 multiplied by a speed (i.e., a rotational speed) of the prime mover 14 (e.g., revolutions per minute (RPM)) at a given instant.

The prime mover controller 34 controls the power output of the prime mover 14 based on inputs from various entities, such as: the accelerator 40 and/or one or more other components of the user interface 18; one or more sensors (e.g., a throttle position sensor, an air-fuel ratio sensor, a prime mover speed sensor, an ATV speed sensor, a temperature sensor, a pressure sensor, etc.); one or more other controllers (e.g., the transmission controller 36); and/or other entities.

Various operational aspects of the prime mover 34 may be controlled to control the power output of the prime mover 14. For example, in this embodiment where the prime mover 14 is an internal combustion engine, the prime mover controller 34 may control one or more of: a fuel injection aspect which relates to an amount of fuel to be injected (e.g., a time and/or duration of opening of a fuel injector, an air-fuel ratio, etc.); an ignition timing aspect, which relates to timing of a spark in a combustion chamber (e.g., a time at which the spark will occur relative to a piston position and a crankshaft angular velocity, a "timing advance", etc.); a valve timing aspect, which relates to timing of valves being opened and closed (e.g., in cases where the internal combustion engine has variable valve timing); and/or any other operational aspect of the prime mover 14 that is controllable. The prime mover controller 34 may thus control the power output of the prime mover 14, for instance, by causing specific amounts of fuel to be injected and sparks to be ignited at specific instants, based on inputs from a throttle position sensor, an air-fuel ratio sensor, a prime mover speed sensor, the accelerator 40, and/or the transmission controller 36.

Another example of a prime mover characteristic that may be controlled by the prime mover controller 34 is a temperature of the prime mover 14. For instance, in this embodiment, the temperature of the prime mover 14 may be regulated by a cooling system of the ATV 10. The cooling system may comprise a radiator and a thermostat between the prime mover 14 and the radiator. The radiator is a heat exchanger used to transfer thermal energy from a coolant in the cooling system to the ATV's environment. A fan of the radiator may be controlled to vary an amount of air with which heat can be exchanged. The thermostat operates to maintain the temperature of the prime mover 14 by controlling a valve that increases or decreases flow of the coolant in the cooling system. Various types of thermostats may be used. For example, the thermostat may be a purely mechanical thermostat (e.g., a thermally expandable element (e.g., a wax element) expands or contracts based on temperature to move a piston or other actuator opening and closing the valve) or an electronic thermostat (e.g., a rod or other actuator is controlled to change a volume of a chamber of the thermally expendable element such that the temperature dependence of the valve opening is adjustable). Also, in this embodiment, the temperature of the prime mover 14 may be regulated by controlling one or more of a fuel injection aspect, an ignition timing aspect, a valve timing aspect, and/or any other operational aspect of the prime mover 14 that is controllable. The prime mover controller 34 may thus control the temperature of the prime mover 14 by controlling the cooling system of the ATV 10 (e.g., a greater speed of the radiator's fan to increase air flow and/or a greater opening size of the valve linked to the thermostat to increase coolant flow to cool the prime mover 14), and/or by causing specific amounts of fuel to be injected and/or ignitions to take place.

To control prime mover characteristics such as the power output of the prime mover 14 and the temperature of the prime mover 14, in this embodiment, the prime mover controller 34 comprises a program stored in the memory portion 39 and executed by the processing portion 37. For example, the program may determine the power output of the prime mover 14 by performing computations based on inputs from a throttle position sensor, an air-fuel ratio sensor, a prime mover speed sensor, the accelerator 40, and/or the transmission controller 36. Similar computations may be done in respect of the temperature of the prime mover 14 and/or other prime mover characteristics. In some cases, certain operations of the program may refer to reference data stored in the memory portion 39. This reference data comprises data representative of one or more maps, tables, curves or other sets of reference values that are used during execution of the program of the prime mover controller 34. For instance, the reference data may associate different values of certain parameters of the prime mover 14 (e.g., the speed, temperature, air-fuel ratio, pressure, etc. of the prime mover 14) to corresponding values of fuel injection, ignition timing, valve timing, and/or other parameters of the prime mover 14 (e.g., a fuel map, an injection map, a boost map, and/or other performance map). The reference data may also associate different values of certain parameters of the prime mover 14 (e.g., the speed, temperature, air-fuel ratio, pressure, etc. of the prime mover 14) to corresponding values of certain parameters of the cooling system (e.g., a speed of the radiator's fan, a position or other condition of the thermostat controlling an opening size of the valve in the cooling system, etc.). Such programs and reference data are well-understood by those skilled in the art and will therefore not be discussed in further detail.

The transmission controller 36 is configured to control operation of the transmission 20. Specifically, the transmission controller 36 is configured to control one or more transmission characteristics. For example, in this embodiment, the transmission controller 36 controls a transmission state of the transmission 20. The transmission state of the transmission 20 can be defined in terms of (i) a transmission ratio of the transmission 20, which is the ratio that the transmission 20 currently applies between its input and its output, and/or (ii) an output direction of the transmission 20, which refers to a direction of motion (i.e., forward or reverse) of the output of the transmission 20 that allows the ATV 10 to advance or back up. At a given instant, the transmission state of the transmission 20 is one of a set of available transmission states. The set of available transmission states can comprise a number of available transmission ratios that can be applied by the transmission 20. This number may be a finite number (e.g., two, three, four or any other finite number) of available transmission ratios, or an infinite number of available transmission ratios (e.g., in embodiments where the transmission 20 comprises a CVT).

The transmission controller 36 controls the transmission state of the transmission 20 based on inputs from various entities, such as: the accelerator 40 and/or one or more other components (e.g., a gear shift stick or pedal) of the user interface 18; one or more sensors (e.g., a throttle position sensor, a shift lever sensor, a prime mover speed sensor, an ATV speed sensor, a temperature sensor, etc.); one or more other controllers (e.g., the prime mover controller 34); and/or other entities.

Various operational aspects of the transmission 20 may be controlled to control the transmission state of the transmission 20. For example, the transmission controller 36 may control one or more of: a shift actuation aspect, which relates to activation of a shift actuator (e.g., a shift solenoid) to change gears; a pressure control aspect, which relates to activation of a pressure control element (e.g., a pressure control solenoid) to control pressure in the transmission 20; and/or any other operational aspect of the transmission 20 that is controllable. The transmission controller 36 may thus control the transmission state of the transmission 20, for instance, by activating a shift actuator and/or a pressure control element at a specific instant, based on inputs from a throttle position sensor, a shift lever sensor, a prime mover speed sensor, an ATV speed sensor, the accelerator 40 and/or other components of the user interface 18, and/or the prime mover controller 34.

To control the state of the transmission 20, in this embodiment, the transmission controller 36 comprises a program stored in the memory portion 39 and executed by the processing portion 37. For example, the program may determine when and how to shift between different transmission ratios of the transmission 20 by performing certain computations based on inputs from a throttle position sensor, a prime mover speed sensor, an ATV speed sensor, the accelerator 40 and/or other components of the user interface 18, and/or the prime mover controller 34. In some cases, certain operations of the program may refer to reference data stored in the memory portion 39. This reference data comprises data representative of one or more maps, tables, curves or other sets of reference values that are used during execution of the program of the transmission controller 36. For instance, the reference data may associate different values of the speed of the prime mover 14 and of the speed of the ATV 10 to corresponding transmission ratios of the transmission 20. Such programs are well-understood by those skilled in the art and will therefore not be discussed in further detail.

As mentioned above, in this embodiment, the powertrain 12 operates differently in its track mode (i.e., when the ATV 10 is equipped with the track assemblies $32_1$-$32_4$) than in its wheel mode (i.e., when the ATV 10 is equipped with the wheels $30_1$-$30_4$).

For example, in some embodiments, the prime mover 14 may operate differently in the track mode than in the wheel mode.

The prime mover controller 34 may control the power output of the prime mover 14 differently in the track mode than in the wheel mode. For instance, in some embodiments:

i. A response of the prime mover 14 to user input at the accelerator 40 may be different in the track mode than in the wheel mode. More particularly, a functional dependency of the power output of the prime mover 14 on user input at the accelerator 40 may be different in the track mode than in the wheel mode. This "user input dependency" of the power output of the prime mover 14 refers to a relationship between (1) the power output of the prime mover 14 and (2) input from the accelerator 40 operated by the user and/or from a powertrain component responsive to input at the accelerator 40. For instance, in this embodiment in which the prime mover 14 is an internal combustion engine, the accelerator 40 is a throttle lever which is operated by the user and controls a throttle of the prime mover 14. The user input dependency of the power output of the prime mover 14 (a form of "throttle response" in this case) refers to a relationship between (1) the power output of the prime mover 14 and (2) input from the throttle lever 40 operated by the user and/or from a throttle position sensor which senses the position of the throttle (e.g., in a throttle-by-wire system). For example, in some cases, the user input dependency of the power output of the prime mover 14 may be defined in terms of certain values that the speed of the prime mover 14 should have for certain inputs from the throttle lever 40 and/or from the throttle position sensor.

For example, for a given input from the accelerator 40 operated by the user and/or from a powertrain component (e.g., a throttle position sensor) responsive to input at the accelerator 40, the power output of the prime mover 14 in the track mode may be different from the power output of the prime mover 14 in the wheel mode. In some cases, for the given input, the power output of the prime mover 14 may be greater in the track mode than in the wheel mode. In other cases, for the given input, the power output of the prime mover 14 may be lower in the track mode than in the wheel mode.

ii. An idle speed of the prime mover 14 may be different in the track mode than in the wheel mode. The idle speed of the prime mover 14 is the speed at which the prime mover 14 runs when the powertrain 12 does not transmit motive power to the ground-engaging traction components $16_1$-$16_4$.

For instance, in this embodiment, the prime mover controller 34 may control the idle speed of the prime mover 14 by keeping the speed of the prime mover 14, when the powertrain 12 does not transmit motive power to the ground-engaging traction components $16_1$-$16_4$, as close as possible to a certain preset value.

There may be a first preset value for the idle speed of the prime mover 14 in the wheel mode and a second preset value, different from the first preset value, for the idle speed of the prime mover 14 in the track mode. In some cases, the preset value for the idle speed of the prime mover 14 in the wheel mode may be lower than the preset value for the idle speed of the prime mover 14 in the track mode. In other cases, the preset value for the idle speed of the prime mover 14 in the wheel mode may be greater than the preset value for the idle speed of the prime mover 14 in the track mode.

iii. A maximum speed of the prime mover 14 may be different in the track mode than in the wheel mode. The maximum speed of the prime mover 14 is the greatest speed at which the prime mover 14 is allowed to run (sometimes referred to as "redline" or "rev. limit").

For instance, in this embodiment, the prime mover controller 34 may control the maximum speed of the prime mover 14 by allowing the speed of the prime mover 14 to reach a certain preset value at which an increase in the speed of the prime mover 14 is limited. Basically, the prime mover controller 34 implements an electronic speed limiter. For example, in this embodiment, the prime mover controller 34 may cut fuel injection and/or spark ignition in the prime mover 14, either in a single cutoff (e.g., a "hard" cutoff) or in a sequence of cutoffs (e.g., a "soft" cutoff before a "hard" cutoff).

There may be a first preset value for the maximum speed of the prime mover 14 in the wheel mode and a second preset value, different from the first preset value, for the maximum speed of the prime mover 14 in the track mode. In some cases, the preset value for the maximum speed of the prime mover 14 in the wheel mode may be lower than the preset value for the maximum speed of the prime mover 14 in the track mode. In other cases, the preset value for the maximum speed of the prime mover 14 in the wheel mode may be greater than the preset value for the maximum speed of the prime mover 14 in the track mode.

iv. An operational region of a torque curve or power curve of the prime mover 14 may be different in the track mode than in the wheel mode. The torque curve of the prime mover 14 represents the torque produced by the prime mover 14 at different speeds of the prime mover 14. Similarly, the power curve of the prime mover 14 represents the output power produced by the prime mover 14 at different speeds of the prime mover 14. The operational region of the torque curve or power curve is a region of the torque curve or power curve, which may be expressed as a range of speeds of the prime mover 14 associated with a range of torque or output power of the prime mover 14, in which the prime mover 14 is allowed to operate. The operational region of the torque curve or power curve may sometimes be referred to as a "torque band" or "power band".

For example, in some embodiments, the operational region of the torque curve or power curve of the prime mover 14 in the track mode may be in a range of speeds lower than the operational region of the torque curve or power curve of the prime mover 14 in the wheel mode. This may be such that the torque of the prime mover 14 in the track mode reaches a greater value than the torque of the prime mover 14 in the wheel mode. This may also be such that the torque of the prime mover 14 increases with speed over at least part of the range of speeds of the prime mover 14 in the track mode, while the torque of the prime mover 14 increases less, does not increase or decreases with speed over at least part of the range of speeds of the prime mover 14 in the wheel mode. That is, a gradient (slope) of the operational region of the torque curve of the prime mover 14 in the track mode (i.e., a change in torque due to an increase in speed) is greater than a gradient of the operational region of the torque curve of the prime mover 14 in the track mode. Thus, for a given increase in speed of the prime mover 14 (e.g., an increase of 500 rpm), an increase in torque of the prime mover 14 in the track mode is greater than any increase in torque of the prime mover 14 in the wheel mode.

In other embodiments, the operational region of the torque curve or power curve of the prime mover 14 in the track mode may be in a range of speeds higher than the operational region of the torque curve or power curve of the prime mover 14 in the wheel mode.

v. A torque curve or power curve of the prime mover 14 in the track mode may be different from a torque curve or power curve of the prime mover 14 in the wheel mode. For instance, this may be achieved by different settings of ignition timing, fuel injection and/or valve timing parameters, such to modify the shape of the torque curve or power curve of the prime mover 14.

For example, in some embodiments, the torque curve of the prime mover 14 may differ in the track mode and in the wheel mode such that, for a given speed of the prime mover 14, the torque of the prime mover 14 in the track mode is different from the torque of the prime mover 14 in the wheel mode. For instance, in some cases, for the given speed of the prime mover 14, the torque of the prime mover 14 in the track mode may be greater than the torque of the prime mover 14 in the wheel mode. In other cases, for the given speed of the prime mover 14, the torque of the prime mover 14 in the track mode may be less than the torque of the prime mover 14 in the wheel mode.

The torque curve of the prime mover 14 may also differ in the track mode and in the wheel mode such that, for a given change in speed of the prime mover 14, a change in torque of the prime mover 14 in the track mode is different from a change in torque of the prime mover 14 in the wheel mode. For instance, in some cases, for the given change in speed of the prime mover 14, the change in torque of the prime mover 14 in the track mode may be greater than the change in torque of the prime mover 14 in the wheel mode. In other cases, for the given change in speed of the prime mover 14, the change in torque of the prime mover 14 in the track mode may be less than the change in torque of the prime mover 14 in the wheel mode.

As another example, in some embodiments, the power curve of the prime mover 14 may differ in the track mode and in the wheel mode such that, for a given speed of the prime mover 14, the power output of the prime mover 14 in the track mode is different from the power output of the prime mover 14 in the wheel mode. For instance, in some cases, for the given speed of the prime mover 14, the power output of the prime mover 14 in the track mode may be greater than the power output of the prime mover 14 in the wheel mode. In other cases, for the given speed of the prime mover 14, the power output of the prime mover 14 in the track mode may be less than the power output of the prime mover 14 in the wheel mode.

The power curve of the prime mover 14 may also differ in the track mode and in the wheel mode such that, for a given change in speed of the prime mover 14, a change in power output of the prime mover 14 in the track mode is different from a change in power output of the prime mover 14 in the wheel mode. For instance, in some cases, for the given change in speed of the prime mover 14, the change in power output of the prime mover 14 in the track mode may be greater than the change in power output of the prime mover 14 in the wheel mode. In other cases, for the given change in speed of the prime mover 14, the change in power output of the prime mover 14 in the track mode may be less than the change in power output of the prime mover 14 in the wheel mode.

The prime mover controller 34 may control the temperature of the prime mover 14 differently in the track mode than in the wheel mode. For instance, in some embodiments:

i. For a given condition of the ATV 10, the temperature of the prime mover 14 may be different in the track mode than in the wheel mode. A given condition of the ATV 10 may be defined in terms of one or more parameters, such as a given speed of the prime mover 14, a given speed of the ATV 10 on the ground, a given outside temperature of the ATV's environment, etc. For example, for a given condition of the ATV 10, the temperature of the prime mover 14 may be lower in the track mode than in the wheel mode.

ii. An operational temperature range of the prime mover 14 may be different in the track mode than in the wheel mode. The operational temperature range refers to a temperature range in which the temperature of the prime mover 14 is to be maintained when the prime mover 14 is operated in steady-state after start-up. For instance, a lowest operational temperature of the prime mover 14 (i.e., the lowest value of the operational temperature range) may be lower in the track mode than in the wheel mode. Basically, the prime mover 14 may be kept cooler in the track mode than in the wheel mode.

iii. A cooling process of the prime mover 14 may be different in the track mode than in the wheel mode. For example, in some embodiments, a rate of cooling of the prime mover 14 by the cooling system of the ATV 10 may be different in the track mode than in the wheel mode. For instance, when the prime mover 14 is operated in steady-state after start-up, the rate of cooling of the prime mover 14 by the cooling system of the ATV 10 may be greater in the track mode than in the wheel mode (e.g., a greater speed of the radiator's fan to increase air flow and/or a greater opening size of the valve linked to the thermostat to increase coolant flow to cool the prime mover 14).

iv. A warm-up process of the prime mover 14 may be different in the track mode than in the wheel mode. The warm-up process is a process by which the temperature of the prime mover 14 increases upon start-up of the prime mover 14. For example, the warm-up process may be faster (i.e., the temperature of the prime mover 14 is increased at a greater rate) in the track mode than in the wheel mode (e.g., if the ATV 10 is expected to be used in the track mode in winter, and used in the wheel mode in summer). As another example, the warm-up process may reach a higher temperature in the track mode than in the wheel mode.

As another example, in some embodiments, the transmission 20 may operate differently in the track mode than in the wheel mode.

The transmission controller 36 may control the transmission state of the transmission 20 differently in the track mode than in the wheel mode. For instance, in some embodiments:

i. A shifting scheme of the transmission 20 may be different in the track mode than in the wheel mode. More particularly, in this embodiment in which the transmission 20 is an automatic transmission, the shifting scheme specifies when and how to shift between different transmission ratios. The shifting scheme refers to one or more shift points of the transmission 20. A shift point is a point at which a shift (i.e., an up-shift or a down-shift) between two transmission ratios of the transmission 20 is to occur. A shift point may be defined in terms of one or more parameters (e.g., the speed of the prime mover 14, the speed of the ATV 10, etc.).

Shift points at which occur shifts between transmission ratios of the transmission 20 may be different in the track mode than in the wheel mode. For example, a shift point between two given transmission ratios may occur in the wheel mode when the speed of the prime mover 14 has a certain value and/or the speed of the ATV 10 has a certain value, but the shift point between these two given transmission ratios may occur in the track mode when the speed of the prime mover 14 has another value and/or the speed of the ATV 10 has another value.

ii. For a given condition of the ATV 10, the transmission ratio of the transmission 20 in the track mode may be different from the transmission ratio of the transmission 20 in the wheel mode. A given condition of the ATV 10 may be defined in terms of one or more parameters, such as a given speed of the prime mover 14, a given speed of the ATV 10 on the ground, a given instantaneous fuel consumption of the ATV 10, etc. In some cases, for a given condition of the ATV 10, the transmission ratio of the transmission 20 in the track mode may be greater than the transmission ratio in the wheel mode. In other cases, for a given condition of the ATV 10, the transmission ratio of the transmission 20 in the track mode may be lower than the transmission ratio in the wheel mode.

For example, in some embodiments, for a given condition of the ATV 10, say a given speed of the prime mover 14, the transmission ratio of the transmission 20 in the track mode may be different from the transmission ratio of the transmission 20 in the wheel mode such that there is more torque at the output of the transmission 20 in the track mode than in the wheel mode.

iii. The set of available transmission states may be different in the track mode than in the wheel mode. For instance, in some cases, the set of available transmission ratios of the transmission 20 in the track mode may include one or more ratios that are lower than the set of available transmission ratios in the wheel mode. In other cases, the set of available transmission ratios of the transmission 20 in the track mode may include one or more ratios that are higher than the set of available transmission ratios in the wheel mode.

In some embodiments, the transmission 20 may have one or more transmission ratios dedicated to the wheel mode and/or one or more transmission ratios dedicated to the track mode. A transmission ratio dedicated to the wheel mode is a transmission ratio that is available (i.e., that the transmission 20 can apply) in the wheel mode but that is unavailable (i.e., that the transmission 20 cannot apply) in the track mode. Conversely, a transmission ratio dedicated to the track mode is a transmission ratio that is available (i.e., that the transmission 20 can apply) in the track mode but that is unavailable (i.e., that the transmission 20 cannot apply) in the wheel mode.

One or more dedicated transmission ratios may be provided for the forward direction of the transmission 20 (i.e., when the ATV 10 advances.).

Alternatively or additionally, one or more dedicated transmission ratios may be provided for the reverse direction of the transmission 20 (i.e., when the ATV 10 backs up). For instance, there may be a single transmission ratio for the reverse direction of the transmission 20 in the wheel mode, but two (2) or more transmission ratios for the reverse direction of the transmission 20 in the track mode.

Another example of a powertrain characteristic that may be controlled differently in the track mode than in the wheel mode is traction control of the ATV 10. More particularly, in some embodiments, the ATV 10 may comprise a traction control system (TCS) that aims to prevent loss of traction of the driven ground-engaging traction components $16_1$-$16_4$ when excessive throttle is applied by the driver and the condition of the ground surface is unable to cope with the torque applied. For example, the powertrain controller 28 may implement the TCS by monitoring sensors (e.g., a wheel speed sensor sensing a rotational speed of a wheel $30_i$ or the driving wheel of a track assembly $32_i$, an ATV speed sensor, etc.) to detect a loss of traction at a given ground-engaging traction components $16_i$ and by causing certain actions to be performed, such as modifying the power output of the prime mover 14 (e.g., by retarding or suppressing the spark and/or reducing fuel supply to one or more cylinders, closing the throttle if it is a drive-by-wire throttle, etc.) and/or causing the braking system 19 to apply one or more brakes.

The powertrain controller 28 may control the TCS differently in the track mode than in the wheel mode. For example, in some cases, the powertrain controller 28 may disable the TCS in the track mode. In other cases, a particular condition of the ATV 10 (e.g., a particular difference in rotational speeds of two or more of the wheels $30_1$-$30_4$ or the driving wheels 42 of two or more of the track assemblies $32_1$-$32_4$, and a particular speed of the ATV 10 on the ground) which triggers a specific TCS action (e.g., modification of the output of the prime mover 14, and/or application of a braking force by the braking system 19) in the wheel mode may not trigger this TCS action in the track mode, or vice versa. In yet other cases, for a given condition of the ATV 10 (e.g., a given difference in rotational speeds of two or more of the wheels $30_1$-$30_4$ or the driving wheels of two or more of the track assemblies $32_1$-$32_4$, and a given speed of the ATV 10 on the ground), the powertrain controller 28 may cause the power output of the prime mover 14 and/or a braking force applied by the braking system 19 to be different (e.g., higher or lower) in the track mode than in the wheel mode. For instance, the TCS may place less "constraint" on the track assemblies $32_1$-$32_4$ than on the wheels $30_1$-$30_4$ due to the enhanced traction of the track assemblies $32_1$-$32_4$.

The ability of the powertrain 12 to operate differently in its track mode than its wheel mode facilitates use of the ATV 10 whether the ATV 10 is equipped with the wheels $30_1$-$30_4$ or the track assemblies $32_1$-$32_4$.

For example, in some embodiments, the powertrain 12 may control power delivered to a final drive axle $51_i$ differently depending on whether a wheel $30_i$ or a track assembly $32_i$ is mounted to the final drive axle $51_i$. The power delivered to the final drive axle $51_i$ can be viewed as a rotational speed of the final drive axle $51_i$ multiplied by a torque applied to the final drive axle $51_i$. Thus, the powertrain 12 may control the rotational speed of the drive axle $51_i$ and/or the torque applied to the final drive axle $51_i$ differently depending on whether the wheel $30_i$ or the track assembly $32_i$ is mounted to the drive axle $51_i$. This may be achieved in various ways in various embodiments, such as by controlling the power output of the prime mover 14 differently in the track mode than in the wheel mode and/or controlling the transmission ratio of the transmission 20 differently in the track mode than in the wheel mode, as discussed above.

For instance, in some cases, for a given condition of the ATV 10 (e.g., a given speed of the prime mover 14 and/or a given speed of the ATV 10 on the ground), more torque may be applied to a final drive axle $51_i$ if a track assembly $32_i$ is mounted to the final drive axle $51_i$ than if a wheel $30_i$ is mounted to the final drive axle $51_i$, in order to facilitate driving of the track 45 of the track assembly $32_i$.

Such control of the power delivered to a final drive axle $51_i$ depending on whether a wheel $30_i$ or a track assembly $32_i$ is mounted to the drive axle $51_i$ may allow a maximum speed of the ATV 10 when equipped with the track assemblies $32_1$-$32_4$ to be as close as possible to a maximum speed of the ATV 10 when equipped with the wheels $30_1$-$30_4$. For example, in some embodiments, a ratio of the maximum speed of the ATV 10 when equipped with the track assemblies $32_1$-$32_4$ to the maximum speed of the ATV 10 when equipped with the wheels $30_1$-$30_4$ may be at least 0.65, in some cases at least 0.70, in some cases at least 0.75, and in some cases at least 0.80. By "maximum speed" of the ATV 10, it is meant a maximum speed of the ATV 10 that is sustainable in steady-state during normal operation of the ATV 10.

By having the powertrain 12 operate differently depending on whether the ATV 10 is equipped with the wheels $30_1$-$30_4$ or the track assemblies $32_1$-$32_4$, the performance of the powertrain 12 may be optimized for the specific type of ground-engaging traction components being used by the ATV 10. This may also protect components of the powertrain 12 from being overloaded, overheated or otherwise overused when, for instance, the ATV 10 is equipped with the track assemblies $32_1$-$32_4$.

The difference in operation of the powertrain 12 between the wheel mode and the track mode may be implemented in various ways. For example, in this embodiment, the powertrain controller 28 implements a first control process in the wheel mode and a second control process, different from the first control process, in the track mode. The first control process (in the wheel mode) may be implemented by one or more programs of the powertrain controller 28 (e.g., the program of the prime mover controller 34 and/or the program of the transmission controller 36) performing a certain set of computations (e.g., based on functions, equations, etc.) and/or using certain reference data (e.g., a map, table, curve or other set of reference values), and the second control process (in the track mode) may comprise these one or more programs of the powertrain controller 28 performing a different set of computations and/or using different reference data.

The ATV 10 enables selection of a given one of the wheel mode and the track mode in which the powertrain 12 is to operate. To that end, in this embodiment, the ATV 10 comprises a selector 53 for selecting a given one of the wheel mode and the track mode in which the powertrain 12 is to operate. The selector 53, which will be referred to as a "mode selector", provides an indication of a selected one of the wheel mode and the track mode to the powertrain controller 28, which causes the powertrain 12 to operate in the selected mode.

The mode selector 53 may be implemented in various ways in various embodiments.

For example, in this embodiment, the mode selector 53 comprises a control 54 that is part of the user interface 18. The control 54, which will be referred to as a "mode selection control", is operable by the user to allow the user to select in which of the wheel mode and the track mode the powertrain 12 is to operate.

The mode selection control 54 may comprise a button, a switch, a knob, a lever, and/or any other control element that the user can use to specify in which of the wheel mode and the track mode the powertrain 12 is to operate in. In this embodiment, the mode selection control 54 is provided on the instrument panel 11. The mode selection control 54 may be provided elsewhere on the ATV 10 in other embodiments. In some cases, a button, switch, knob, lever, or other control element of the mode selection control 54 may be a physical control element (e.g., a physical button on the instrument panel 11). In other cases, a button, switch, knob, lever, or other control element of the mode selection control 54 may be a virtual control element. For instance, in embodiments in which the instrument panel 11 comprises a display for displaying a graphical user interface (GUI), the mode control 54 may comprise a graphical button, graphical menu item, or other graphical control element displayed on the GUI.

Upon selection of a given one of the wheel mode and the track mode by the user, the mode selection control 54 provides an indication of the selected mode to the powertrain controller 28. For instance, in this embodiment, the instrument panel 11 transmits a signal indicative of the selected mode to the powertrain controller 28. Based on this signal, the powertrain controller 28 determines that the powertrain 12 is to operate in the selected mode and proceeds to control the powertrain 12 accordingly.

As another example, in some embodiments, instead of or in addition to the mode selection control 54, the mode selector 53 may comprise a sensor 56 for sensing presence of a wheel $30_i$ or a track assembly $32_i$ mounted to a final drive axle $51_i$ of the powertrain 12. The sensor 56, which will be referred to as a "mode sensor", provides to the powertrain controller 28 an indication of whether a wheel $30_i$ or a track assembly $32_i$ is mounted to the final drive axle $51_i$. Basically, while the mode selection control 54 allows an explicit selection of one of the wheel mode or the track mode in which the powertrain 12 is to operate, the mode sensor 56 allows an implicit selection of one of the wheel mode or the track mode in which the powertrain 12 is to operate by inferring the selected mode from an actual ground-engaging traction component $16_i$ (i.e., a wheel $30_i$ or a track assembly $32_i$) mounted to the final drive axle $51_i$.

For instance, in some embodiments, the mode sensor 56 may comprise a contact sensor that is configured to sense mechanical contact when a wheel $30_i$ or a track assembly $32_i$ is mounted to a final drive axle $51_i$ of the powertrain 12. In some cases, the contact sensor may sense mechanical contact only when a track assembly $32_i$ is mounted to the final drive axle $51_i$. Upon sensing such mechanical contact, the contact sensor may emit a signal to the powertrain controller 28, from which the powertrain controller 28 determines that a track assembly $32_i$ is mounted and thus the powertrain 12 is to operate in the track mode. Conversely, in other cases, the contact sensor may sense mechanical contact only when a wheel $30_i$ is mounted to the final drive axle $51_i$, whereby it emits a signal indicating to the powertrain controller 28 that the powertrain 12 is to operate in the wheel mode. In yet other cases, the contact sensor may sense mechanical contact when either a wheel $30_i$ or a track assembly $32_i$ is mounted to the final drive axle $51_i$. In such cases, the contact sensor sends a signal to the powertrain controller 28 that indicates whether a wheel $30_i$ or a track assembly $32_i$ is mounted to the final drive axle $51_i$ to cause the powertrain 12 to operate in the selected mode.

In other embodiments, the sensor 56 may comprise a contactless sensor that is configured to sense presence of a wheel $30_i$ or a track assembly $32_i$ mounted to a final drive axle $51_i$ of the powertrain 12 without physical contact with the contactless sensor. For example, in some cases, the contactless sensor may be an optical sensor configured to sense light. An intensity of light being sensed by the optical sensor can indicate whether a wheel $30_i$ or a track assembly $32_i$ is mounted to a final drive axle $51_i$ of the powertrain 12. For instance, the optical sensor may be arranged such that, when a wheel $30_i$ is mounted to the final drive axle $51_i$, a certain intensity of light (e.g., little or no light) is sensed by the optical sensor, and, when a track assembly $32_i$ is mounted to the final drive axle $51_i$, a different intensity of light is sensed by the optical sensor (e.g., a greater intensity of light). In other cases, the contactless sensor may comprise an acoustic sensor (e.g., an ultrasonic sensor), a magnetic sensor, or any other type of sensor which can detect presence without physical contact.

The sensor 56 thus provides to the powertrain controller 28 an indication of whether a wheel $30_i$ or a track assembly $32_i$ is mounted to a final drive axle $51_i$ of the powertrain 12. Based on this indication, the powertrain controller 28 determines that the powertrain 12 is to operate in the selected mode and proceeds to control the powertrain 12 accordingly.

By enabling an automatic selection of one of the wheel mode or the track mode in which the powertrain 12 is to operate based on presence of a wheel $30_i$ or a track assembly $32_i$ mounted to a final drive axle $51_i$ of the powertrain 12, the mode sensor 56 can reduce a likelihood of the powertrain 12 operating in the wrong mode compared to embodiments where only the mode selection control 54 is provided. In embodiments where the mode selector 53 comprises both the mode selection control 54 and the mode sensor 56, the mode sensor 56 may serve to confirm the selection of the selected mode made by the user via the mode selection control 54.

As yet another example, in some embodiments, instead of or in addition to the mode selection control 54 and/or the mode sensor 56, the mode selector 53 may comprise a controller, which will be referred to as a "mode controller", comprising suitable hardware and/or software (e.g., firmware) configured to implement the mode selection controller's functionality. Specifically, the mode controller comprises an interface, a processing portion, and a memory portion, which may be implemented as discussed above in connection with the interface 29, the processing portion 37, and the memory portion 39 of the powertrain controller 28.

The mode controller is configured to receive one or more inputs at its interface from one or more components of the ATV 10 and select, based on these one or more inputs, a given one of the wheel mode and the track mode in which the powertrain 12 is to operate.

In cases where the mode selector 53 comprises the mode selection control 54 and/or the mode sensor 56, an input received by the mode controller may be a signal received upon the user having selected a given one of the wheel mode and the track mode via the mode selection control 54 and/or a signal received from the mode sensor 56. Based on this, the mode controller can determine a given one of the wheel mode and the track mode in which the powertrain 12 is to operate.

In other cases, such as cases where the mode selector 53 does not comprise the mode selection control 54 nor the mode sensor 56, the mode controller may infer in which of the wheel mode and the track mode the powertrain 12 is to operate based on inputs it receives which are indicative of whether the ATV 10 is equipped with the wheels 30$_1$-30$_4$ or the track assemblies 32$_1$-32$_4$. For example, in some embodiments, when it receives inputs representing a given condition of the ATV 10 (e.g., a given speed of the prime mover 14, a given transmission ratio of the transmission 20, a given speed of the ATV 10 on the ground, and/or a given instantaneous fuel consumption of the ATV 10), the mode controller may infer that the ATV 10 is equipped with the wheels 30$_1$-30$_4$, but when it receives inputs representing a different condition of the ATV 10 (e.g., a different speed of the prime mover 14, a different transmission ratio of the transmission 20, a different speed of the ATV 10 on the ground, and/or a different instantaneous fuel consumption of the ATV 10), the mode controller may infer that the ATV 10 is equipped with the track assemblies 32$_1$-32$_4$. For instance, in some embodiments, if the mode controller receives inputs indicating that the ATV 10 currently moves at a speed of 15 mph on the ground and the prime mover 14 currently runs at a speed of 3000 rpm but the mode controller expects that, at 15 mph, the prime mover 14 should run at a much lower speed (e.g., 2000 rpm) if the ATV 10 was equipped with the wheels 30$_1$-30$_4$, the mode controller may then conclude that the ATV 10 is actually equipped with the track assemblies 32$_1$-32$_4$.

Figure 10:
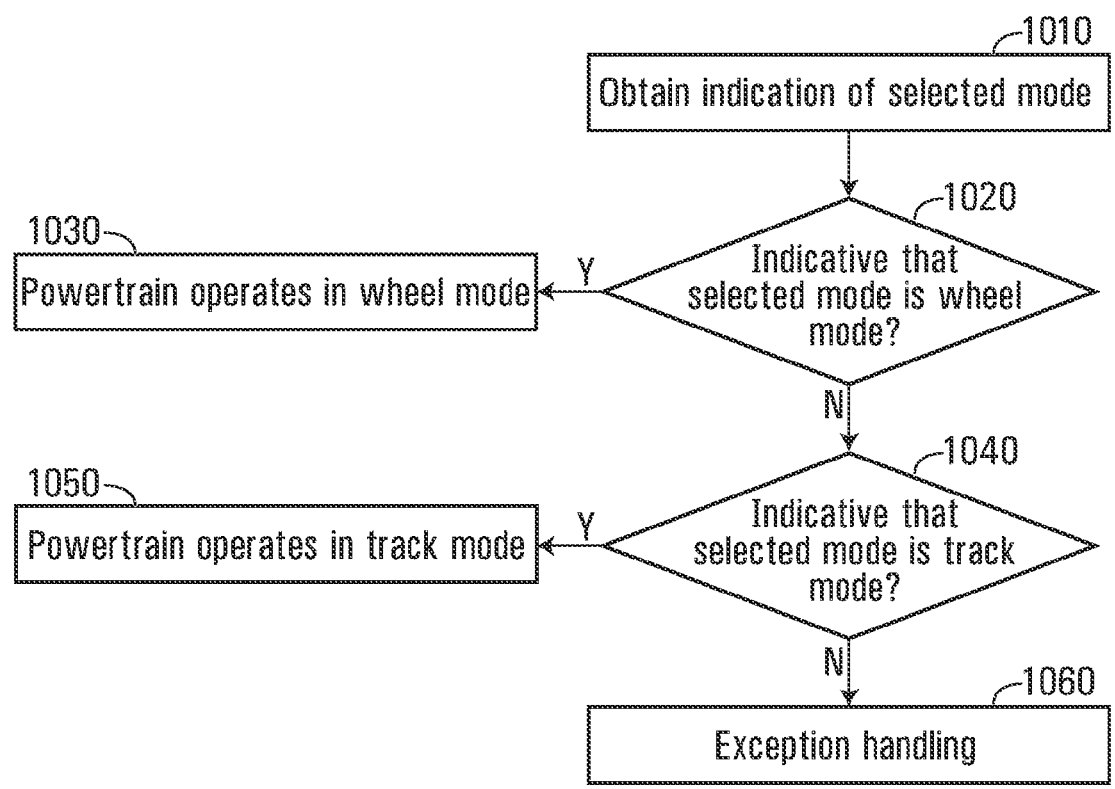
FIG. 10 shows an example of a process implemented by the powertrain controller.

An example of a process which may be implemented by the powertrain controller 28 to control operation of the powertrain 12 is shown in FIG. 10. In this example, at step 1010, the powertrain controller 28 obtains an indication of a selected one of the wheel mode and the track mode in which the powertrain 12 is to operate. This indication is received from the mode selector 53 as discussed above. At step 1020, the powertrain controller 28 determines whether the indication of the selected mode is indicative of the wheel mode. If so, the powertrain controller 28 proceed to step 1030, where it causes the powertrain 12 to operate in the wheel mode; otherwise, the powertrain controller 28 proceeds to step 1040. At step 1040, the powertrain controller 28 determines whether the indication of the selected mode is indicative of the track mode. If so, the powertrain controller 28 proceed to step 1050 where it causes the powertrain 12 to operate in the track mode; otherwise, the powertrain controller 28 proceeds to step 1060. At step 1060, which is reached when neither the wheel mode nor the track mode is indicated, the powertrain controller 28 executes an exception handling procedure. For instance, in some embodiments, such an exception handling procedure may involve indicating to the user via the user interface 18 that an incorrect mode selection has occurred and/or causing the powertrain 12 to operate in a default one of the wheel mode and the track mode.

B. Powertrain Feature(s) Facilitating Use of ATV when ATV is Equipped with Track Assemblies In some embodiments, the powertrain 12 may have one or more powertrain features that facilitate use of the ATV 10 when the ATV 10 is equipped with the track assemblies 32$_1$-32$_4$. In some cases, such powertrain features may be provided in embodiments in which the powertrain 12 is operable differently in a wheel mode and a track mode, as discussed above. In other cases, such powertrain features may be provided in embodiments in which the powertrain 12 is not operable differently in a wheel mode and a track mode, but rather operates in the same manner regardless of whether the ATV 10 is equipped with the wheels 30$_1$-30$_4$ or the track assemblies 32$_1$-32$_4$.

For example, in some embodiments, the transmission 20 may have one or more manually-selectable transmission ratios which facilitate use of the ATV 10 when the ATV 10 is equipped with the track assemblies 32$_1$-32$_4$. More particularly, in some embodiments, the transmission 20 may be an automatic transmission with one or more manual transmission control elements (e.g., a manumatic transmission) allowing the user to manually control operation of the transmission 20. The transmission 20 may have one or more manually-selectable transmission ratios that the user can manually select when the ATV 10 is equipped with the track assemblies 32$_1$-32$_4$ and that are unavailable on standard ATVs. Such a manually-selectable transmission ratio may be provided for the forward direction of the transmission 20 (i.e., when the ATV 10 advances.). Alternatively or additionally, such a manually-selectable transmission ratio may be provided for the reverse direction of the transmission 20 (i.e., when the ATV 10 backs up). As an example, the transmission 20 may have two (2) or more manually-selectable transmission ratios for the reverse direction of the transmission 20 in order to facilitate backing up of the ATV 10 when it is equipped with the track assemblies 32$_1$-32$_4$. For instance, the transmission 20 may have a "normal" reverse ratio and a "stronger" reverse ratio providing more output torque than the normal reverse ratio (e.g., the stronger reverse ratio may be as strong as a "low" forward ratio of the transmission 20).

The powertrain 12 may be configured in various other ways in other embodiments.

For example, in some embodiments, the prime mover 14 may comprise an electric motor. In other embodiments, the primer mover 14 may comprise a combination of two (2) or more motors. For instance, in some cases, the prime mover 14 may comprise a combination of an internal combustion engine and an electric motor (e.g., a hybrid prime mover).

In some embodiments where the prime mover 14 comprises an electric motor, certain components of the powertrain 12 may be configured differently than in embodiments where the prime mover 14 comprises only an internal combustion engine. For example, the prime mover controller 34 may be configured with the specifications of an electric motor, or alternatively in the case of hybrid engines, the specifications for both the electric motor and the internal combustion engine. For instance, the power output of the prime mover 14 may be controlled by the prime mover controller 34 using parameters based on the particular specifications of the electric motor, and the cutoff values for an electric motor that are programmed into (or calculated by) the prime mover controller 34 may also be adjusted to account for the electric motor's operation and maximum output capacity. Similarly, the transmission controller 36 may also be configured based on the specifications of the electric motor, or alternatively in the case of hybrid engines, the specifications for both the electric motor and the internal combustion engine. For example, the points at which the transmission controller 36 would shift the transmission 20 between two transmission ratios may be adjusted to account for the power output of the electric motor.

Furthermore, in cases where the prime mover 14 comprises an electric motor (or possibly, a hybrid prime mover), the user may be provided with the ability to select between a first setting that seeks to maximize power output from the electric motor at the expense of battery life and a second setting that seeks to maximize battery life at the expense of power output from the electric motor. Depending on the setting that is selected by the user, certain aspects of the powertrain 12 may be adjusted to either maximize motor output or conserve battery life. For example, if the user selects the battery life conservation setting, the prime mover controller 34 may reduce the maximum output of the prime mover 14 (and therefore the maximum attainable speed for the ATV 10) in order to extend battery life.

In embodiments where the prime mover 14 comprises an electric motor, the prime mover controller 34 may manage a battery unit of the ATV 10. The battery unit of the ATV 10 may comprise a single battery or a plurality of batteries (e.g., a battery pack) This can allow the controller 34 to monitor the state of the battery unit as well as to affect the power output of the prime mover 14 based on current battery levels and/or user-selectable usage settings, such as the battery conservation mode discussed above.

In this regard, the battery management functionality of the prime mover controller 34 may be adjusted based on whether the ATV 10 is currently running in wheel mode or in track mode. For example, in some embodiments, the user interface 18 may display an estimate of the remaining operation time available based on the remaining amount of power left in the battery unit, which is provided (or calculated) by the prime mover controller 34. If the power output from the prime mover 14 while running in track mode is different from (e.g., higher than) that in wheel mode, the controller 34 may adjust estimates of the remaining operation time available for the vehicle downwards.

In embodiments where a hybrid prime mover 14 is used, the generation of power within the powertrain 12 may be provided by an electric motor under certain circumstances and by an internal combustion engine under other circumstances. Typically, the prime mover controller 34 manages the power sources in the hybrid prime mover, indicating which power source (i.e., the electric motor or the combustion engine) is active, as well as the point when the prime mover 14 switches from one power source to the other. For instance, the prime mover controller 34 may use the current speed of the ATV 10 to determine which power source in the hybrid prime mover to use (e.g., when the ATV 10 is travelling at speeds below 15 km/h, the electric motor is used as the power source, but when the ATV is travelling at speeds above 15 km/h, the internal combustion engine is used as the power source). Other factors, such as the accelerator 40 (and/or other components of the user interface 18), sensors (e.g., a throttle position sensor) and other controllers (such as the transmission controller 36) may also be used to manage the currently active power source of the hybrid prime mover 14.

The prime mover controller 34 may manage the hybrid prime mover 14 differently depending on whether the ATV 10 is running in wheel mode or track mode. Continuing the example above, the controller 34 may switch between power sources at different speeds depending on whether wheel mode or track mode is currently active (e.g., the 15 km/h speed that marks where the prime mover controller 34 shifts from one power source to another may be applied only when the ATV 10 is running in wheel mode; when the ATV 10 is running in track mode, the speed at which the controller 34 shifts from one power source to another may be at different speed, such as at 10 km/h). Alternatively, the prime mover controller 34 may determine that when the ATV 10 is in a particular mode (e.g., track mode), only one power source within the hybrid prime mover 14 may be used to generate motive force. For example, if the ATV 10 is running in track mode, the power source for the prime mover 14 may be restricted to the internal combustion engine.

As another example of how the powertrain 12 may be configured in other ways in other embodiments, in some embodiments, the transmission 20 may be a manual transmission, instead of an automatic transmission or a manumatic transmission.

As yet another example, the powertrain 12 may deliver power from the prime mover 14 to the ground-engaging traction components $16_1$-$16_4$ in other ways in other embodiments. For example, in some embodiments, the powertrain 12 may not comprise the transmission 20, and/or may comprise one or more other power transmission components.

4. Steering System

The steering system 17 is configured to enable the user to steer the ATV 10 on the ground. With additional reference to FIG. 11, the steering system 17 comprises the steering device 13 that is operated by the user to direct the ATV 10 along a desired course on the ground. In this embodiment, the steering device 13 comprises handlebars. The steering device 13 may comprise a steering wheel or any other steering component that can be operated by the user to steer the ATV 10 in other embodiments.

The steering system 17 responds to the user moving the handlebars 13 by turning some of the ground-engaging traction components $16_1$-$16_4$ to cause the ATV 10 to move in a desired direction. The track assemblies $16_1$-$16_4$ engage the ground to provide traction to the ATV 10. More particularly, in this example, each of the front ones of the ground-engaging traction components $16_1$-$16_4$ is turnable in response to input of the user at the handlebars 13 in order to steer the ATV 10 on the ground.

In this embodiment, the steering system 17 comprises a power steering system 26 for assisting the user in steering the ATV 10. The power steering system 26 applies an assistive force to facilitate turning of one or more of the ground-engaging traction components $16_1$-$16_4$. For example, in this case, the power steering system 26 is an electric power steering (EPS) system. The electric power steering system comprises a sensor to detect motion and torque of a steering column 59 of the steering system 17 and an electric motor 60 to apply assistive torque to facilitate turning of one or more of the ground-engaging traction components $16_1$-$16_4$.

The steering system 17 facilitates use of the ATV 10 whether the ATV 10 is equipped with the wheels $30_1$-$30_4$ or the track assemblies $32_1$-$32_4$. Specifically, the steering system 17 has steering characteristics, such a steering angle of a ground-engaging traction component $16_i$ and a level of power steering assistance, which take into account that the ATV 10 can be equipped with either the wheels $30_1$-$30_4$ or the track assemblies $32_1$-$32_4$. This can be achieved in various ways in various embodiments.

A. Steering System Operates in Different Modes Depending on Whether ATV is Equipped with Wheels or Track Assemblies In this embodiment, the steering system 17 is operable in a plurality of modes depending on whether the ATV 10 is equipped with the wheels $30_1$-$30_4$ or the track assemblies $32_1$-$32_4$. Specifically, in this embodiment, the steering system 17 is operable in a first mode when the ATV 10 is equipped with the wheels $30_1$-$30_4$ (hereinafter referred to as a "wheel mode") and in a second mode when the ATV 10 is equipped with the track assemblies $32_1$-$32_4$ (hereinafter referred to as a "track mode").

The steering system 17 operates differently in the track mode than in the wheel mode, i.e., at least one component (e.g., the steering device 13 and/or the power steering system 26) of the steering system 17 operates in a first manner in the wheel mode and in a second manner, different from the first manner, in the track mode. Basically, at least one steering characteristic is different or is controlled differently by the steering system 17 depending on whether the ATV 10 is equipped with the wheels $30_1$-$30_4$ or the track assemblies $32_1$-$32_4$.

Figure 11:
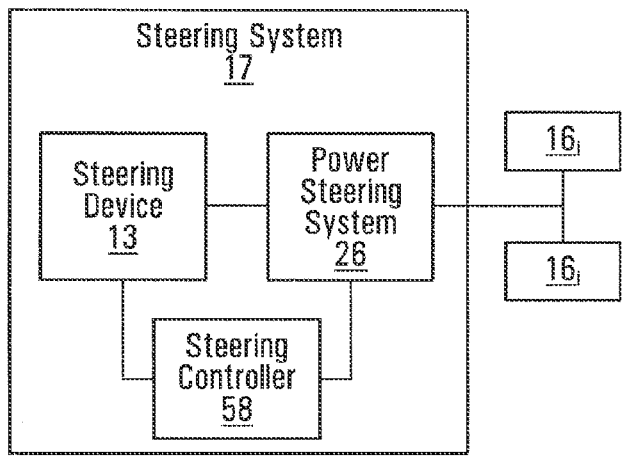
FIG. 11 shows a steering system of the ATV.
Figure 12:
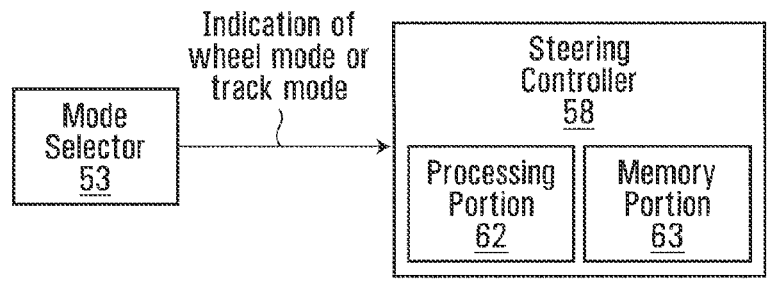
FIG. 12 shows a steering controller and the mode selector of the ATV.

As shown in FIGS. 11 and 12, the steering system 17 comprises a steering controller 58 for controlling operation of the steering system 17. More particularly, in this embodiment, the steering controller 58 is an electronic controller that comprises suitable hardware and/or software (e.g., firmware) configured to implement its functionality. Specifically, the steering controller 58 comprises an interface 61, a processing portion 62, and a memory portion 63, which may be implemented as discussed above in connection with the interface 29, the processing portion 37, and the memory portion 39 of the powertrain controller 28.

The steering controller 58 is configured to control one or more steering characteristics. For example, in this embodiment, the steering controller 58 controls a level of power steering assistance of the power steering system 26. The level of power steering assistance of the power steering system 26 refers to an assistive force (e.g., an assistive torque) applied by the power steering system 26 when the user turns the ATV 10.

The steering controller 58 controls the level of power steering assistance of the power steering system 26 based on inputs from various entities, such as: one or more sensors (e.g.: a steering device angle sensor, which senses an angle in which the steering device 13 is positioned; an ATV speed sensor; etc.); the accelerator 40 and/or other components of the user interface 18; other controllers (e.g., the powertrain controller 28); and/or other entities.

Various operational aspects of the power steering system 26 may be controlled to control the level of power steering assistance. For example, in this embodiment where the power steering system 26 is an electric power steering system, the steering controller 58 may control an input power of the electric motor of the power steering system 26 (e.g., by controlling an input voltage and/or an input current of the electric motor). The steering controller 58 may thus control the level of power steering assistance of the power steering system 26, for instance, by causing a specific input power to be applied at a specific instant, based on inputs from a steering device angle sensor, an ATV speed sensor, the accelerator 40 and/or other components of the user interface 18, and/or the powertrain controller 28.

To control the level of power steering assistance of the power steering system 26, in this embodiment, the steering controller 58 comprises a program stored in the memory portion 63 and executed by the processing portion 62. For example, the program may determine the level of power steering assistance of the power steering system 26 by performing computations based on inputs from a steering device angle sensor, an ATV speed sensor, the accelerator 40 and/or other components of the user interface 18 and/or the powertrain controller 28. In some cases, certain operations of the program may refer to reference data stored in the memory portion 63. This reference data comprises data representative of one or more maps, tables, curves or other sets of reference values that are used during execution of the program of the steering controller 58. For instance, in some cases, the reference data may associate different values of the turning angle of the handlebars 13 to corresponding values of input power and/or other parameters of the electric motor of the power steering system 26. Such programs are well-understood by those skilled in the art and will therefore not be discussed in further detail.

The steering controller 58 may control the level of power steering assistance of the power steering system 26 differently in the track mode than in the wheel mode. For instance, in some cases:

i. A response of the power steering system 26 to user input at the steering device 13 may be different in the track mode than in the wheel mode. More particularly, a functional dependency of the level of power steering assistance of the power steering system 26 to user input at the steering device 13 may be different in the track mode than in the wheel mode. This "user input dependency" of the level of power steering assistance of the power steering system 26 refers to a relationship between (1) the level of power steering assistance of the power steering system 26 and (2) input from the steering device 13 operated by the user and/or from a steering component (e.g., a steering device angle sensor) which is responsive to input at the steering device 13 (e.g., in a steer-by-wire system). For example, in some cases, the user input dependency of the level of power steering assistance of the power steering system 26 may be defined in terms of certain values that the level of power steering assistance of the power steering system 26 should have as a function of certain angular positions of the handlebars 13.

For example, for a given angular position of the handlebars 13, the level of power steering assistance of the power steering system 26 in the track mode may be different from the level of power steering assistance of the power steering system 26 in the wheel mode. In some cases, the level of power steering assistance of the power steering system 26 in the track mode may be greater than the level of power steering assistance of the power steering system 26 in the wheel mode. In other cases, the level of power steering assistance of the power steering system 26 in the track mode may be less than the level of power steering assistance of the power steering system 26 in the wheel mode.

ii. An ATV speed dependency of the level of power steering assistance of the power steering system 26 may be different in the track mode than in the wheel mode. This ATV speed dependency of the level of power steering assistance of the power steering system 26 refers to a relationship between (1) the level of power steering assistance of the power steering system 26 and (2) the speed of the ATV 10 on the ground (e.g., as measured by an ATV speed sensor). For instance, in some cases, the ATV speed dependency of the level of power steering assistance of the power steering system 26 may be defined in terms of certain values that the level of power steering assistance of the power steering system 26 should have as a function of certain values of the speed of the ATV 10.

For example, for a given speed of the ATV 10, the level of power steering assistance of the power steering system 26 in the track mode may be different from the level of power steering assistance of the power steering system 26 in the wheel mode. In some cases, the level of power steering assistance of the power steering system 26 in the track mode may be greater than the level of power steering assistance of the power steering system 26 in the wheel mode. In other cases, the level of power steering assistance of the power steering system 26 in the track mode may be less than the level of power steering assistance of the power steering system 26 in the wheel mode.

Another example of a steering characteristic that may be controlled differently in the track mode than in the wheel mode is a steering angle of a ground-engaging traction component $16_i$. The steering angle of a ground-engaging traction component $16_i$ is the angle between an axis of rotation of the ground-engaging traction component $16_i$ (i.e., an axis of rotation of a wheel $30_i$ or an axis of rotation of the drive wheel 42 of a track assembly $32_i$) and a longitudinal axis of the ATV 10 when the steering system 17 turns the ground-engaging traction component $16_i$.

The steering system 17 may control the steering angle of a ground-engaging traction component $16_i$ differently in the track mode than in the wheel mode. For example, in this embodiment, a maximum steering angle of a ground-engaging traction component $16_i$ is different depending on whether the ground-engaging traction component $16_i$ is a wheel $30_i$ or a track assembly $32_i$. Basically, the maximum steering angle of a track assembly $32_i$ is different from (e.g., less than) the maximum steering angle of a wheel $30_i$. For instance, the steering system 17 can limit the maximum steering angle of a track assembly $32_i$ to prevent the track assembly $32_i$ from engaging the body 21 of the ATV 10 as the ATV 10 turns on the ground.

The maximum steering angle of a ground-engaging traction component $16_i$ determines a turning radius of the ATV 10. Therefore, in this embodiment, the turning radius of the ATV 10 when the ATV 10 is equipped with the track assemblies $32_1$-$32_4$ is different from (e.g., greater than) the turning radius of the ATV 10 when the ATV 10 is equipped with the wheels $30_1$-$30_4$.

The steering system 17 may limit the maximum steering angle of a ground-engaging traction component $16_i$ in various ways in various embodiments.

For example, in some embodiments, the steering system 17 may limit an angular range of motion of the handlebars 13, which refers to a range of angles in which they can be turned to steer the ATV 10 on the ground. The angular range of motion of the handlebars 13 may be different when the ATV 10 is equipped with the track assemblies $32_1$-$32_4$ than when the ATV 10 is equipped with the wheels $30_1$-$30_4$. Specifically, in this case, the angular range of motion of the handlebars 13 may be smaller when the ATV 10 is equipped with the track assemblies $32_1$-$32_4$ than when the ATV 10 is equipped with the wheels $30_1$-$30_4$.

Instead of or in addition to limiting the angular range of motion of the handlebars 13, in some embodiments, the steering system 17 may limit a range of motion of a steering component other than the handlebars 13, such as the steering column 59, a steering gear, a steering tie rod, or any other component of the steering system 17. The range of motion of such steering component may be different when the ATV 10 is equipped with the track assemblies $32_1$-$32_4$ than when the ATV 10 is equipped with the wheels $30_1$-$30_4$. In such embodiments, the angular range of motion of the handlebars 13 may remain the same regardless of, or may be different depending on, whether the ATV 10 is equipped with the wheels $30_1$-$30_4$ or with the track assemblies $32_1$-$32_4$.

The steering system 17 may limit the range of motion of a particular steering component (e.g., the angular range of motion of the handlebars 13) in various ways.

Figure 13:
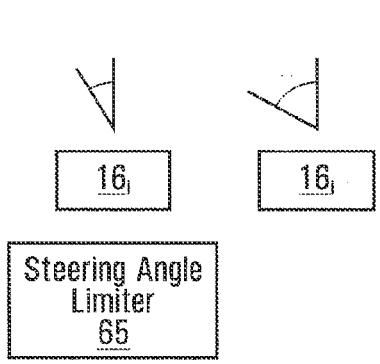
FIGS. 13 and 14 show a steering angle limiter to limit a range of motion of a steering component.
Figure 14:
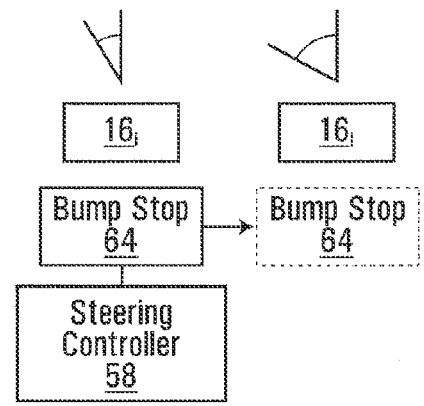

As an example, in some embodiments, as shown in FIG. 13, the steering system 17 may comprise a steering angle limiter 65 which can mechanically limit the range of motion of a particular steering component. For instance, as shown in FIG. 14, the steering angle limiter 65 may comprise a bump stop 64 to prevent motion of the particular steering component beyond the bump stop. The bump stop 64 may be positioned in a first position, in which it limits the motion of the particular steering component, thereby limiting the maximum steering angle of a track assembly $32_i$, when the steering system 17 is in the track mode, and may be positioned in a second position, in which it does not limit the motion of the particular steering component, when the steering system 17 is in the wheel mode. The steering controller 58 may cause the bump stop 64 to be positioned in an appropriate one of its two positions. For instance, the steering controller 58 may send a signal to an actuator (e.g., a solenoid) which moves the bump stop 64 into the appropriate position.

As another example, in some embodiments, the steering controller 58 may control the power steering system 26 such that, when the maximum steering angle of a track assembly $32_i$ is reached, the power steering system 26 precludes the track assembly $32_i$ from acquiring a greater steering angle. For instance, in this case, the steering controller 58 may control the electric motor of the power steering system 26 such that, when the maximum steering angle of a track assembly $32_i$ is reached, the electric motor 60 does not provide an assistive torque in a direction that would further increase the steering angle of the track assembly $32_i$.

Another example of a steering characteristic that may be controlled differently in the track mode than in the wheel mode is stability of the ATV 10. More particularly, in some embodiments, the ATV 10 may comprise an electronic stability control (ESC) system that improves the stability of the ATV 10. When it detects a loss of steering control, the ESC system automatically applies one or more brakes of the braking system 19 to help "steer" the ATV 10 where the user intends to go. In some cases, the ESC system may also reduce power applied by the powertrain 12 to the ground-engaging traction components $16_1$-$16_4$ (e.g., by reducing the power output of the prime mover 14) until control is regained.

The ESC system comprises sensors to sense what the user wants and how the ATV 10 is actually behaving. For example, the ESC system may comprise a steering device angle sensor to sense the user's intended steering direction, a yaw rate sensor to sense a rotation rate of the ATV 10, and an ATV speed sensor to sense the speed of the ATV 10 on the ground. Based on inputs from these sensors and possibly from other entities, such as the accelerator 40 and/or other components of the user interface 18, other controllers (e.g., the powertrain controller 28) and/or other entities, the steering controller 58 compares what the user wants to how the ATV 10 is actually behaving and decides, when necessary, to apply brakes and/or reduce the power applied by the powertrain 12 to the ground-engaging traction components $16_1$-$16_4$ To control the stability of the ATV 10, in this embodiment, the steering controller 58 comprises a program stored in the memory portion 63 and executed by the processing portion 62. For example, the program may determine when and/or what force to apply on one or more brakes of the braking system 19, and/or what the power output of the prime mover 14 should be by performing computations based on inputs from a steering device angle sensor, a yaw rate sensor, and an ATV speed sensor. In some cases, the program may refer to reference data stored in the memory portion 63. For instance, the reference data may associate different values of the turning angle of the handlebars 13, yaw rate and ATV speed to corresponding values of braking force and/or other parameters of the braking system 19 and/or corresponding values of the output power of the prime mover 14. Such programs are well-understood by those skilled in the art and will therefore not be discussed in further detail.

The steering controller 58 may control the stability of the ATV 10 differently in the track mode than in the wheel mode. For example, in some cases, the steering controller 58 may disable the ESC system in the track mode. In other cases, a particular condition of the ATV 10 (e.g., a particular difference in rotational speeds of two or more of the wheels $30_1$-$30_4$ or the driving wheels 42 of two or more of the track assemblies $32_1$-$32_4$, and a particular speed of the ATV 10 on the ground) which triggers a specific ESC system action (e.g., modification of the output of the prime mover 14, and/or application of a braking force by the braking system 19) in the wheel mode may not trigger this ECS system action in the track mode, or vice versa. In yet other cases, for a given condition of the ATV 10 (e.g., a given turning angle of the handlebars 13, a given yaw rate, and a given speed of the ATV 10 on the ground), the steering controller 58 may cause a braking force applied by the braking system 19 and/or the power output of the prime mover 14 to be different (e.g., higher or lower) in the track mode than in the wheel mode.

The difference in operation of the steering system 17 between the wheel mode and the track mode may be implemented in various ways. For example, in this embodiment, the steering controller 58 implements a first control process in the wheel mode and a second control process, different from the first control process, in the track mode. The first control process (in the wheel mode) may comprise one or more programs of the steering controller 58 performing a certain set of computations (e.g., based on functions, equations, etc.) and/or using certain reference data (e.g., a map, table, curve or other set of reference values), and the second control process (in the track mode) may comprise these one or more programs of the steering controller 58 performing a different set of computations and/or using different reference data.

Figure 15:
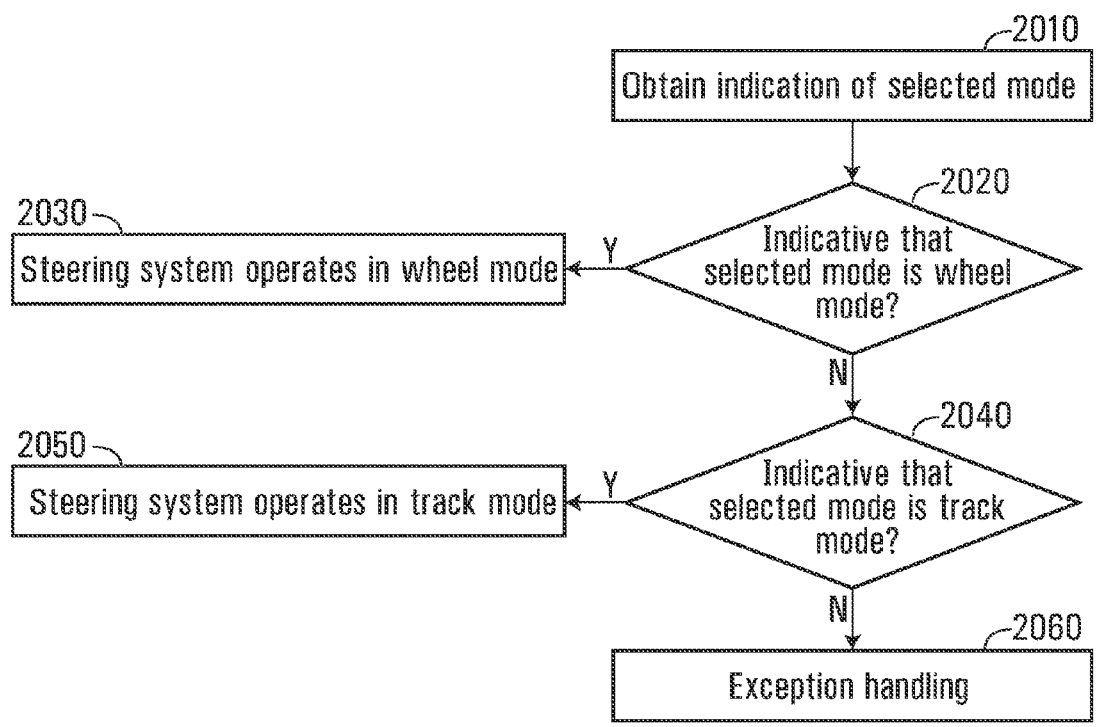
FIG. 15 shows an example of a process implemented by the steering controller.

In this embodiment, the mode selector 53 (discussed previously) provides an indication of a selected one of the wheel mode and the track mode to the steering controller 58, which causes the steering system 17 to operate in the selected mode. An example of a process which may be implemented by the steering controller 58 to control operation of the steering system 17 is shown in FIG. 15.

B. Steering System Feature(s) Facilitating Use of ATV when Equipped with Track Assemblies In some embodiments, the steering system 17 may have one or more steering system features that facilitate use of the ATV 10 when the ATV 10 is equipped with the track assemblies $32_1$-$32_4$. In some cases, such steering system features may be provided in embodiments in which the steering system 17 is operable differently in a wheel mode and a track mode, as discussed above. In other cases, such steering system features may be provided in embodiments in which the steering system 17 is not operable differently in a wheel mode and a track mode, but rather operates in the same manner regardless of whether the ATV 10 is equipped with the wheels $30_1$-$30_4$ or the track assemblies $32_1$-$32_4$.

For example, in some embodiments, the steering system 17 may comprise a manually-controllable steering angle limiter that limits the maximum steering angle of a track assembly $32_i$. For instance, in some cases, the manually-controllable steering angle limiter may comprise a bump stop (e.g., such as the bump stop 64 discussed above) that can be manually placed in position to limit the maximum steering angle of the track assembly $32_i$. In other cases, the manually-controllable steering angle limiter may comprise a cable that can be manually arranged such that, when taut, it limits the maximum steering angle of the track assembly $32_i$.

The steering system 17 may be configured in various other ways in other embodiments. For example, in some embodiments, the power steering system 35 may comprise a hydraulic power steering (HPS) system, which comprises a pump driven by the prime mover 14 supplying hydraulic pressure to assist steering. In such embodiments, the level of power steering assistance provided by the power steering system 35 may be controlled by controlling the output of the pump.

5. Suspension

The suspension 15 is connected between the frame 11 and the ground-engaging traction components $16_1$-$16_4$ to allow relative motion between the frame 11 and the ground-engaging traction components $16_1$-$16_4$ as the ATV 10 travels on the ground. The suspension 15 enhances handling of the ATV 10 on the ground by absorbing shocks and helping to maintain traction between the ground-engaging traction components $16_1$-$16_4$ and the ground.

The suspension 15 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

The suspension 15 facilitates use of the ATV 10 whether the ATV 10 is equipped with the wheels $30_1$-$30_4$ or the track assemblies $32_1$-$32_4$. Specifically, the suspension 15 has suspension characteristics, such as a stiffness and a damping effect, which take into account that the ATV 10 can be equipped with either the wheels $30_1$-$30_4$ or the track assemblies $32_1$-$32_4$. This can be achieved in various ways in various embodiments.

A. Suspension Operates in Different Modes Depending on Whether ATV is Equipped with Wheels or Track Assemblies In this embodiment, the suspension 15 is operable in a plurality of modes depending on whether the ATV 10 is equipped with the wheels $30_1$-$30_4$ or the track assemblies $32_1$-$32_4$. Specifically, in this embodiment, the suspension 15 is operable in a first mode when the ATV 10 is equipped with the wheels $30_1$-$30_4$ (hereinafter referred to as a "wheel mode") and in a second mode when the ATV 10 is equipped with the track assemblies $32_1$-$32_4$ (hereinafter referred to as a "track mode").

The suspension 15 operates differently in the track mode than in the wheel mode, i.e., at least one component of the suspension 15 operates in a first manner in the wheel mode and in a second manner, different from the first manner, in the track mode. Basically, at least one suspension characteristic is different or is controlled differently by the suspension 15 depending on whether the ATV 10 is equipped with the wheels $30_1$-$30_4$ or the track assemblies $32_1$-$32_4$.

More particularly, in this embodiment, the suspension 15 is an active suspension (sometimes also referred to as an "adaptive suspension") in which movement of the ground-engaging traction components $16_1$-$16_4$ relative to the frame 11 is electronically controlled rather than being determined entirely by the ground on which the ATV 10 travels. The active suspension 15 may control one or more suspension characteristics, such as a spring rate or spring force of a spring and/or a damping parameter of a damper.

For example, in some embodiments, the active suspension 15 may comprise actuators to exert forces on the suspension 15 (e.g., the active suspension 15 may be a fully active suspension). The actuators may comprise hydraulic actuators (in the case of a hydraulic active suspension), linear electric motors (in the case of an electric active suspension), and/or any other suitable type of actuator. A force exerted by an actuator may change the spring force of a spring (e.g., increase the spring force, i.e., "stiffen" the spring, by compressing the spring).

As another example, in some embodiments, the active suspension 15 may comprise dampers with a variable damping parameter (e.g., the active suspension 15 may be a semi-active suspension). For instance, in some cases, a valve (e.g., a solenoid or other electromechanical valve) may be controlled to alter flow of hydraulic fluid inside a shock absorber in order to change damping characteristics of the suspension 15. In other cases, the suspension 15 may comprise dampers containing a smart fluid, i.e., a fluid whose properties (e.g., viscosity) can be changed by applying an electric field or a magnetic field, in order to control damping characteristics of the damper (e.g., magnetorheological dampers that contain a magnetorheological fluid whose viscosity can be controlled by controlling a magnetic field using an electromagnet).

Figure 16:
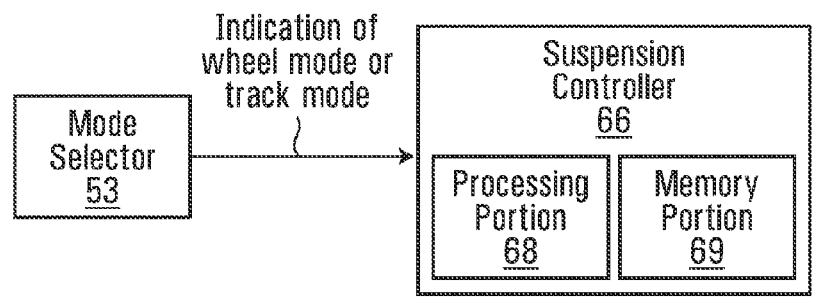
FIG. 16 shows a suspension controller and the mode selector of the ATV.

With additional reference to FIG. 16, in this embodiment, the suspension 15 comprises a suspension controller 66 for controlling operation of the suspension 15. More particularly, in this embodiment, the suspension controller 66 is an electronic controller that comprises suitable hardware and/or software (e.g., firmware) configured to implement its functionality. Specifically, the suspension controller 66 comprises an interface 67, a processing portion 68, and a memory portion 69, which may be implemented as discussed above in connection with the interface 29, the processing portion 37, and the memory portion 39 of the powertrain controller 28.

The suspension controller 66 is configured to control one or more suspension characteristics that dictate suspension dynamics. For example, in this embodiment, the suspension controller 66 controls a stiffness of the suspension 15 (e.g., a spring force or spring rate of one or more springs) and a damping effect of the suspension 15 (e.g., a damping force or damping coefficient of one or more dampers).

The suspension controller 66 controls the stiffness and the damping effect of the suspension 15 based on inputs from various entities, such as: one or more sensors (e.g., an ATV motion sensor to sense yaw, roll, pitch, vertical movement, longitudinal acceleration or lateral acceleration of the ATV 10, an ATV height sensor to sense height of the ATV 10 relative to the ground, an ATV speed sensor, etc.); the accelerator 40 and/or other components of the user interface 18; other controllers (e.g., the powertrain controller 28); and/or other entities.

Various operational aspects of the suspension 15 may be controlled to control the stiffness and the damping effect of the suspension 15. For example, in embodiments in which the suspension 15 comprises actuators, these actuators may be activated to cause one or more springs of the suspension 15 to exert a certain level of spring force or change their spring rate. As another example, in embodiments in which the suspension 15 comprises dampers with a variable damping effect, a valve may be controlled to alter flow of hydraulic fluid inside a shock absorber, or a magnetic field or an electric field may be varied to change properties (e.g., viscosity) of a smart fluid contained in a damper.

To control the stiffness and the damping effect of the suspension 15, in this embodiment, the suspension controller 66 comprises a program stored in the memory portion 69 and executed by the processing portion 68. For example, the program may determine a spring force to be exerted or spring rate to be implemented by a spring and a damping force to be exerted or a damping coefficient to be implemented by a damper by performing computations based on inputs from an ATV motion sensor, an ATV height sensor, an ATV speed sensor, and/or other entities (e.g., the powertrain controller 28). In some cases, certain operations of the program may refer to reference data stored in the memory portion 69. This reference data comprises data representative of one or more maps, tables, curves or other sets of reference values that are used during execution of the program of the suspension controller 66. For instance, in some cases, the reference data may associate different values of speed and acceleration of the ATV 10 and height of the ATV 10 to corresponding values of actuation times of actuators, magnetic or electric field intensities, and/or other parameters of the suspension 15 that may be controlled. Such programs are well-understood by those skilled in the art and will therefore not be discussed in further detail.

The suspension controller 66 controls the suspension dynamics differently in the track mode than in the wheel mode. For instance, in some cases:

i. The stiffness of the suspension 15 in the track mode may be different than that in the wheel mode. For example, in some embodiments, a front part of the suspension 15 (i.e., that part of the suspension 15 closer to front ones of the ground-engaging traction components $16_i$-$16_4$) and/or a rear part of the suspension 15 (i.e., that part of the suspension 15 closer to rear ones of the ground-engaging traction components $16_i$-$16_4$) may be stiffer in the track mode than in the wheel mode. In other embodiments, the front part of the suspension 15 and/or the rear part of the suspension 15 may be less stiff in the track mode than in the wheel mode.

ii. The damping effect of the suspension 15 in the track mode may be different than that in the wheel mode. For example, in some embodiments, the front part of the suspension 15 and/or the rear part of the suspension 15 may provide more damping in the track mode than in the wheel mode. In other embodiments, the front part of the suspension 15 and/or the rear part of the suspension 15 may provide less damping in the track mode than in the wheel mode.

iii. A height of the suspension 15 in the track mode may be different than that in the wheel mode. This height refers to the height at which the frame 11 would be positioned relative to a flat ground surface without relative motion between the frame 11 and the ground-engaging traction components $16_1$-$16_4$. For example, in some embodiments, the front part of the suspension 15 and/or the rear part of the suspension 15 may have a greater height in the track mode than in the wheel mode. In other embodiments, the front part of the suspension 15 and/or the rear part of the suspension 15 may have a lower height in the track mode than in the wheel mode.

The ability of the suspension 15 to operate differently in its track mode than its wheel mode facilitates use of the ATV 10 whether the ATV 10 is equipped with the wheels $30_1$-$30_4$ or the track assemblies $32_1$-$32_4$. For example, the suspension 15 may be made stiffer and higher when the ATV 10 is equipped with the track assemblies $32_1$-$32_4$ than when with the ATV 10 is equipped with the wheels $30_1$-$30_4$ (e.g., in cases where the ATV 10 is used on deep snow). As another example, the rear part of the suspension 15 may be made stiffer when the ATV 10 is equipped with the track assemblies $32_1$-$32_4$ than when with the ATV 10 is equipped with the wheels $30_1$-$30_4$.

The difference in operation of the suspension 15 between the wheel mode and the track mode may be implemented in various ways. For example, in this embodiment, the suspension controller 66 implements a first control process in the wheel mode and a second control process, different from the first control process, in the track mode. The first control process (in the wheel mode) may comprise one or more programs of the suspension controller 66 performing a certain set of computations (e.g., based on functions, equations, etc.) and/or using certain reference data (e.g., a map, table, curve or other set of reference values), and the second control process (in the track mode) may comprise these one or more programs of the suspension controller 66 performing a different set of computations and/or using different reference data.

Figure 17:
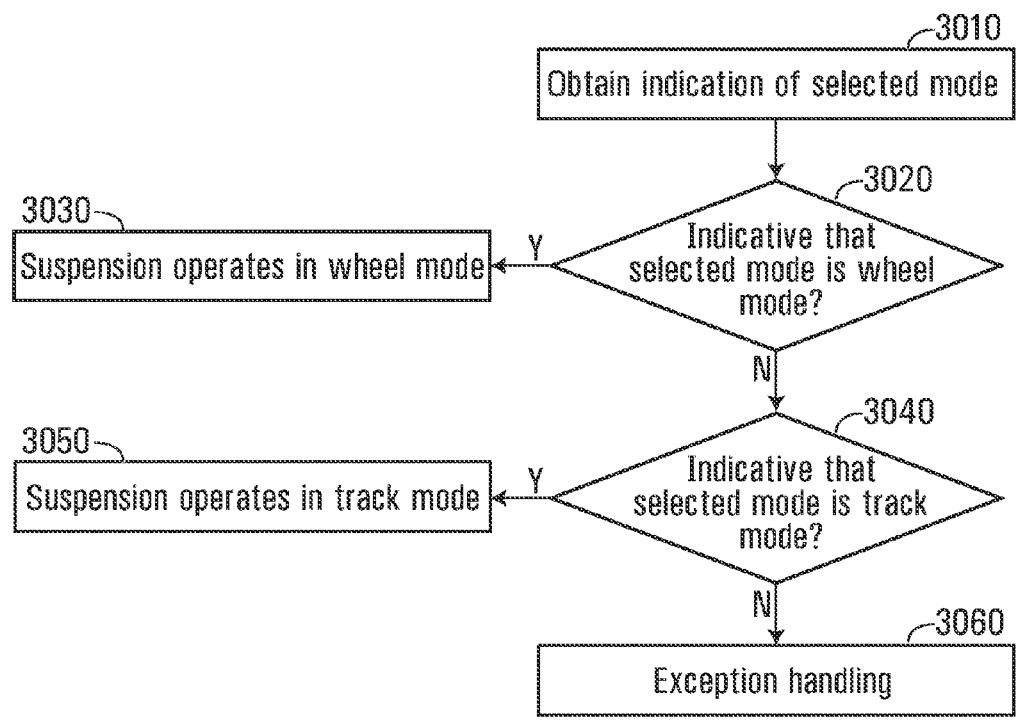
FIG. 17 shows an example of a process implemented by the suspension controller.

In this embodiment, the mode selector 53 (discussed previously) provides an indication of a selected one of the wheel mode and the track mode to the suspension controller 66, which causes the suspension 15 to operate in the selected mode. An example of a process which may be implemented by the suspension controller 66 to control operation of the suspension 15 is shown in FIG. 17.

B. Suspension Feature(s) Facilitating Use of ATV when Equipped with Track Assemblies In some embodiments, the suspension 15 may have one or more suspension features that facilitate use of the ATV 10 when the ATV 10 is equipped with the track assemblies $32_1$-$32_4$. In some cases, such suspension features may be provided in embodiments in which the suspension 15 is operable differently in a wheel mode and a track mode, as discussed above. In other cases, such suspension features may be provided in embodiments in which the suspension 15 is not operable differently in a wheel mode and a track mode, as discussed above, but rather operates in the same manner regardless of whether the ATV 10 is equipped with the wheels $30_1$-$30_4$ or the track assemblies $32_1$-$32_4$.

As an example, in some embodiments, a suspension component of the suspension 15 (e.g., a spring/damper device, a suspension arm, etc.) may be positioned to facilitate use of a track assembly $32_i$. In particular, a suspension component of the suspension 15 may be positioned to provide a clearance sufficient to avoid the track assembly $32_i$ interfering with the suspension component.

For instance, in some embodiments, a spring/damper device 70 of the suspension 15 may be adjustable relative to the frame 11 of the ATV 10 in order to adjust a position of the spring/damper device 70.

Figure 21:
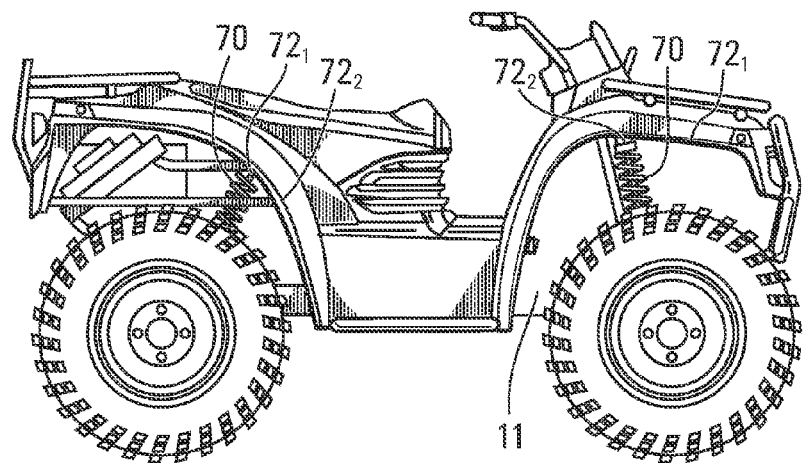
FIGS. 21 to 22 show features of a suspension of the ATV.
Figure 21:
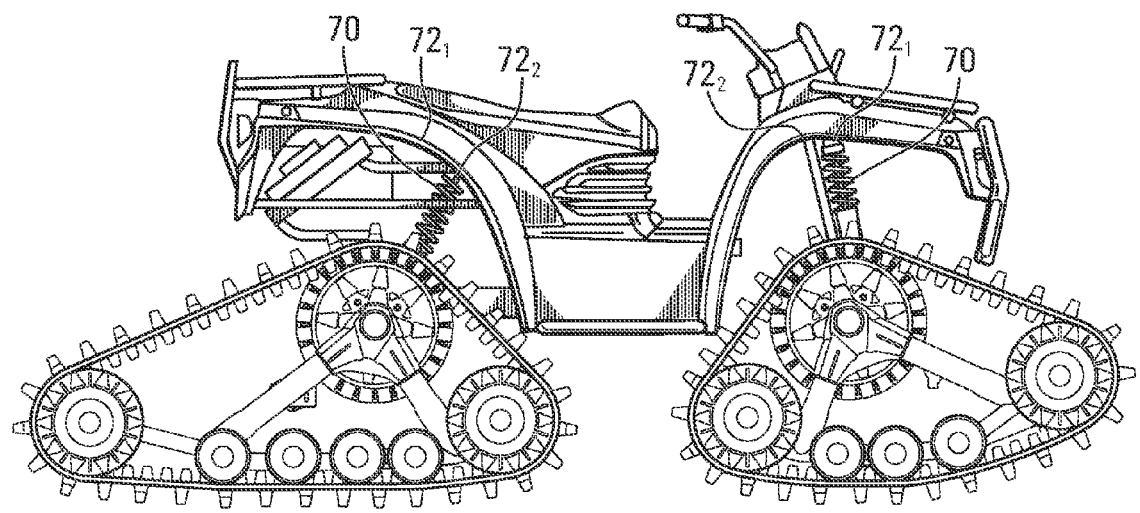

In some cases, as shown in FIG. 21, suspension 15 may comprise a plurality of mounting points $72_1$-$72_2$ at which a spring/damper device 70 is mountable. A first mounting point may be used when a wheel $30_i$ is associated with the spring/damper device 70 and a second mounting point may be used when a track assembly $30_i$ is associated with the spring/damper device 70.

In other cases, the spring/damper device 70 may be pivotable or otherwise movable to adjust its position relative to the frame 11. For example, the spring/damper device 70 may be manually unlocked from a first position, pivoted or otherwise moved to a second position, and locked into the second position. Alternatively, the pivoting or other motion of the spring/damper device 70 may be effected automatically. For instance, the spring/damper device 70 may include a sensor that allows the device 70 to sense whether the ATV 10 is equipped with the wheels $30_1$-$30_4$ or the track assemblies $32_1$-$32_4$. Such a sensor may be connected to a solenoid or other motor that shifts a bolt or other fastener connecting the spring/damper device 70 to the frame 11 between a first connection point that connects the two devices when the ATV 10 is equipped with the wheels $30_1$-$30_4$ and a second connection point that connects the two devices when the ATV 10 is equipped with the track assemblies $32_1$-$32_4$.

As another example, in some embodiments, a suspension component of the suspension 15 (e.g., a spring/damper device, a suspension arm, etc.) may be removable to allow the suspension component to be selectively removed from and installed into the suspension 15 in order to facilitate use of a track assembly $32_i$.

Figure 22:
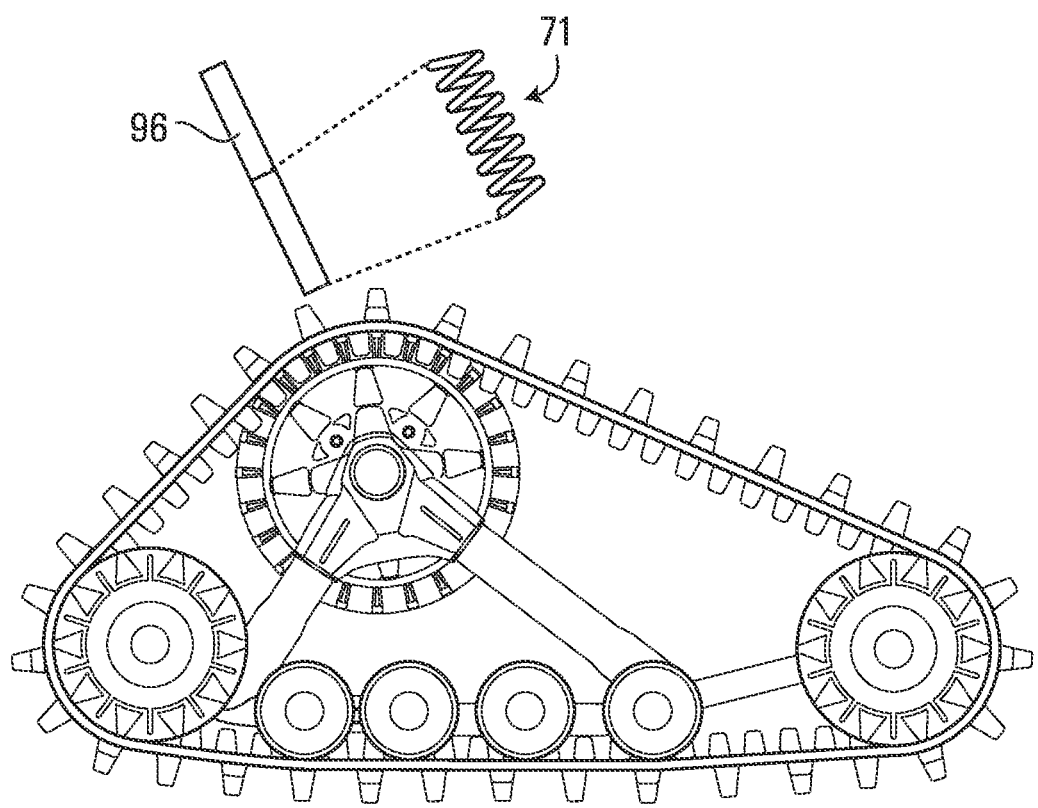

For instance, in some embodiments, a removable spring 71 of the suspension 15 may be selectively removed from and installed into the suspension 15 to facilitate use of a track assembly $32_i$. As shown in FIG. 22, the suspension 15 may comprise a spring-mounting portion 96 to which the spring 71 may be selective connected and disconnected. This configuration allows certain characteristics of the suspension 15 to be adjusted based on the tension of the particular spring installed in the portion 96. For example, if the tension of the spring 71 installed within the spring-mounting portion 96 is such that it is capable of absorbing shocks between the track assembly $32_i$ and the frame 11, then the suspension 15 may provide additional shock-absorbing capabilities to the ATV 10.

Although embodiments considered above relate to a spring/damper device 70 and a spring of the suspension 15 (such as the spring 71), in other embodiments, other suspension components, such as a suspension arm or other suspension link, may be positioned, adjustable and/or removable to facilitate use of a track assembly $32_i$ As another example, in some embodiments, one or more alignment angles of the track assemblies $32_1$-$32_4$ may be set to facilitate use of track assemblies $32_1$-$32_4$. Alignment angles are a caster angle, a camber angle, and a toe angle.

As another example, in some embodiment, a selected part of the suspension 15 may be disabled when the ATV 10 is equipped with the track assemblies $32_1$-$32_4$ under certain circumstances. For example, in some embodiments, a front part of the suspension 15 (i.e., a part of the suspension 15 controlling movement of front ones of the ground-engaging traction components $16_1$-$16_4$) may be disabled when the ATV 10 is equipped with the track assemblies $32_1$-$32_4$ and an implement, such as a shovel, is mounted in front of the ATV 10.

The suspension 15 may be configured in various other ways in other embodiments.

6. Braking System

Figure 18:
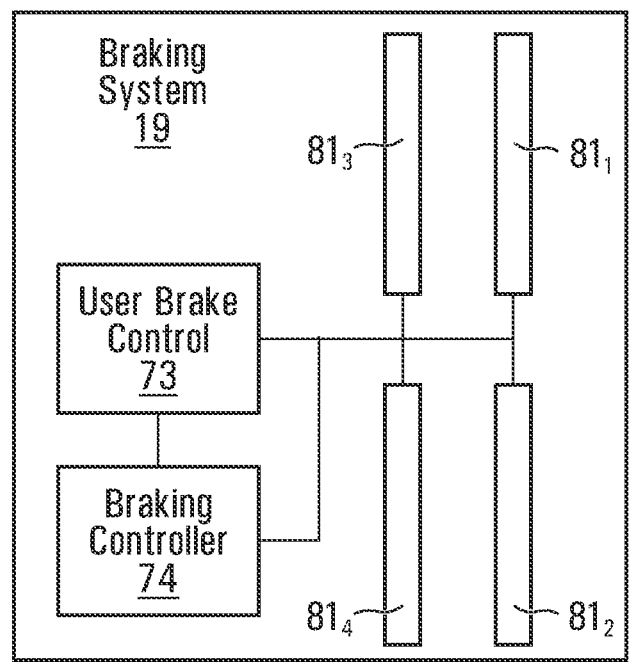
FIG. 18 shows a braking system of the ATV.

The braking system 19 is used to slow down, stop or prevent motion of the ATV 10 on the ground. With reference to FIG. 18, in this embodiment, the braking system 19 comprises brakes $81_1$-$81_4$ and the brake control 73 (e.g., a brake lever and/or a brake pedal) of the user interface 18. The brakes $81_1$-$81_4$ can be applied to slow down, stop or prevent rotation of the wheels $30_1$-$30_4$ or the drive wheels 42 of the track assemblies $32_1$-$32_4$.

The braking system 19 facilitates use of the ATV 10 whether the ATV 10 is equipped with the wheels $30_1$-$30_4$ or the track assemblies $32_1$-$32_4$. Specifically, the braking system 19 has braking characteristics, such as braking forces applied by the brakes $81_1$-$81_4$, which take into account that the ATV 10 can be equipped with either the wheels $30_1$-$30_4$ or the track assemblies $32_1$-$32_4$. This can be achieved in various ways in various embodiments.

A. Braking System Operates in Different Modes Depending on Whether ATV is Equipped with Wheels or Track Assemblies In this embodiment, the braking system 19 is operable in a plurality of modes depending on whether the ATV 10 is equipped with the wheels $30_1$-$30_4$ or the track assemblies $32_1$-$32_4$. Specifically, in this embodiment, the braking system 19 is operable in a first mode when the ATV 10 is equipped with the wheels $30_1$-$30_4$ (hereinafter referred to as a "wheel mode") and in a second mode when the ATV 10 is equipped with the track assemblies $32_1$-$32_4$ (hereinafter referred to as a "track mode").

The braking system 19 operates differently in the track mode than in the wheel mode, i.e., at least one component of the braking system 19 operates in a first manner in the wheel mode and in a second manner, different from the first manner, in the track mode. Basically, at least one braking characteristic is different or is controlled differently by the braking system 19 depending on whether the ATV 10 is equipped with the wheels $30_1$-$30_4$ or the track assemblies $32_1$-$32_4$.

Figure 19:
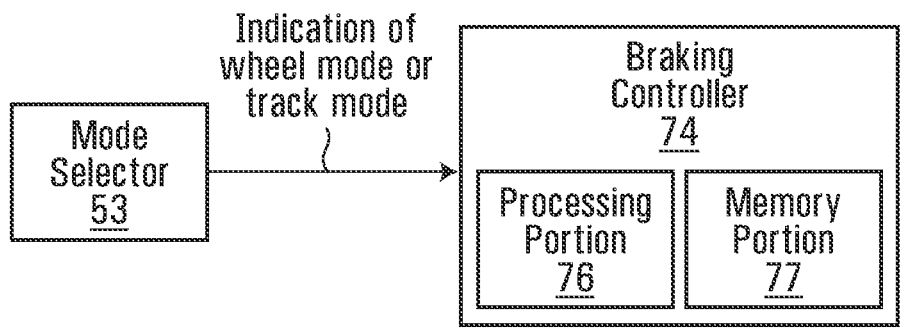
FIG. 19 shows a braking controller and the mode selector of the ATV.

More particularly, in this embodiment, as shown in FIGS. 18 and 19, the braking system 19 comprises a braking controller 74 for controlling operation of the braking system 19. More particularly, in this embodiment, the braking controller 74 is an electronic controller that comprises suitable hardware and/or software (e.g., firmware) configured to implement its functionality. Specifically, the braking controller 74 comprises an interface 75, a processing portion 76, and a memory portion 77, which may be implemented as discussed above in connection with the interface 29, the processing portion 37, and the memory portion 39 of the powertrain controller 28.

The braking controller 74 is configured to control one or more braking characteristics. For example, in this embodiment, the braking controller 74 controls braking forces applied by the brakes $81_1$-$81_4$ of the braking system 19.

The braking controller 74 controls the braking forces applied by the brakes $81_1$-$81_4$ based on inputs from various entities, such as: the brake control 73, the accelerator 40 and/or other components of the user interface 18; one or more sensors (e.g., a wheel speed sensor sensing a rotational speed of a wheel $30_i$ or the driving wheel of a track assembly $32_i$, an ATV speed sensor, etc.); other controllers (e.g., the powertrain controller 28); and/or other entities.

Various operational aspects of the braking system 19 may be controlled to control the braking forces applied by the brakes. For example, in embodiments in which the braking system 19 is a hydraulic braking system, the braking controller 74 may control a valve in a hydraulic line of the braking system 19 to regulate flow of hydraulic fluid in the hydraulic line in order to apply a desired braking force. In cases in which the braking system 19 comprises a power-assisted braking system, the braking forces applied by the braking system 19 may be controlled by controlling a level of power-assisted braking of the braking system 19 (e.g., a valve regulating a vacuum created in a power brake booster may be controlled to vary the level of power-assisted braking of the braking system 19). As another example, in embodiments in which the braking system 19 is an electro-mechanical braking system (e.g., a brake-by-wire system), the braking controller 74 may control an electromechanical brake component (e.g., an electric caliper) to apply a desired braking force.

To control the braking forces applied by the braking system 19, in this embodiment, the braking controller 74 comprises a program stored in the memory portion 77 and executed by the processing portion 76. For example, the program may determine a braking force to be applied by performing computations based on inputs from the brake control 73, the accelerator 40 and/or other components of the user interface 18, a wheel speed sensor, other controllers (e.g., the powertrain controller 28) and/or other entities. In some cases, certain operations of the program may refer to reference data stored in the memory portion 77. This reference data comprises data representative of one or more maps, tables, curves or other sets of reference values that are used during execution of the program of the braking controller 74. For instance, in some cases, the reference data may associate different values of braking command pressure applied to the brake control 73 by the user to corresponding values of actuation times of valves, power to be applied to electrical brake components, and/or other parameters of the braking system 19 that may be controlled. Such programs are well-understood by those skilled in the art and will therefore not be discussed in further detail.

The braking controller 74 controls the braking forces applied by the braking system 19 differently in the track mode than in the wheel mode. For example, in some cases:
i. A response of the braking system 19 to user input at the brake control 73 may be different in the track mode than in the wheel mode. More particularly, a dependency of the braking forces applied by the braking system 19 on user input at the brake control 73 may be different in the track mode than in the wheel mode. This "user input dependency" of the braking forces applied by the braking system 19 refers to a relationship between (1) the braking forces applied by the braking system 19 and (2) input from the brake control 73 operated by the user and/or input from a braking component which is responsive to input from the brake control 73 (e.g., a sensor sensing a position or pressure applied to the brake control 73 in embodiments in which the braking system 19 is an electromechanical braking system such as a brake-by-wire system). For instance, in some cases, the user input dependency of braking forces applied by the braking system 19 may be defined in terms of certain values that the braking forces should have for certain inputs from the brake control 73 and/or from a braking component responsive to input from the brake control 73.

For instance, for a given input from the brake control 73 and/or from a braking component responsive to input from the brake control 73, the braking forces applied by the braking system 19 in the track mode may be different from the braking forces applied by the braking system 19 in the wheel mode. In some cases, for the given input, the braking forces applied by the braking system 19 may be lower in the track mode than in the wheel mode. In other cases, for the given input, the braking forces applied by the braking system 19 may be greater in the track mode than in the wheel mode.

In embodiments in which the braking system 19 comprises a power-assisted braking system, the braking forces applied by the braking system 19 in the track mode may be different from those applied by the braking system 19 in the wheel mode by making the level of power-assisted braking of the braking system 19 in the track mode different than in the wheel mode.

ii. In embodiments in which the braking system 19 comprises an anti-lock braking system (ABS), the ABS may be controlled differently in the track mode than in the wheel mode. For example, in some cases, the braking controller 74 may disable the ABS in the track mode. In other cases, a particular condition of the ATV 10 (e.g., a particular difference in rotational speeds of two or more of the wheels $30_1$-$30_4$ or the driving wheels 42 of two or more of the track assemblies $32_1$-$32_4$, and a particular speed of the ATV 10 on the ground) which triggers a specific ABS action (e.g., reduction of a braking force by the braking system 19) in the wheel mode may not trigger this ABS action in the track mode, or vice versa. In yet other cases, for a given condition of the ATV 10 (e.g., a given difference in rotational speeds of two or more of the wheels $30_1$-$30_4$ or the driving wheels of two or more of the track assemblies $32_1$-$32_4$, and a given speed of the ATV 10 on the ground), the braking controller 74 may cause a braking force applied by the braking system 19 to be different (e.g., higher or lower) in the track mode than in the wheel mode. For instance, the ABS may be generally less active when the ATV 10 is equipped with the track assemblies $32_1$-$32_4$ than when the ATV is equipped with the wheels $30_1$-$30_4$.

The difference in operation of the braking system 19 between the wheel mode and the track mode may be implemented in various ways. For example, in this embodiment, the braking controller 74 implements a first control process in the wheel mode and a second control process, different from the first control process, in the track mode. The first control process (in the wheel mode) may comprise one or more programs of the braking controller 74 performing a certain set of computations (e.g., based on functions, equations, etc.) and/or using certain reference data (e.g., a map, table, curve or other set of reference values), and the second control process (in the track mode) may comprise these one or more programs of the braking controller 74 performing a different set of computations and/or using different reference data.

Figure 20:
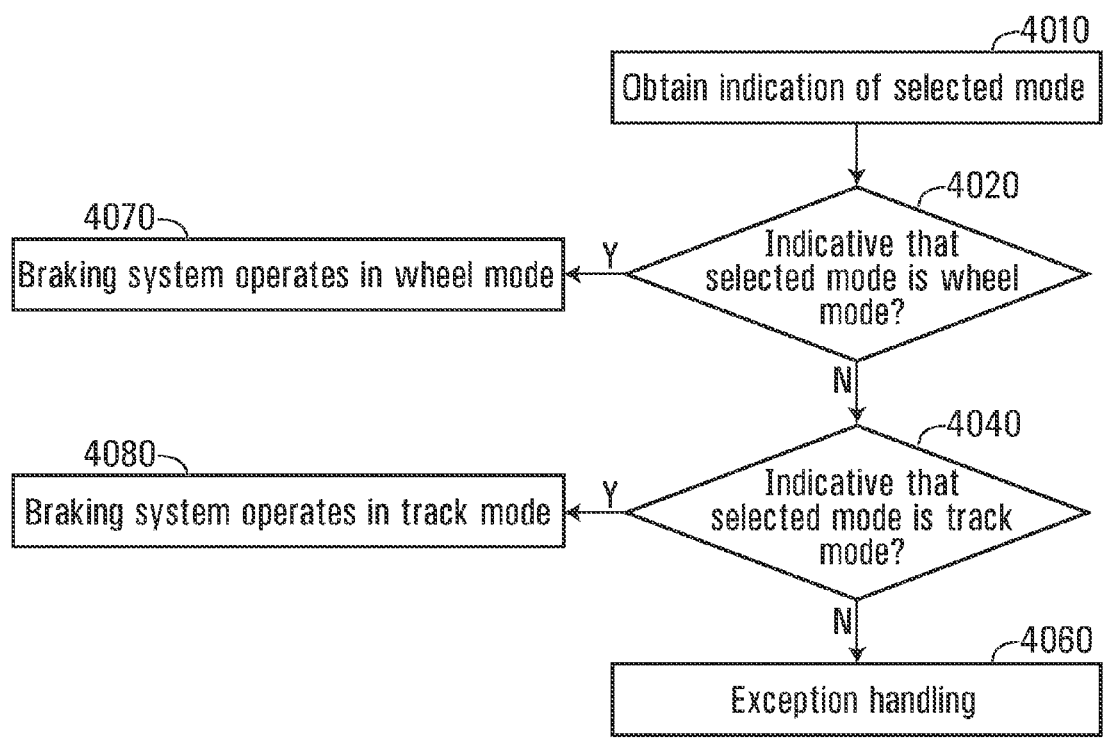
FIG. 20 shows an example of a process implemented by the braking controller.

In this embodiment, the mode selector 53 (discussed previously) provides an indication of a selected one of the wheel mode and the track mode to the braking controller 74, which causes the braking system 19 to operate in the selected mode. An example of a process which may be implemented by the braking controller 74 to control operation of the braking system 19 is shown in FIG. 20.

B. Braking System Feature(s) Facilitating Use of ATV when Equipped with Track Assemblies In some embodiments, the braking system 19 may have one or more braking system features that facilitate use of the ATV 10 when the ATV 10 is equipped with the track assemblies $32_1$-$32_4$. In some cases, such braking system features may be provided in embodiments in which the braking system 19 is operable differently in a wheel mode and a track mode, as discussed above. In other cases, such braking system features may be provided in embodiments in which the braking system 19 is not operable differently in a wheel mode and a track mode, as discussed above, but rather operates in the same manner regardless of whether the ATV 10 is equipped with the wheels $30_1$-$30_4$ or the track assemblies $32_1$-$32_4$.

As an example, in some embodiments, the brakes $81_1$-$81_4$ and/or the brake lines of the braking system 19 may be sealed to protect against snow, mud, etc., and/or may be insulated to protect against cold temperatures when used in winter conditions.

The braking system 19 may be configured in various other ways in other embodiments.

7. Frame

The frame 11 is a supporting structure that supports components of the ATV 10, including the powertrain 12, the steering system 17, the suspension 15, the braking system 19, and the body 21.

The frame 11 facilitates use of the ATV 10 whether the ATV 10 is equipped with the wheels $30_1$-$30_4$ or the track assemblies $32_1$-$32_4$. This can be achieved in various ways in various embodiments.

For example, in some embodiments, as shown in FIGS. 1B and 2B, a width $W_t$ of the ATV 10 equipped with the track assemblies $32_1$-$32_4$ may be within a certain range of a width $W_w$ of the ATV 10 equipped with the wheels $30_1$-$30_4$ (measured at the bottom of the ATV 10). For instance, in some case, a ratio $W_t/W_w$ of the width $W_t$ of the ATV 10 equipped with the track assemblies $32_1$-$32_4$ to the width $W_w$ of the ATV 10 equipped with the wheels $30_1$-$30_4$ may be no more than 1.12, in some cases no more than 1.10, in some cases no more than 1.05, and in some cases no more than 1.00. Keeping the width $W_t$ of the ATV 10 equipped with the track assemblies $32_1$-$32_4$ within such values may allow the ATV 10 equipped with the track assemblies $32_1$-$32_4$ to be transported on a standard ATV trailer.

In order to provide sufficient space for the track assemblies $32_1$-$32_4$, the width of the frame 11 may be adjusted in the area of one or both of its front and/or rear ends. As a result, the frame 11 may narrow along its longitudinal axis from its center towards one (or both) of its opposing ends. For example, in some cases, the front end of the frame 11 (i.e., the portion of the frame facing the forward direction of travel for the ATV 10) may be narrower that its longitudinal center in order that the width of the track assemblies at this end (e.g., $W_{f,t}$ of the assemblies $32_1$ and $32_2$) are equal to or less than the width $W_t$. Likewise, the rear end of the frame 11 (i.e., the portion of the frame that faces the rearward direction of travel for the ATV 10) may also be narrower that its longitudinal center in order that the width of the track assemblies at this end (e.g., $W_{f,t}$ of the assemblies $32_3$ and $32_4$) are also equal to or less than the width $W_t$. In other cases, the entire width of the frame 11 (i.e., $W_{f,t}$) may be such that the track assemblies $32_1$-$32_4$ remain within the width $W_t$ described above. In such cases, the width $W_{f,t}$ of the frame at its longitudinal center is roughly equivalent to that at either of its opposed (front/rear) ends.

Figure 23:
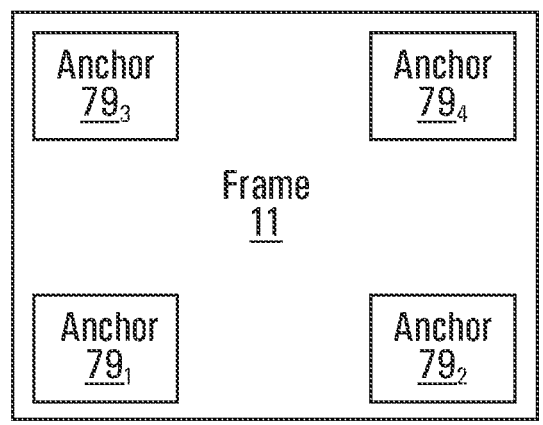
FIG. 23 shows anchors of a frame of the ATV for connection to anti-rotation connectors of the track assemblies.

In some embodiments, as shown in FIG. 23, the frame 11 may comprise a plurality of anchors $79_1$-$79_4$ for anchoring the anti-rotation connectors 52 of the track assemblies $32_1$-$32_4$. The anchors $79_1$-$79_4$ are built into the frame 11 during manufacturing of the ATV 10.

For example, in some embodiments, each anchor $79_i$ may comprise a hole to accommodate a bolt or other fastener which fastens the anti-rotation connector 52 of a track assembly $32_i$ to the anchor $79_i$ and, thus, to the frame 11. The hole may be threaded such that a bolt may be screwed directly into the anchor $79_i$ itself without the need for a nut or the like. Alternatively, a nut or similar internally threaded element may be used.

In some cases, the hole of the anchor $79_i$ may be provided in a structural member of the frame 11. In other cases, the anchor $79_i$ may comprise a bracket or other projection which projects from a structural member of the frame 11 and in which the hole is provided.

The anchors $79_1$-$79_4$ are integrated within the frame 11 during manufacturing of the ATV 10. For example, in cases where the frame 11 is cast, the anchors $79_1$-$79_4$ may be cast with the frame 11 such that when the frame 11 is cast, the anchors $79_1$-$79_4$ are formed. As another example, the anchors $79_1$-$79_4$ may be welded to members of the frame 11. As yet another example, the anchors $79_1$-$79_4$ may be machined (e.g., drilled) into the frame 11.

In certain embodiments, the ATV 10 may be expected to be used with different versions of track assemblies, such as the track assemblies $32_1$-$32_4$, whose anti-rotation connectors 52 can be mounted at identical locations on the frame 11. For example, the ATV 10 may be expected to be used with a family of track assemblies whose anti-rotation connector 52 can be mounted in the exact same place on the frame 11 regardless of the model of track assembly installed. In such embodiments, the anchors $79_1$-$79_4$ may be at a fixed position on the frame 11 since the position of the connection between the anti-rotation connector 52 and the frame 11 is also fixed.

In other embodiments, the ATV 10 may be expected to be used with different versions of track assemblies, such as the track assemblies $32_1$-$32_4$, whose anti-rotation connectors 52 cannot be mounted at the same locations on the frame 11. In such embodiments, the anchors $79_1$-$79_4$ may accommodate the variable position of the anti-rotation connector 52 for the different versions of track assemblies.

For example, in some cases, each anchor $79_i$ may have a variable position on the frame 11 to accommodate different models of track assemblies. For instance, the anchor $79_i$ may comprise a bracket that can be moved between two or more locations on the frame 11 to change the location of the anchor $79_i$.

In other cases, for each track assembly spot, there may be multiple anchors 79 to accommodate different models of track assemblies that can be mounted at that spot (e.g., a first anchor at the spot of track assembly $32_i$ to be used if the track assembly $32_i$ is a given model, and a second anchor at the spot of track assembly $32_i$ to be used if the track assembly $32_i$ is a different model).

The frame 11 may be configured in various other ways in other embodiments.

8. Body

The body 21 is an external structure of the ATV 10 which conceals components of the ATV 10. The body 21 comprises a plurality of body components, including, in this embodiment, fenders $55_1$-$55_4$, footrests $81_1$-$81_2$, a bumper 57, a skid plate 82, and a seat 80.

In this case, the ATV 10 is designed to be used by a single person and thus the seat 80 accommodates only the driver.

The seat 80 is a straddle seat. In other cases, the ATV 10 may be designed to be used by two (2) individuals, namely the driver and a passenger, in which cases the seat 80 may accommodate both the driver and the passenger (e.g., behind one another or side-by-side) or the body 21 may comprise an additional seat for the passenger.

The body 21 facilitates use of the ATV 10 whether the ATV 10 is equipped with the wheels $30_1$-$30_4$ or the track assemblies $32_1$-$32_4$. This can be achieved in various ways in various embodiments.

A. Body Configurable Differently Depending on Whether ATV is Equipped with Wheels or Track Assemblies In some embodiments, the body 21 may be configurable differently depending on whether the ATV 10 is equipped with the wheels $30_1$-$30_4$ or the track assemblies $32_1$-$32_4$. That is, at least one body component of the body 21 may have a first configuration (e.g., a first size and/or a first position) when the ATV 10 is equipped with the wheels $30_1$-$30_4$ and a second configuration (e.g., a second size and/or a second position), different from the first configuration, when the ATV 10 is equipped with the track assemblies $32_1$-$32_4$.

Figure 24:
FIG. 24 shows an adjustable body component of a body of the ATV.
Figure 24:
Figure 24:
Figure 24:
Figure 25:
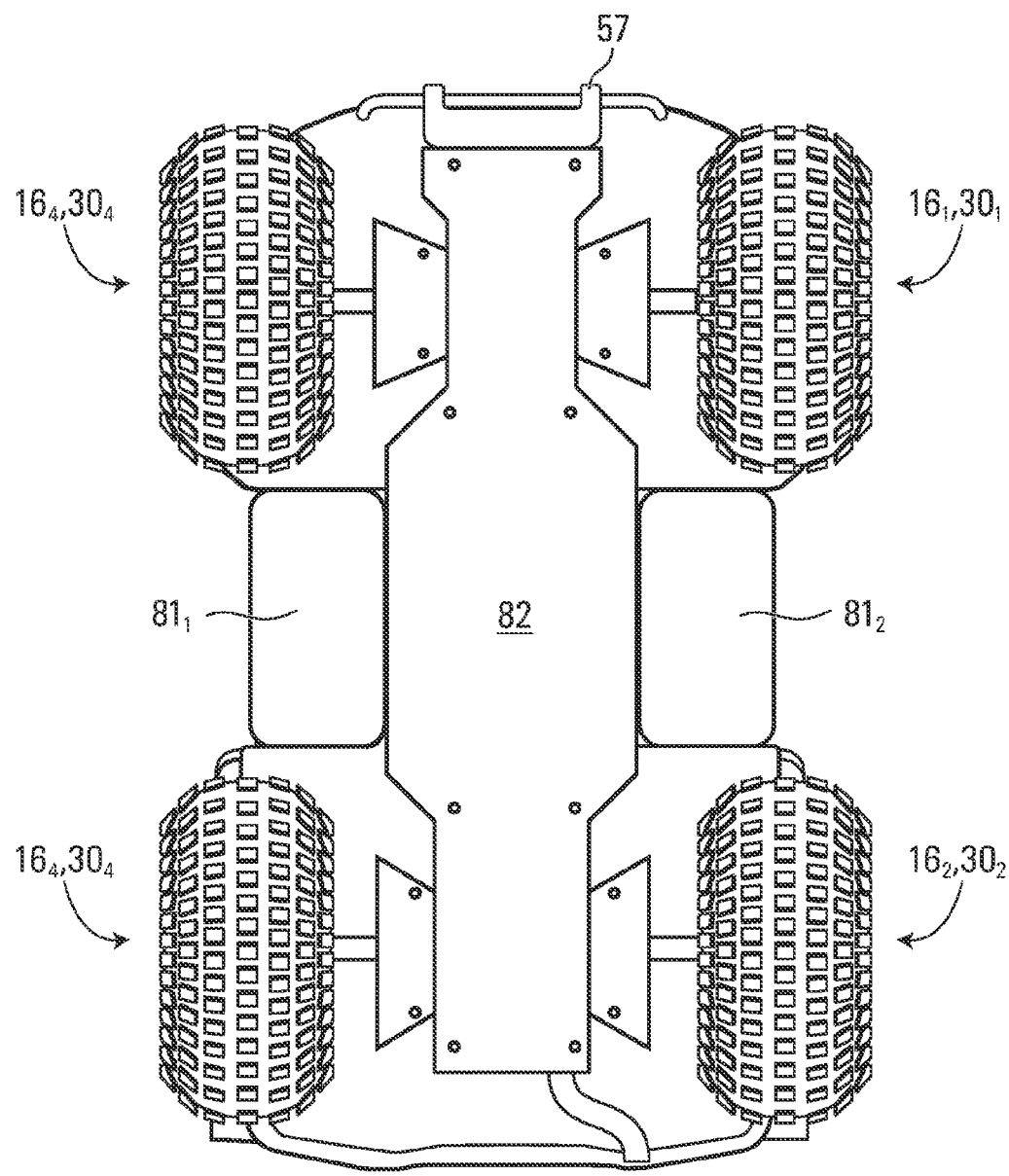
FIG. 25 shows a skid plate of the ATV.

For instance, in some embodiments, one or more body components of the body 21 may be adjustable (e.g., retractable, extendable, pivotable or otherwise movable) such that they have different configurations depending on whether the ATV 10 is equipped with the wheels $30_1$-$30_4$ or the track assemblies $32_1$-$32_4$. Thus, as shown in FIG. 24, a body component 83 may be adjustable from a first configuration (e.g., a first size and/or a first position) when the ATV 10 is equipped with the wheels $30_1$-$30_4$ and a second configuration (e.g., a second size and/or a second position), different from the first configuration, when the ATV 10 is equipped with the track assemblies $32_1$-$32_4$.

As an example, in some embodiments, each of the fenders $55_1$-$55_4$ may be adjusted to provide additional clearance for the track assemblies $32_1$-$32_4$ while providing additional protection against projection of snow, mud and/or other ground matter towards the user due to motion of the tracks 45.

For instance, in some cases, a position of each fender $55_i$ may be adjusted such that the fender $55_i$ has a first position when the ATV 10 is equipped with the wheels $30_1$-$30_4$ and a second position, different from (e.g., higher than, lower than, longitudinally more forward or more rearward, at another angle than, etc.) its first position, when the ATV 10 is equipped with the track assemblies $32_1$-$32_4$. The fender $55_i$ may be mounted to a translational (e.g., rail) mechanism and/or a pivot mechanism allowing it to be moved between its first and second position and locked into a desired position.

Instead of or in addition to adjusting the position of each fender $55_i$, a size of the fender $55_i$ may be adjusted. For example, a length of the fender $55_i$ may be adjusted such that the fender $55_i$ has a first length when the ATV 10 is equipped with the wheels $30_1$-$30_4$ and a second length, different from (e.g., longer than) its first length, when the ATV 10 is equipped with the track assemblies $32_1$-$32_4$. The adjustment in size of the fender $55_i$ may be done by providing the fender with two or more parts which can move relative to one another (e.g., retract and extend from one another).

As another example, in some embodiments, the seat 80 and/or the footrests $81_1$, $81_2$ may be adjusted to provide a more appropriate riding position for the user and additional clearance for the track assemblies $32_1$-$32_4$. When the ATV 10 is equipped with the wheels $30_1$-$30_4$, the footrests $81_1$, $81_2$ may be set at a first position, say a first height, and the seat 80 may have a first position that results in the riding position of the user being generally longitudinally equidistant between front and rear ones of the wheels $30_1$-$30_4$. The height of the footrests $81_1$, $81_2$ may be set to ensure there is sufficient ground clearance to reduce the possibility that the rider's foot and/or the footrest $81_1$ will contact a wheel $30_i$ and/or certain ground objects.

When the ATV 10 is equipped with the track assemblies $32_1$-$32_4$, whose dimensions are significantly different from those of the wheels $30_1$-$30_4$, the height of the footrests $81_1$, $81_2$ and/or the position of the seat 80 may be adjusted. In some cases, the riding position of the user when the seat 80 is in its first position and/or the footrests $81_1$ and $81_2$ are at their first height may not be optimal for this situation. For instance, the user may not be generally longitudinally equidistant between front and rear ones of the track assemblies $32_1$-$32_4$, since the overall length of a track assembly $32_i$ is likely greater than the diameter of a wheel $30_i$. Using the ATV 10 from such a riding position may negatively impact a user's ability to control the vehicle, leading to unexpected consequences. Also, the ground clearance defined by the first height of the footrests $81_1$, $81_2$ may be too low or too high depending on the height of the track assembly $32_i$ compared to the diameter of the wheel $30_i$. This may increase the chance of the user's foot coming into unintended contact with the track 45 or some other component of the track assembly 32i.

Thus, the ATV 10 may be provided with a second position for the seat 80 and/or a second position, say a second height, for the footrests $81_1$, $81_2$ in cases where the track assemblies $32_1$-$32_4$ are used. In this setup, the riding position of the user defined by the seat 80 and footrests $81_1$-$81_2$ may be adjusted to bring the user generally longitudinally equidistant between front and rear ones of the track assemblies $32_i$. In addition, the height of the footrests $81_1$, $81_2$ may also be adjusted to a second height in order to ensure the proper clearance of the footrests relative to the track assemblies $32_1$-$32_4$.

The adjustment of the seat 80 between its first and second positions and/or the adjustment of the footrests $81_1$, $81_2$ between their first and second heights may be performed without having to remove these components from the ATV 10. For example, each of the seat 80 and the footrests $81_1$-$81_2$ may be mounted to a respective translational (e.g., rail) mechanism and/or a respective pivot mechanism allowing it to be moved between its first and second position and locked into a desired position.

In some cases, instead of or in addition to adjusting the position of the seat 80 and the position of each of the footrests $81_1$, $81_2$, a size of the seat 80 and/or a size of each of the footrests $81_1$, $81_2$ may be adjusted. For example, a length of each of the footrests $81_1$, $81_2$ may be adjusted such that each footrest has a first length when the ATV 10 is equipped with the wheels $30_1$-$30_4$ and a second length, different from (e.g., shorter than) its first length, when the ATV 10 is equipped with the track assemblies $32_1$-$32_4$. The adjustment in size of the footrest $81_i$ may be done by providing the footrest with two or more parts which can move relative to one another (e.g., retract and extend from one another).

Similar adjustment mechanisms may be provided for other components of the body 21, such as the bumper 57 (e.g., a bumper that can be adjusted between a first length and/or a first height when the ATV 10 is configured with the wheels $30_1$-$30_4$ and a second length and/or a second height when the ATV is configured with the track assemblies $32_1$-$32_4$).

As another example, in some embodiments, one or more body components of the body 21 may be removable to allow them to be selectively removed from and installed on the ATV 10 depending on whether the ATV 10 is equipped with the wheels $30_1$-$30_4$ or the track assemblies $32_1$-$32_4$.

For instance, in some cases, the ATV 10 may have a first set of fenders $55_{1a}$-$55_{4a}$ that are used when the ATV 10 is equipped with the wheels $30_1$-$30_4$ and a second set of fenders $55_{1b}$-$55_{4b}$, different from the first set of fenders $55_{1a}$-$55_{4a}$ (e.g., different size), that are used when the ATV 10 is equipped with the track assemblies $32_1$-$32_4$.

The interior portion of the fenders in each set of fenders may be designed to ensure sufficient clearance between its interior surface and the wheel $30_i$ or track assembly $32_i$ in order to avoid unintended contact and also protect the user against ground matter (e.g., dirt, rocks, water, snow or mud) that may be kicked up during use of the ATV 10. In contrast, the exterior portion of the fenders in each set of fenders may be such that the external appearance of the body 21 of the ATV 10 looks generally the same regardless of the set of fenders installed.

Each of the fenders $55_i$ in each set of fenders $55_{1a}$-$55_{4a}$ and $55_{1b}$-$55_{4b}$ may be removably mounted to the frame 11 at a mounting portion. This mounting portion defines an area on the frame 11 where a fender $55_i$ may be attached to the frame 11 via one or more fasteners (e.g., nuts and bolts). Alternatively, the mounting portion may define an area that comprises holes or projections that form part of a fastener, such as a hole that has been threaded for entry of a nut or a projection with a threaded end for connection to a bolt.

Similar replacement arrangements may be provided for other components of the body 21, such as, for instance: the bumper 57 (e.g., a first bumper that can be used with the wheels $30_1$-$30_4$ is mounted to a mounting portion at or towards the front of the frame 11 that allows its exchange with a second bumper that can be used with the track assemblies $32_1$-$32_4$); the footrests $81_1$, $81_2$ (e.g., a first set of footrests that can be used with the wheels $30_1$-$30_4$ is mounted to a mounting portion along the lateral sides of the frame 11 that allows exchange with a second set of footrests that can be used with the track assemblies $32_1$-$32_4$); and/or the seat 80 (e.g., a first seat designed to place the user in a first riding position for the wheels $30_1$-$30_4$ is mounted to a mounting portion along the top of the frame 11 that allows exchange with a second seat that places the user in a second riding position for the track assemblies $32_1$-$32_4$).

While in embodiments discussed above the attachment between the mounting portion on the frame 11 and a component of the body 21 (e.g., the fenders $55_1$-$55_4$) may be made via fasteners such as nuts and bolts, other methods of attachments may be used to mount such components of the body 21 to the frame 11. For example, in some embodiments, body components may be mounted to the body 21 through magnetic attraction. The mounting portion of the frame 11 is magnetized with a specific polarity (e.g., a positive (+) polarity), while the body components (e.g., the first set of fenders $55_{1a}$-$55_{4a}$) are magnetized with the opposite polarity (e.g., a negative (−) polarity). To dismount the body component, the mounting portion may be demagnetized to remove the magnetic attraction between them. Alternatively, the polarity of the mounting portion may be shifted such that the two components are magnetically repelled. The body component is replaced with its replacement (e.g., the second set of fenders $55_{1b}$-$55_{4b}$) and the polarity of the mounting portion is restored (or alternatively, switched back to its original polarity) in order that the force of magnetic attraction helps to mount the body component.

In some embodiments, different kits of body components may be used depending on whether the ATV 10 is equipped with the wheels $30_1$-$30_4$ or the track assemblies $32_1$-$32_4$. For example, in some cases, a first kit including a first set of fenders $55_1$-$55_4$ and a first set of step plates $81_1$-$81_2$ may be provided for when the ATV 10 is equipped with the wheels $30_1$-$30_4$, and a second kit including a second set of fenders $55_1$-$55_4$ and a second set of step plates $81_1$-$81_2$ may be provided for when the ATV 10 is equipped with the track assemblies $32_1$-$32_4$, where the fenders $55_1$-$55_4$ of the second kit are different from the fenders $55_1$-$55_4$ of the first kit and the step plates $81_1$-$81_2$ of the second kit are different from the step plates $81_1$-$81_2$ of the first kit. This can allow different kits of body components to be offered for different models of track assemblies $32_1$-$32_4$.

B. Body Feature(s) Facilitating Use of ATV when Equipped with Track Assemblies

In some embodiments, the body 21 may have one or more body features that facilitate use of the ATV 10 when the ATV 10 is equipped with the track assemblies $32_1$-$32_4$. In some cases, such body features may be provided in embodiments in which the body 21 is configurable differently depending on whether the ATV 10 is equipped with the wheels $30_1$-$30_4$ or the track assemblies $32_1$-$32_4$, as discussed above. In other cases, such body features may be provided in embodiments in which the body 21 is not configurable differently depending on whether the ATV 10 is equipped with the wheels $30_1$-$30_4$ or the track assemblies $32_1$-$32_4$, but rather is configured in the same manner regardless of whether the ATV 10 is equipped with the wheels $30_1$-$30_4$ or the track assemblies $32_1$-$32_4$.

For example, in some embodiments, the body 21 may protect against accumulation of snow, mud or other ground matter in the track assemblies $32_1$-$32_4$ or in spaces between the track assemblies $32_1$-$32_4$ and the frame 11.

As an example, the interior portion of the fenders $55_1$-$55_4$ may be designed in such a way that ground matter that is projected or kicked up by the track 45 is projected away from the frame 11 and/or the assemblies $32_1$-$32_4$. One possibility is to shape the interior portion of the fender $55_i$ (i.e., the portion facing the track 45) in a convex way that provides for the outward deflection of ground matter. Alternatively, the interior portion of the fender $55_i$ could be provided with one or more channels that serve to collect ground matter in a particular area in order that the force of gravity can dislodge this matter naturally.

As another example, in some embodiments, the skid plate 82 may facilitate sliding of the ATV 10 on (or over) an obstacle when equipped with track assemblies $32_1$-$32_4$.

To allow for the sliding of the ATV 10 configured with the assemblies $32_1$-$32_4$, the skid plate 82 may be designed to cover more of a bottom area of the ATV 10 than a conventional skid plate for a similar wheeled vehicle. For instance, the length of the skid plate 82 may be extended longitudinally to cover areas of the ATV 10 that lie in front of and/or behind the front or rear track assemblies.

In addition to the above, the skid plate 82 may be designed with certain lateral extensions that protect components of the suspension 15, such as portions of the spring/damper device 70 and/or other components of the ATV 10. These extensions may serve to both protect these ATV components from sliding impact with objects proximate to the ground, as well as to impede ground matter (e.g., mud, snow and water) from entering this system.

In order to improve the sliding ability of the ATV 10, the skid plate 82 may be formed from materials that have generally low coefficients of friction. In particular, the skid plate 82 may have a coefficient of friction with snow and/or other ground matter on which the ATV 10 is used that is lower than the coefficient of friction of metal (e.g., steel) with such snow or other ground matter. For example, the skid plate 82 may include low-friction non-metallic material, such as polymeric material (e.g., ABS plastic) or composite material (e.g., carbon fiber based), both of which have a lower coefficient of friction than metallic material (e.g., steel or aluminum) traditionally used for this component. The low-friction non-metallic material may make up an entirety of the skid plate 82 or a major portion (i.e., more than half) of the skid plate 82, or a minor portion (i.e., less than half) thereof (e.g., a ground-facing layer or coating). For instance, the skid plate 82 may be formed from a metal (e.g., steel or aluminum) that has been coated on a ground-facing side with a low-friction material that reduces its overall coefficient of friction. For example, the skid plate 82 may be formed from aluminum that has been subsequently coated with Kevlar in order to reduce the friction between itself and an object over which the ATV 10 slides.

The body 21 may be configured in various other ways in other embodiments.

9. User Interface

The user interface 18 enables the user to interact with the ATV 10. As mentioned previously, the user interface 18 comprises the accelerator 40, the brake control 73, and the steering device 13 that are operated by the user to control motion of the ATV 10 on the ground, as well as the instrument panel 90 which conveys information to the user.

The instrument panel 90 provides various indicators to convey information to the user. For example, the instrument panel 90 may provide:

- a speedometer indicator which conveys information indicative of the speed at which the ATV 10 is moving as measured by a speedometer of the ATV 10 ("ATV speed information");
- a tachometer indicator which conveys information indicative of the speed at which the prime mover 14 is running as measured by a tachometer of the ATV 10 ("prime mover speed information");
- an odometer indicator which conveys information indicative of a distance traveled by the ATV 10 as measured by an odometer of the ATV 10;
- a fuel gauge indicator which conveys information indicative of a quantity of fuel remaining in the ATV 10 ("fuel gauge information");
- a battery gauge indicator which conveys information indicative of a level of charge remaining in a battery unit of the ATV 10 ("battery gauge information") in cases where the prime mover 14 comprises an electric motor; and/or
- any other indicator conveying information to the user.

Figure 26:
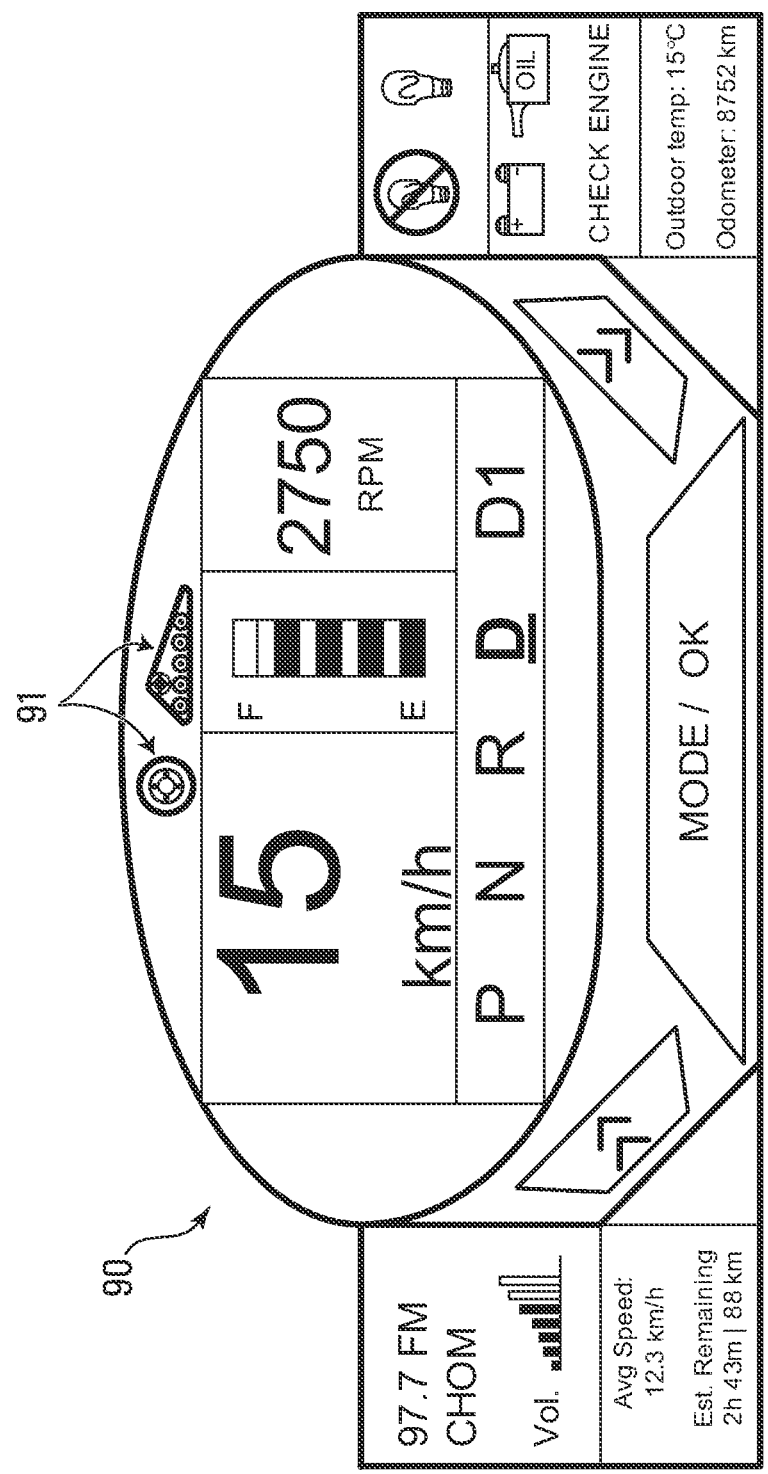
FIG. 26 shows an instrument panel of the ATV.

In this embodiment, as shown in FIG. 26, the instrument panel 90 is an electronic instrument panel comprising an electronic display (e.g., a liquid-crystal display (LCD), etc.) on which are displayed the speedometer indicator, the tachometer indicator, the odometer indicator, and/or other indicators to convey information to the user. Each of the speedometer indicator, the tachometer indicator, the odometer indicator, and/or other indicators may comprise a digital numerical reading, a digital dial, a digital bar graph, a digital symbol, and/or any other element displayable on the electronic display to convey information to the user.

The instrument panel 90 may be configured in various other ways in other embodiments. For instance, in some embodiments, the instrument panel 11 may comprise one or more mechanical dials (e.g., a speedometer dial, a tachometer dial, a fuel gauge dial, etc.) or other mechanical indicators (e.g., a mechanical odometer), one or more light indicators (e.g., low fuel light indicator, etc.), and/or one or more electronic display screens.

The user interface 18 facilitates use of the ATV 10 whether the ATV 10 is equipped with the wheels $30_1$-$30_4$ or the track assemblies $32_1$-$32_4$. This can be achieved in various ways in various embodiments.

For example, in some embodiments, information conveyed to the user by the instrument panel 90 may be adapted depending on whether the ATV 10 is equipped with the wheels $30_1$-$30_4$ or the track assemblies $32_1$-$32_4$. For instance, in some cases:

i. The ATV speed information conveyed by the speedometer indicator may be adapted based on whether the ATV 10 is equipped with the wheels $30_1$-$30_4$ or the track assemblies $32_1$-$32_4$.

In particular, the speedometer may need to be calibrated differently when the ATV 10 is configured with the wheels $30_1$-$30_4$ than when it is configured with the track assemblies $32_1$-$32_4$. For example, if the speedometer bases its calculations for the current speed of the ATV upon the output of the transmission 20 and/or upon the current rotational speed of the final drive axles 51 of the ATV 10, the actual speed of the ATV 10 on the ground will differ depending on whether the ATV 10 is equipped with the wheels $30_1$-$30_4$ or the track assemblies $32_1$-$32_4$. In such a case, the speedometer may need to be calibrated based on the current configuration of the ATV 10 (i.e., whether it is using the wheels or the track assemblies) using dimensions of the wheels $30_1$-$30_4$ and the track assemblies $32_1$-$32_4$. Thus, the speedometer may have a first calibration for the ATV 10 when it is equipped with the wheels $30_1$-$30_4$ and a second calibration for the ATV 10 when it is equipped with the tracked assemblies $32_1$-$32_4$. In addition, the speedometer may be configured to switch from its first calibration to its second calibration (or vice-versa) based on the mode selector 53.

ii. Range information indicative of an estimated range that the ATV 10 can travel based on a quantity of energy (e.g., fuel and/or battery charge) remaining in the ATV 10 may be adapted based on whether the ATV 10 is equipped with the wheels $30_1$-$30_4$ or the track assemblies $32_1$-$32_4$.

For example, in this embodiment where the prime mover 14 comprises an internal combustion engine, the instrument panel 90 may provide a fuel gauge indicator and/or a numerical indicator that provides an estimate of distance (or operational time) that the ATV 10 can be used based on its current fuel level. In some cases, this estimate may be calculated based on such factors as ATV's average fuel consumption over a predetermined period of time, (e.g., the last 10 minutes, the last hour, the last 24-hour period, etc.). In other cases, the average fuel consumption may be based on a time period that is not predetermined, such as the time since the ATV 10 was activated (i.e., the prime mover 14 was engaged) and/or the overall life of the vehicle.

Although the level shown by the fuel gauge indicator itself may be independent of the current configuration of the ATV 10, the calculation of the estimated remaining distance or time may need to be calibrated differently depending on whether the ATV 10 is equipped with the wheels $30_1$-$30_4$ or the track assemblies $32_1$-$32_4$. For example, fuel consumption of the ATV 10 may increase when it is configured with the track assemblies $32_1$-$32_4$ relative to when the ATV 10 is equipped with the wheels $30_1$-$30_4$. In this case, the calculation of the estimated remaining time or distance may need to take this increased fuel consumption into account when the ATV 10 is equipped with the track assemblies $32_1$-$32_4$.

In some embodiments, the prime mover 14 may comprise an electric motor (e.g., a purely electric ATV or a hybrid ATV). In the case where the prime mover 14 comprises only an electric motor, the calculation of the estimated time or distance remaining may be generally be the same as for when the prime mover 14 comprises only an internal combustion engine, except that it is the remaining charge level of the battery unit of the ATV 10 that is taken into account. In the case where the prime mover 14 is a hybrid prime mover comprising both an internal combustion engine and an electric motor, the calculation of the estimated remaining time or range may depend on a variety of factors, including, for example: whether the electric motor and/or the internal combustion engine is/are being used; the average fuel consumption calculated when the prime mover 14 is run from the electric motor versus when it is run from the internal combustion engine; the current charge left in the battery unit and the current amount of fuel left in the gas tank; and/or the statistical probability that the prime mover 14 will shift between one motor to the other (which may be based on historical precedent or on a statistical analysis of driving habits).

iii. Maintenance scheduler information indicative of when a maintenance activity (e.g., oil change) is to be performed may be adapted based on whether the ATV 10 is equipped with the wheels $30_1$-$30_4$ or the track assemblies $32_1$-$32_4$.

The instrument panel 90 may provide information that indicates when a particular maintenance activity needs to be performed. Maintenance activities that may be identified on this panel may include scheduled (e.g., an oil change) and/or unscheduled (e.g., a 'dead' (uncharged) battery preventing activation of the ATV 10) activities.

Scheduled maintenance activities for the ATV 10 may be based on time- or distance-based intervals, such as scheduling an oil change every 5,000 miles (or 10,000 kilometers). However, other maintenance activities may depend on the general configuration of the ATV 10, such as whether the vehicle is equipped with the wheels $30_1$-$30_4$ or the track assemblies $32_1$-$32_4$. For example, certain scheduled maintenance for the transmission 20, such as draining and replacing the transmission fluid, may occur at a first interval when the ATV 10 is equipped with the wheels (e.g., every 20,000 kilometers) and at a second different interval when the ATV is equipped with the track assemblies (e.g., every 10,000 kilometers). Different maintenance intervals may be required due to heavier demands placed on the transmission 20 by the track assemblies $32_1$-$32_4$ relative to lighter demands placed on it by the wheels $30_1$-$30_4$.

The maintenance scheduler information displayed on the instrument panel 90 may be based on the amount of time the ATV 10 has spent and/or the distance the ATV 10 has traveled in each of its wheel mode and its track.

For example, assume that the ATV 10 has traveled 15,000 kilometers since its last scheduled maintenance and that the maintenance interval for the transmission 20 is 10,000 km in a tracked configuration vs. 20,000 km in a wheeled configuration. Further assume that from this distance, 8,000 km were traveled with the ATV 10 equipped with the track assemblies $32_1$-$32_4$, while the remaining 7,000 km was traveled while the ATV was equipped with wheels $30_1$-$30_4$. In this case, the transmission controller 36 (which may be preprogrammed with such maintenance intervals) may determine that the overall distance traveled in both configurations is sufficient to require the transmission fluid be replaced since 80% of the tracked maintenance interval and 35% of the wheeled maintenance interval have been used. As a result, an indicator on the instrument panel 90 may be displayed to indicate this finding to the user.

Although maintenance activities for the transmission 20 have been mentioned in the above example, similar maintenance activities may exist for other components of the ATV 10 (e.g., the prime mover 14, the steering system, etc.) and the maintenance scheduler information provided by the instrument panel 90 may be adapted in a similar manner taking into account the amount of time the ATV 10 has spent and/or the distance the ATV 10 has traveled in each of its wheel mode and its track.

iv. A tire pressure indicator, if available, may be deactivated when the ATV 10 is equipped with the track assemblies $32_1$-$32_4$. While indicating that the tire pressure is too low when the ATV 10 is equipped with the wheels $30_1$-$30_4$ is useful, this is not the case when the ATV 10 is equipped with the track assemblies $32_1$-$32_4$.

The instrument panel 90 may also provide other mode-specific indicators to indicate conditions that are specific to only one of the wheel mode and the track mode of the ATV 10. Such mode-specific indicators may be disabled when the ATV 10 is not in the mode for which the indicator is relevant.

Also, in this embodiment, the instrument panel 90 provides a mode indicator 91 indicative of whether the ATV 10 is operating in the wheel mode or the track mode. The ATV 10 operates in the wheel mode when it is equipped with the wheels $30_1$-$30_4$ and at least one component of the ATV 10 operates in its wheel mode. In this case, each of the powertrain 12, the steering system 17, the suspension 15, and the braking system 19 operates in its wheel mode. Conversely, the ATV 10 operates in the track mode when it is equipped with the track assemblies $32_1$-$32_4$ and at least one component of the ATV 10 operates in its track mode. In this case, each of the powertrain 12, the steering system 17, the suspension 15, and the braking system 19 operates in its track mode.

The mode indicator 91 indicates whether the ATV 10 is operating in the wheel mode or the track mode based on an indication provided by the mode selector 53 discussed previously. The mode indicator 91 may comprise one or more words (e.g., "wheel mode" or "track mode"), a symbol (e.g., representing a wheel or a track), or any other element that indicates to the user that the ATV 10 is operating as being equipped with the wheels $30_1$-$30_4$ or the track assemblies $32_1$-$32_4$.

The instrument panel 90 may provide indicators to indicate conditions that are likely to arise when the ATV 10 is equipped with the track assemblies $32_1$-$32_4$, but unlikely to arise when the ATV 10 is equipped with the wheels $30_1$-$30_4$. For example, in some embodiments, the instrument panel 90 may provide an air filter indicator to indicate whether flow of air relative to an filter of the ATV 10 is restrained. This may occur, for instance, when the ATV 10 is equipped with the track assemblies $32_1$-$32_4$ and travels on snow, which may limit or block flow of air relative to the air filter. A sensor may be provided on the ATV 10 to sense flow of air relative to the air filter and provide an indication of whether the flow of air is normal or abnormal.

The user interface 18 may be configured in various other ways in other embodiments.

It will thus be appreciated that the ATV 10 is designed to facilitate its use whether it is equipped with the wheels $30_1$-$30_4$ or the track assemblies $32_1$-$32_4$.

While the ATV 10 is described as being configured in a certain way in embodiments discussed above, the ATV 10 may be configured in various other ways in other embodiments.

For example, although various controllers of the ATV 10 discussed above, such as the powertrain controller 28, the steering controller 58, the suspension controller 66, the braking controller 74, and (if any) the mode controller of the mode selector 53, have been discussed and shown individually, these controllers may be arranged in various manners. For instance, in some embodiments, two (2) or more (e.g., all) of these controllers may be physically distinct from one another and may be connected to one another via a bus (e.g., a controller-area network (CAN) bus or other suitable bus). In other embodiments, two (2) or more (e.g., all) of these controllers may be functional entities of a single physical control module (e.g., an ATV controller).

As another example, the functionality of various controllers of the ATV 10, such as the powertrain controller 28, the steering controller 58, the suspension controller 66, and the braking controller 74, to control components of the ATV 10 to cause them to operate differently in a track mode than in a wheel mode may be provided in the ATV 10 in various ways. For instance:

In some embodiments, this functionality may be built into the ATV 10 during manufacturing of the ATV 10. In such cases, the ATV 10, when completed by its original equipment manufacturer (OEM), already comprises controllers with this functionality.

In other embodiments, this functionality may be implemented after manufacturing of the ATV 10 (e.g., as part of an aftermarket). For example, in some cases, controllers having this functionality may be offered commercially and installable in the ATV 10 (e.g., by replacing its original controllers). In other cases, program updates for modifying programming of existing controllers of the ATV 10 to implement this functionality may be offered commercially (e.g., on a tangible computer-readable medium (e.g., CD, DVD, etc.) and/or via downloading from a data network (e.g., Internet).

As yet another example, there may be a plurality of track modes in some embodiments, as various models of tracked assemblies may be used as the assemblies $32_1$-$32_4$ for the ATV 10. For example, in some embodiments, different models of track assemblies manufactured by different manufacturers may be mountable on the ATV 10 as the track assemblies $32_1$-$32_4$. As another example, in some embodiments, different models of track assemblies manufactured by a common manufacturer may be mountable on the ATV 10 as the track assemblies $32_1$-$32_4$, such as: a winter track assembly (e.g., with a thicker, studded track that can dig into snow and ice, a thicker frame, etc.) for riding in winter conditions, a wetland track assembly (e.g., with a wider frame and track) to operate in wetland environments; a trail track assembly for riding in trails, a general-purpose track assembly that is suitable for general operation (e.g., a "four-season" track assembly), etc.

One or more components of the ATV 10 (e.g., the powertrain 12, the steering system 17, the braking system 19, etc.) may operate differently in different ones of the track modes (e.g., the powertrain controller 28, the steering controller 58, the suspension controller 66 and/or the braking controller 74 may be configured such that they control their respective components in different ways depending on which of the track modes the ATV 10 is in).

In such embodiments, the ATV 10 may be capable of identifying which model of track assembly is installed as the track assemblies $32_1$-$32_4$. For instance, in some cases, the specific model of track assembly mounted on the ATV 10 may be indicated by the user via the instrument panel 90 (e.g., by selecting from a list of models of track assemblies stored in memory). In other cases, the specific model of track assembly mounted on the ATV 10 may be identified automatically by the ATV 10 (e.g., by having bar code reader that reads a serial number or other identification code provide on the track assembly). In any event, an indication of the specific model of track assembly mounted on the ATV 10 may be provided to the mode selector 53, such that the various controllers of the ATV 10 can adjust themselves accordingly to the specific model of track assembly that is installed as the track assemblies $32_1$-$32_4$.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. An all-terrain vehicle (ATV), the ATV being equippable with a plurality of ground-engaging wheels or a plurality of ground-engaging track assemblies providing traction on the ground, each ground-engaging track assembly of the plurality of ground-engaging track assemblies comprising: a plurality of track-contacting wheels; and an endless track disposed around the plurality of track-contacting wheels, the plurality of track-contacting wheels including a drive wheel for driving the endless track, the endless track comprising an inner side for facing the plurality of track-contacting wheels and a ground-engaging outer side for engaging the ground, the ATV comprising:
    a powertrain for delivering power to the ground-engaging wheels when the ATV is equipped with the ground-engaging wheels and to the drive wheels of the ground-engaging track assemblies when the ATV is equipped with the ground-engaging track assemblies, the drive wheels of the ground-engaging track assemblies being different from the ground-engaging wheels, the powertrain being operable in a wheel mode when delivering power to the ground-engaging wheels and in a track mode when delivering power to the drive wheels of the ground-engaging track assemblies; and
    a mode selector for selecting a particular one of the wheel mode and the track mode to cause the powertrain to operate in the particular one of the wheel mode and the track mode.

2. The ATV claimed in claim 1, wherein the powertrain comprises a prime mover for generating power, the prime mover operating differently in the track mode than in the wheel mode.

3. The ATV claimed in claim 2, wherein the powertrain is configured to control a power output of the prime mover differently in the track mode than in the wheel mode.

4. The ATV claimed in claim 2, comprising an accelerator for use by a user of the ATV, a response of the prime mover to input of the user at the accelerator being different in the track mode than in the wheel mode.

5. The ATV claimed in claim 2, wherein at least one of (i) an idle speed of the prime mover and (ii) a maximum speed of the prime mover is different in the track mode than in the wheel mode.

6. The ATV claimed in claim 2, wherein a torque curve or power curve of the prime mover is different in the track mode than in the wheel mode.

7. The ATV claimed in claim 2, wherein an operational region of a torque curve or power curve of the prime mover is different in the track mode than in the wheel mode.

8. The ATV claimed in claim 7, wherein the operational region of the torque curve or power curve of the prime mover in the track mode includes a lower range of speeds than the operational region of the torque curve or power curve of the prime mover in the wheel mode.

9. The ATV claimed in claim 2, wherein the powertrain is configured to control a temperature of the prime mover differently in the track mode than in the wheel mode.

10. The ATV claimed in claim 2, wherein an operational temperature range of the prime mover is different in the track mode than in the wheel mode.

11. The ATV claimed in claim 2, comprising a cooling system for cooling the prime mover, a rate of cooling of the prime mover by the cooling system being different in the track mode than in the wheel mode.

12. The ATV claimed in claim 2, wherein a warm-up process of the prime mover is different in the track mode than in the wheel mode.

13. The ATV claimed in claim 1, wherein the powertrain comprises a prime mover for generating power and a transmission for transmitting power, the transmission operating differently in the track mode than in the wheel mode.

14. The ATV claimed in claim 13, wherein the powertrain controls a transmission state of the transmission differently in the track mode than in the wheel mode.

15. The ATV claimed in claim 13, wherein a shifting scheme of the transmission is different in the track mode than in the wheel mode.

16. The ATV claimed in claim 13, wherein, for a given speed of the prime mover, a transmission ratio of the transmission is different in the track mode than in the wheel mode such that there is more torque at an output of the transmission in the track mode than in the wheel mode.

17. The ATV claimed in claim 13, wherein a set of available transmission states of the transmission is different in the track mode than in the wheel mode.

18. The ATV claimed in claim 17, wherein the set of available transmission states of the transmission in the track mode includes a transmission ratio that is lower than any transmission ratio of the set of available transmission states of the transmission in the wheel mode.

19. The ATV claimed in claim 13, wherein the transmission has at least one of (i) a transmission ratio dedicated to the wheel mode and (ii) a transmission ratio dedicated to the track mode.

20. The ATV claimed in claim 13, wherein the transmission has a greater number of transmission ratios in a reverse direction of the transmission in the track mode than in the wheel mode.

21. The ATV claimed in claim 1, wherein the powertrain comprises a traction control system, the traction control system operating differently in the track mode than in the wheel mode.

22. The ATV claimed in claim 1, wherein the powertrain is configured to control differently the power delivered to the drive wheels of the ground-engaging track assemblies in the track mode than the power delivered to the ground-engaging wheels in the wheel mode.

23. The ATV claimed in claim 1, wherein the powertrain is configured to apply more torque to the drive wheels of the ground-engaging track assemblies in the track mode than to the ground-engaging wheels in the wheel mode.

24. The ATV claimed in claim 1, wherein the powertrain comprises a powertrain controller for controlling the powertrain, the mode selector providing an indication of the particular one of the wheel mode and the track mode to the powertrain controller.

25. The ATV claimed in claim 1, comprising a user interface for use by a user of the ATV, the mode selector comprising a mode selection control implemented by the user interface, the mode selection control allowing the user to select the particular one of the wheel mode and the track mode.

26. The ATV claimed in claim 25, wherein the mode selection control comprises at least one of a button, a switch, a knob and a lever.

27. The ATV claimed in claim 1, wherein the mode selector comprises a sensor for sensing whether the ATV is equipped with the ground-engaging wheels or the ground-engaging track assemblies.

28. The ATV claimed in claim 27, wherein the sensor is a contact sensor for sensing whether the ATV is equipped with the ground-engaging wheels or the ground-engaging track assemblies based on physical contact with the contact sensor.

29. The ATV claimed in claim 27, wherein the sensor is a contactless sensor for sensing whether the ATV is equipped with the ground-engaging wheels or the ground-engaging track assemblies without physical contact with the contactless sensor.

30. The ATV claimed in claim 29, wherein the contactless sensor includes at least one of an optical sensor, an acoustic sensor, and a magnetic sensor.

31. The ATV claimed in claim 1, wherein the mode selector comprises a mode controller configured to select the particular one of the wheel mode and the track mode based on input from the powertrain.

32. The ATV claimed in claim 1, comprising a user interface for use by a user of the ATV, the user interface comprising a mode indicator indicating the particular one of the wheel mode and the track mode to the user.

33. The ATV claimed in claim 1, wherein the mode selector is configured to select the particular one of the wheel mode and the track mode based at least in part on an input not received from a user interface of the ATV.

34. The ATV claimed in claim 33, wherein the mode selector comprises a sensor for sensing whether the ATV is equipped with the ground-engaging wheels or the ground-engaging track assemblies; and wherein the input not received from the user interface of the ATV is received from the sensor.

35. The ATV claimed in claim 1, wherein the drive wheels of the ground-engaging track assemblies are smaller in diameter than the ground-engaging wheels.

36. The ATV claimed in claim 1, wherein the drive wheel of each of the ground-engaging track assemblies is spaced apart from a bottom run of the endless track.

37. The ATV claimed in claim 1, wherein the drive wheel of each of the ground-engaging track assemblies comprises a sprocket.

38. The ATV claimed in claim 1, wherein the plurality of track-contacting wheels includes a leading idler wheel and a trailing idler wheel spaced apart in a longitudinal direction of the ground-engaging track assembly.

39. The ATV claimed in claim 1, wherein the powertrain comprises an electronic powertrain controller configured to implement operation of the powertrain in the particular one of the wheel mode and the track mode based at least in part on an indication of the particular one of the wheel mode and the track mode from the mode selector.

40. A controller for an all-terrain vehicle (ATV), the ATV being equippable with a plurality of ground-engaging wheels or a plurality of ground-engaging track assemblies providing traction on the ground, each ground-engaging track assembly of the plurality of ground-engaging track assemblies comprising: a plurality of track-contacting wheels; and an endless track disposed around the plurality of track-contacting wheels, the plurality of track-contacting wheels including a drive wheel for driving the endless track, the endless track comprising an inner side for facing the plurality of track-contacting wheels and a ground-engaging outer side for engaging the ground, the ATV comprising a powertrain for delivering power to the ground-engaging wheels when the ATV is equipped with the ground-engaging wheels and to the drive wheels of the ground-engaging track assemblies when the ATV is equipped with the ground-engaging track assemblies, the controller comprising:
 a processing portion; and
 a memory portion storing a program executable by the processing portion to control the powertrain such that the powertrain operates in a wheel mode when delivering power to the ground-engaging wheels and in a track mode when delivering power to the drive wheels of the ground-engaging track assemblies, the drive wheels of the ground-engaging track assemblies being different from the ground-engaging wheel.

41. Non-transitory computer-readable storage media storing a program executable by at least one processor to implement a controller for an all-terrain vehicle (ATV), the ATV being equippable with a plurality of ground-engaging wheels or a plurality of ground-engaging track assemblies providing traction on the ground, each ground-engaging track assembly of the plurality of ground-engaging track assemblies comprising: a plurality of track-contacting wheels; and an endless track disposed around the plurality of track-contacting wheels, the plurality of track-contacting wheels including a drive wheel for driving the endless track, the endless track comprising an inner side for facing the plurality of track-contacting wheels and a ground-engaging outer side for engaging the ground, the ATV comprising a powertrain for delivering power to the ground-engaging wheels when the ATV is equipped with the ground-engaging wheels and to the drive wheels of the ground-engaging track assemblies when the ATV is equipped with the ground-engaging track assemblies, the program when executed by the at least one processor causing the controller to control the powertrain such that the powertrain operates in a wheel mode when delivering power to the ground-engaging wheels and in a track mode when delivering power to the drive wheels of the ground-engaging track assemblies, the drive wheels of the ground-engaging track assemblies being different from the ground-engaging wheels.

42. An all-terrain vehicle (ATV), the ATV being equippable with a plurality of ground-engaging wheels or a plurality of ground-engaging track assemblies providing traction on the ground, each ground-engaging track assembly of the plurality of ground-engaging track assemblies comprising: a plurality of track-contacting wheels; and an endless track disposed around the plurality of track-contacting wheels, the plurality of track-contacting wheels including a drive wheel for driving the endless track, the endless track comprising an inner side for facing the plurality of track-contacting wheels and a ground-engaging outer side for engaging the ground, the ATV comprising:
- a frame;
- a powertrain for delivering power to the ground-engaging wheels when the ATV is equipped with the ground-engaging wheels and to the drive wheels of the ground-engaging track assemblies when the ATV is equipped with the ground-engaging track assemblies;
- a steering system for steering the ATV on the ground;
- a suspension for allowing relative motion between the frame and the ground-engaging wheels when the ATV is equipped with the ground-engaging wheels and relative motion between the frame and ground-engaging track assemblies when the ATV is equipped with the ground-engaging track assemblies, the drive wheels of the ground-engaging track assemblies being different from the ground-engaging wheels; and
- a braking system for braking the ATV;
- at least one of the powertrain, the steering system, the suspension, and the braking system being operable in a wheel mode when the powertrain delivers power to the ground-engaging wheels and in a track mode when the powertrain delivers power to the drive wheels of the ground-engaging track assemblies, the ATV comprising a mode selector for selecting a particular one of the wheel mode and the track mode to cause the at least one of the powertrain, the steering system, the suspension, and the braking system to operate in the particular one of the wheel mode and the track mode.

43. An all-terrain vehicle (ATV), the ATV being equippable with a plurality of ground-engaging wheels or a plurality of ground-engaging track assemblies providing traction on the ground, each ground-engaging track assembly of the plurality of ground-engaging track assemblies comprising: a plurality of track-contacting wheels; and an endless track disposed around the plurality of track-contacting wheels, the plurality of track-contacting wheels including a drive wheel for driving the endless track, the endless track comprising an inner side for facing the plurality of track-contacting wheels and a ground-engaging outer side for engaging the ground, the ATV comprising:
- a powertrain for delivering power to the ground-engaging wheels when the ATV is equipped with the ground-engaging wheels and to the drive wheels of the ground-engaging track assemblies when the ATV is equipped with the ground-engaging track assemblies, the powertrain being operable in a wheel mode when the ATV is equipped with the ground-engaging wheels and in a track mode when the ATV is equipped with the ground-engaging track assemblies; and
- a mode selector for selecting a particular one of the wheel mode and the track mode to cause the powertrain to operate in the particular one of the wheel mode and the track mode, the mode selector being configured to select the particular one of the wheel mode and the track mode based at least in part on an input not received from a user interface of the ATV.

* * * * *